US010467646B2

(12) United States Patent
Kim et al.

(10) Patent No.: US 10,467,646 B2
(45) Date of Patent: Nov. 5, 2019

(54) COMMUNICATION SYSTEM AND METHOD FOR NARROWCASTING

(71) Applicant: NEXT JUMP, Inc., New York, NY (US)

(72) Inventors: Yong-Chul C. Kim, New York, NY (US); Thomas Fuller, New York, NY (US); Isabella Chung, New York, NY (US); Nettana Samroengraja, New York, NY (US)

(73) Assignee: Next Jump, Inc., New York, NY (US)

( * ) Notice: Subject to any disclaimer, the term of this patent is extended or adjusted under 35 U.S.C. 154(b) by 1170 days.

(21) Appl. No.: 13/931,555

(22) Filed: Jun. 28, 2013

(65) Prior Publication Data

US 2014/0156406 A1    Jun. 5, 2014

Related U.S. Application Data

(63) Continuation of application No. 12/309,261, filed as application No. PCT/US2007/016287 on Jul. 17, 2007, now abandoned.
(Continued)

(51) Int. Cl.
*G06Q 30/02*    (2012.01)
*G06N 20/00*    (2019.01)

(52) U.S. Cl.
CPC ......... *G06Q 30/0226* (2013.01); *G06N 20/00* (2019.01); *G06Q 30/02* (2013.01);
(Continued)

(58) Field of Classification Search
CPC ....................................... G06Q 30/0207–0284
(Continued)

(56) References Cited

U.S. PATENT DOCUMENTS 5,991,735 A    11/1999   Gerace
7,725,502 B1 *  5/2010   Badros ................. G06Q 30/02
                                                                705/14.68
(Continued)

FOREIGN PATENT DOCUMENTS

WO   WO-0159657 A1 *  8/2001 ........... G06Q 10/109
WO   2005/038694        4/2005

OTHER PUBLICATIONS

International Preliminary Report on Patentability dated Jan. 14, 2010 in related PCT Application No. PCT/US07/16287 filed Jul. 17, 2007, 10 pages.
(Continued)

*Primary Examiner* — John Van Bramer
(74) *Attorney, Agent, or Firm* — Dentons US LLP

(57) ABSTRACT

A communication system with client devices in communication with at least one communication network. User data stores are also in communication with the communications network and store user data of users using respective ones of the client devices. Offer data stores also in communication with the communications network store offers from merchants. A narrowcasting engine includes an active data gathering module to collect the user data, and an active learning module to generate a user profile based on the user data. The communication engine selects dynamically offers from the offer data store based on the profile, and communicates the selected offers in the offer data store to the users.

11 Claims, 79 Drawing Sheets

Related U.S. Application Data

(60) Provisional application No. 60/831,193, filed on Jul. 17, 2006, provisional application No. 60/850,263, filed on Oct. 10, 2006, provisional application No. 60/924,591, filed on May 22, 2007, provisional application No. 60/924,592, filed on May 22, 2007.

(52) U.S. Cl.
CPC ..... G06Q 30/0215 (2013.01); G06Q 30/0224 (2013.01); G06Q 30/0244 (2013.01); G06Q 30/0269 (2013.01); G06Q 30/0275 (2013.01)

(58) Field of Classification Search
USPC .............................................. 705/14.1–14.73
See application file for complete search history.

(56) References Cited

U.S. PATENT DOCUMENTS

| | | | |
|---|---|---|---|
| 2001/0032115 A1* | 10/2001 | Goldstein | G06Q 30/02 705/7.32 |
| 2002/0010668 A1* | 1/2002 | Travis | G06Q 30/02 705/35 |
| 2002/0111865 A1* | 8/2002 | Middleton, III | G06Q 30/02 705/14.41 |
| 2003/0018778 A1 | 1/2003 | Martin et al. | |
| 2004/0107283 A1* | 6/2004 | Paddon | G06O 30/06 709/229 |
| 2004/0172324 A1 | 9/2004 | Merriman et al. | |
| 2004/0193491 A1 | 9/2004 | Davis | |
| 2005/0021397 A1 | 1/2005 | Cui et al. | |
| 2005/0131762 A1* | 6/2005 | Bharat | G06Q 10/00 705/14.66 |
| 2007/0069013 A1 | 3/2007 | Seifert et al. | |

OTHER PUBLICATIONS

International Search Report dated Mar. 21, 2008 in related PCT Application No. PCT/US07/16287 filed Jul. 17, 2007, 2 pages.
Supplementary European Search Report dated Aug. 25, 2011 in related European Application No. EP07810578 filed Jul. 17, 2007, 6 pages.

* cited by examiner

TEST PROCESS

CABR TEST MESSAGING

| STAGE 1: CALIBRATION (DATA GATHERING) 50% OF TOTAL TEST POPULATION | | | |
|---|---|---|---|
| SEGMENT | OFFER MIX | MESSAGING | VARIANTS |
| SEGMENT 1 (1/n) MAX 1000 USERS/CELL | OFFER MIX A | CREDIBILITY AFFINITY | 4 CELLS |
| | OFFER MIX B | BENEFIT REDEMPTION | |
| SEGMENT 2 (1/n) MAX 1000 USERS/CELL | OFFER MIX A | CREDIBILITY AFFINITY | 4 CELLS |
| | OFFER MIX B | BENEFIT REDEMPTION | |
| SEGMENT 3 (1/n) MAX 1000 USERS/CELL | OFFER MIX A | CREDIBILITY AFFINITY | 4 CELLS |
| | OFFER MIX B | BENEFIT REDEMPTION | |
| SEGMENT n (1/n) MAX 1000 USERS/CELL | OFFER MIX A | CREDIBILITY AFFINITY | 4 CELLS |
| | OFFER MIX B | BENEFIT REDEMPTION | |
| TOTAL | | | 4n CELLS |

| STAGE 2: VALIDATION (MESSAGE REFINEMENT) 50% OF TOTAL TEST POPULATION | | | |
|---|---|---|---|
| SEGMENT | OFFER MIX | MESSAGING | VARIANTS |
| SEGMENT 1 (1/n) MAX 1000 USERS/CELL | OFFER MIX A | CREDIBILITY AFFINITY | 4 CELLS |
| | OFFER MIX C | BENEFIT REDEMPTION | |
| SEGMENT 2 (1/n) MAX 1000 USERS/CELL | OFFER MIX A | CREDIBILITY AFFINITY | 4 CELLS |
| | OFFER MIX C | BENEFIT REDEMPTION | |
| SEGMENT 3 (1/n) MAX 1000 USERS/CELL | OFFER MIX A | CREDIBILITY AFFINITY | 4 CELLS |
| | OFFER MIX C | BENEFIT REDEMPTION | |
| SEGMENT n (1/n) MAX 1000 USERS/CELL | OFFER MIX A | CREDIBILITY AFFINITY | 4 CELLS |
| | OFFER MIX C | BENEFIT REDEMPTION | |
| TOTAL | | | 4n CELLS |

| SEGMENT | LAUNCH EMAIL METHODOLOGY | | | | | | | |
|---|---|---|---|---|---|---|---|---|
| | WEEK 1 | WEEK 2 | WEEK 3 | WEEK 4 | WEEK 5 | WEEK 6 | WEEK 7 | WEEK 8 |
| A | TEASER | INVITATION 1 | INVITATION 2 | | | | | |
| B | TEASER | INVITATION 1 | INVITATION 1 | INVITATION 2 | | | | |
| C | | TEASER | INVITATION 1 | INVITATION 2 | INVITATION 2 | | | |
| D | | TEASER | INVITATION 1 | INVITATION 2 | INVITATION 2 | | | |
| E | | | TEASER | INVITATION 1 | INVITATION 1 | INVITATION 2 | | |
| F | | | TEASER | INVITATION 1 | INVITATION 1 | INVITATION 2 | | |
| G | | | | TEASER | INVITATION 1 | INVITATION 1 | INVITATION 2 | |
| H | | | | TEASER | INVITATION 1 | INVITATION 1 | INVITATION 2 | |
| I | | | | | TEASER | INVITATION 1 | INVITATION 2 | |
| J | | | | | TEASER | INVITATION 1 | INVITATION 2 | INVITATION 2 |

1. BUILD / LAUNCH
   A. SEGMENTS
   B. OFFERS
   C. PROGRAM
   D. COMMUNICATION
2. ANALYZE
   A. USAGE
   B. COMMUNICATION EFFECTIVENESS
3. ADJUST
   A. BASED ON FINDINGS & RECOMMENDATIONS
4. REPEAT
   A. SUCCESS

| TYPE OF DATA | ACTIVE DATA DATA SOURCE | | |
|---|---|---|---|
| | NETWORK OWNER DATA<br><br>(YELLOW DATA IS OWNED BY NETWORK CLIENTS) | NARROWCASTING DATA | MERCHANT & PROCESSOR DATA |
| | | EXPLICIT DATA (ENTERED BY USER)<br><br>(YELLOW DATA US OWNED BY NETWORK CLIENTS) | INFERRED DATA (ACTIVE DATA GATHERING)<br><br>(WHITE DATA US OWNED BY NARROWCASTING SYSTEM) | (GREEN DATA IS OWNED BY MERCHANT CLIENTS) |
| PERSONALLY IDENTIFIABLE INFORMATION (PII) | EMAIL NAME ...<br>(NETWORK CLIENTS) | NEW REGISTRATION DATA EMAIL ADDRESSES ACCOUNT UPDATA DATA UPDATED EMAIL ADDRESSES (NETWORK CLIENTS) | | CUSTOMER INFORMATION NAME ADDRESS (MERCHANT) |
| DEMOGRAPHIC | GENDER LOCATION AGE ...<br>(NETWORK CLIENTS) | NEW REGISTRATION DATA GENDER LOCATION ACCOUNT UPDATE DATA ZIP CHANGE (NETWORK CLIENTS) | GENDER LOCATION ...<br>(NARROWCASTING SYSTEM) | |
| PREFERENCE | | PREFERENCE INFORMATION COLLECTED AT REGISTRATION CATEGORY INTEREST LIFE STAGE (JOINTLY OWNED) | REMINDERS SEARCH ...<br>(NARROWCASTING SYSTEM) | ONLINE SURVEY (JOINTLY OWNED) (MERCHANT) |
| BEHAVIORAL | | | SITE BEHAVIOR IMPRESSIONS ACTIVATIONS QUALIFIED LEADS EMAIL BEHAVIOR CLICK-BACK RESPONSE (NARROWCASTING SYSTEM) | |
| TRANSACTION | | | | MERCHANT PROCESSOR TRANSACTIONS DATA $ (TICKET SIZE) MERCHANT ONLY SKU |

• HOME • INVITE SPOUSE / FAMILY • MY ACCOUNT • FAQ • HELP • LOGOUT
• ALL OFFERS • NEW OFFERS • MOST POPULAR OFFERS • EMAIL REMINDERS

APPAREL  AUTOMOTIVE  BOOKS & MOVIES  DIAMONDS & JEWELRY  ELECTRONICS  ENTERTAINMENT & TICKETS  FLOWERS & GIFTS
FOOD & WINE  HEALTH & WITNESS  HOME, GARDEN & PETS  KIDS & BABIES  SPORTS & FITNESS  TRAVEL  VIEW ALL CATEGORIES

SEARCH [IPOD] [GO]

WELCOME TO BANK OF AMERICA ASSOCIATE DISCOUNT PROGRAM, MARK ADAMS

MERCHANT SEARCH

SEARCH RESULTS:
YOUR SEARCH FOR IPOD PRODUCED 10 RESULTS

1. TARGET - 10% OFF
2. BUY.COM - 3% OFF
3. CRUTCHFIELD ELECTRONICS - FREE SHIPPING + $100 CREDIT
4. HIWIRED - 50% OFF SERVICE
5. SMARTBARGAINS - FREE SHIPPING
6. PHILIPS CONSUMER ELECTRONICS - 40% OFF
7. APPLE COMPUTERS - 12% OFF
8. OVERSTOCK - 10% OFF
9. SMART HOME - 10% OFF
10. AUDIBLE.COM - FREE TRIAL

STAFF PICKS

BARNES AND NOBLE
EBAGS
PROFLOWERS
ROAD RUNNER SPORTS
SHOES.COM
CRUTCHFIELD

SHARE THE SAVINGS

HAVE A FAMILY MEMBER WHO WOULD ENJOY THESE OFFERS?
CLICK HERE TO ADD THEM AS A GUEST

TERMS OF USE | PRIVACY POLICY | CONTACT US | ABOUT CORPORATE PERKS

[D] [P] [B]

DEMOGRAPHIC          PREFERENCE           BEHAVIOR
- FIRST NAME         - APPAREL            - DELL COMPUTERS
- LAST NAME          - BUSINESS           - IPOD
- COMPANY              APPAREL
- TITLE              - CASUAL APPAREL
- LOCATION           - COMPUTERS
- SALARY             - ELECTRONICS
- GENDER
- AGE

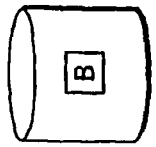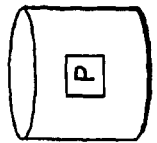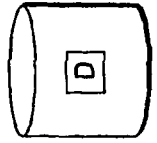
FIG. 17D

FIG. 17G

RULE DEVELOPED: THE WORKAHOLIC PERSONA

NAME: JOE USER
WORK LOCATION: NEW YORK, NY
HOME LOCATION: NEW YORK, NY
JOB TITLE: ASSOCIATE
AGE: 28
MARITAL STATUS: SINGLE
$150,000
EDUCATION: MBA, WHARTON

CLIENT TARGET DEMOGRAPHICS

- ☑ MALE
- ☐ 30-44
- ☐ MARRIED
- ☐ MEDIAN INCOME $55,000
- ☑ COLLEGE GRADUATE
- ☐ SUBURBAN
- ☐ CHILDREN

SHOPPING PATTERNS

- FLAT SCREEN TELEVISIONS
- BLACKBERRY PAGERS
- BUSINESS APPAREL
- DIAMOND JEWELRY
- TRAVEL
- HIGH-END GIFTS

BEHAVIORS

- SINGLE BUT INVOLVED -OR- RECENTLY MARRIED
- HIGH INCOME POTENTIAL
- WORKS 70-80 HOURS PER WEEK
- WORKS IN FINANCE, LEGAL, OR CONSULTING
- 'NEEDS-BASED' BUYER
- HIGH PURCHASE RATE
- HIGHLY INFLUENCED BY RECOMMENDATIONS
- RESPONDS TO 'CREDIBILITY' AND 'REDEMPTION' MESSAGING

FIG. 19

REPORTING: FORECASTER

SALES

CURRENT MONTH: JANUARY

| | CURRENT MONTH | | | | |
|---|---|---|---|---|---|
| MONTH TO DATE | TRACKING TO | BASE CASE | BEST CASE | | STRAIGHT (BASE) |
| $84,117 | $141,317 | $362,700 | $544,084 | | $361,050 |
| % "TRACKING TO" AS OF: | | 39.0% | 26.0% | | 39.1% |
| | CONTRACT-TO-DATE | | | | |
| CONTRACT-TO-DATE | | BASE CASE | BEST CASE | | STRAIGHT (BASE) |
| $898,859 | | $ 1,350,300 | $ 2,025,222 | | $ 2,527,350 |
| % "TRACKING TO" AS OF: | | 66.6% | 44.4% | | 35.6% |

| HISTORICAL DATA (YEAR 1) | | | PROJECTION (YEAR 2) | | | | | |
|---|---|---|---|---|---|---|---|---|
| | REVENUE | % OF TOTAL | BASE CASE | BEST CASE | STRAIGHT (BASE) | ACTUAL | % OF BASE | % OF BEST |
| JUNE | $13,985 | 1% | $80,600 | $120,900 | $361,050 | $76,798 | 95% | 64% |
| JULY | 13,714 | 1% | 90,700 | 136,050 | 361,050 | 91,337 | 101% | 67% |
| AUGUST | 16,305 | 2% | 111,000 | 166,248 | 361,050 | 116,367 | 105% | 70% |
| SEPTEMBER | 29,672 | 3% | 161,200 | 241,815 | 361,050 | 124,324 | 77% | 51% |
| OCTOBER | 36,204 | 4% | 181,400 | 272,042 | 361,050 | 104,685 | 58% | 38% |
| NOVEMBER | 53,050 | 5% | 282,100 | 423,176 | 361,050 | 148,602 | 53% | 35% |
| DECEMBER | 89,998 | 9% | 443,300 | 664,991 | 361,050 | 236,746 | 53% | 36% |
| JANUARY | 76,715 | 8% | 362,700 | 544,084 | 361,050 | | 0% | 0% |
| FEBRUARY | 224,614 | 22% | 927,000 | 1,390,436 | 361,050 | | 0% | 0% |
| MARCH | 72,121 | 7% | 282,100 | 423,176 | 361,050 | | 0% | 0% |
| APRIL | 121,961 | 12% | 443,300 | 664,991 | 361,050 | | 0% | 0% |
| MAY | 258,140 | 26% | 967,200 | 1,450,890 | 361,050 | | 0% | 0% |
| TOTAL | $1,006,479 | 100% | $4,332,600 | $6,498,800 | $4,332,600 | $898,859 | 21% | 14% |

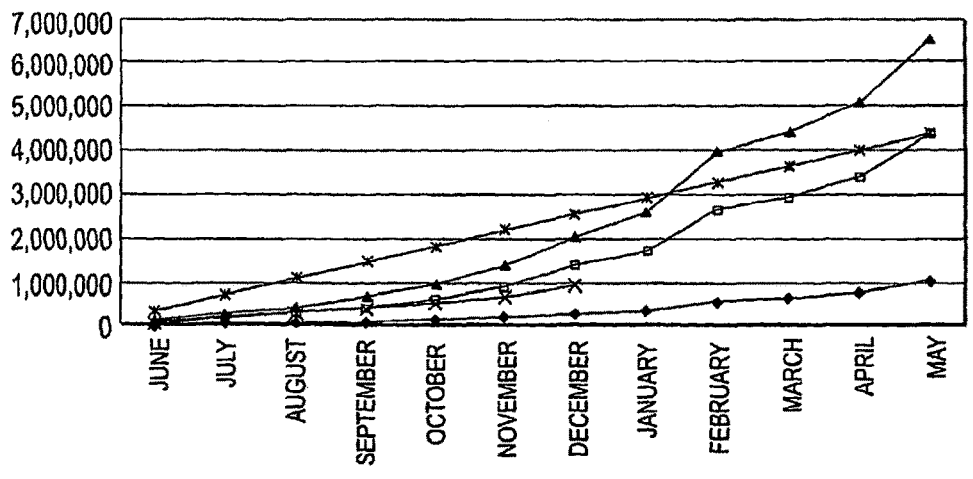

*FIG. 21*

RFM CUSTOMER SEGMENTATION

| GROUP | SEGMENT | COUNT | %CUSTS | $ SALES | % SALES | RATIO OF SALES TO GROUP SIZE | AVG SALES PER CUST. | MEDIAN SALES PER CUST. |
|---|---|---|---|---|---|---|---|---|
| 1. BRAND NEW <br> NEW IN LAST 90 DAYS <br> NUMBER (19.8%) | WELCOME ABOARD <br> MEET & GREET <br> COME BACK AGAIN | | | | | | | |
| 2. UP AND COMMING <br> NEW IN LAST 3 MO. - 1 YR <br> NUMBER (70.3%) | 1 - TIMERS <br> LIGHT REPEATERS <br> ACTIVE SHOPPERS <br> FULLY ENGAGED <br> LOCK N' LOAD <br> ANNIVERSARY GROUP | | | | | | | |
| 3. LONG-TERM ESTABLISHED <br> 1 - 2 YRS TENURE <br> NUMBER (2.6%) | SILVER <br> GOLD <br> PLATINUM | | | | | | | |
| 4. LAPSING <br> 1 - 2 YRS TENURE <br> NUMBER (7.3%) | TRIED, SAYING GOODBYE <br> SLIP SLIDING AWAY <br> ELVIS IS LEAVING THE BUILDING | | | | | | | |
| TOTAL | 15 SEGMENTS | | | | | | | |

FIG. 26

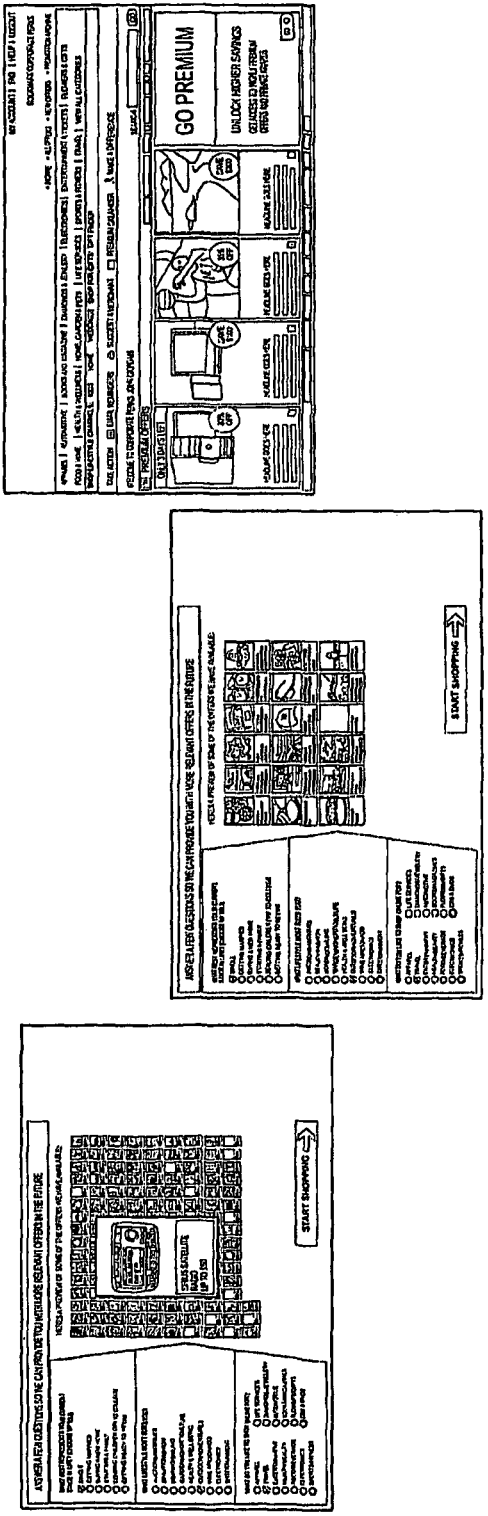

FIG. 29

PREFERENCE SET

BENEFITS TO PROGRAM:
o INITIATES USER "BUY-IN" TO PROGRAM
o UTILIZATION OF PROGRAM RECOGNIZED AT ONSET
o ONLY RELEVANT OFFERS DELIVERED
o HIGHER GO SHOP RATES

BENEFITS TO USER:
o USERS GET TO SET THEIR PREFERENCES SO THEY ONLY SEE THE OFFERS THEY WANT
o ENTERTAINING, INTERACTIVE, ENGAGING, FUN
o OPPORTUNITY TO SEE WHAT'S INSIDE

HOME PAGE

BENEFITS TO PROGRAM:
o TIE IN WITH PREFERENCES AND OFFERS VIEWED UPON ENTERING HOME PAGE
o STRONGER FIRST IMPRESSION AND OVERALL USAGE OF PROGRAM
o ONGOING USAGE
o HIGHER GO SHOP RATES

BENEFITS TO USER:
o EASY, FAST
o OFFERS MATCH PREFERENCES
o MORE APT TO UTILIZE MORE THAN ONCE

OFFER RANK WIZARD

PROFLOWERS, INC.

ABOUT — 3610

MERCHANT OFFER DATA
ACTUAL HISTORICAL DATA — 3201

SUB-CATEGORY: FLOWERS
START DATE: SEP 20 2006    END DATE: DEC 27 2006  GO

SELECT ANOTHER VIEW:    VIEW RESULTS:

BY SUB CATEGORY
BY CATEGORY
ENTIRE NETWORK

VIEW BY YEAR:
2006
2005
2004

ALL AVAILABLE HISTORY
LAST 12-MONTHS
LAST 6-MONTHS
LAST 3-MONTHS
LAST MONTH
LAST 2 WEEKS
LAST WEEK

| RANK | MERCHANT | OFFER | VIEW OFFER SUMMARY | TRAFFIC | INCREASE VARIABLE MKTG | INCREASE FIXED MKT |
|---|---|---|---|---|---|---|
| 1 | FTD | 35% OFF | VIEW ORDER | | ADD>> | ADD>> |
| 2 | 1-800 FLOWERS | 40% OFF PLUS FREE SHIPPING | VIEW ORDER | | ADD>> | ADD>> |
| 3 | BLOOMS | 40% OFF | VIEW ORDER | | ADD>> | ADD>> |
| 4 | JUSTFLOWERS.COM | 30% OFF WITH MIN. $60 ORDER | VIEW ORDER | | ADD>> | ADD>> |
| 5 | FLOWERS BY PHILIPS | 25% OFF WITH GIFT | VIEW ORDER | | ADD>> | ADD>> |
| 6 | PROFLOWERS | 10% OFF WITH FREE GIFT | VIEW ORDER | | ADD>> | ADD>> |
| 7 | MERRYGROW FARMS | 15% OFF | VIEW ORDER | | ADD>> | ADD>> |
| 8 | ARISTON FLORISTS | 10% OFF WITH FREE GIFT | VIEW ORDER | | ADD>> | ADD>> |
| 9 | GARDENER'S SUPPLY | 10% OFF WITH FREE SHIPPING | VIEW ORDER | | ADD>> | ADD>> |
| 10 | J&J BASKETS | 10% OFF WITH FREE GIFT | VIEW ORDER | | ADD>> | ADD>> |
| 11 | MASTER GARDEN | 10% OFF | VIEW ORDER | | ADD>> | ADD>> |
| 12 | NGA GARDEN SHOP | 1% OFF | VIEW ORDER | | ADD>> | ADD>> |
| 13 | GIFT TREE FLOWERS | 1% OFF | VIEW ORDER | | ADD>> | ADD>> |
| 14 | FLORAL DECORATORS | 1% OFF | VIEW ORDER | | ADD>> | ADD>> |
| 15 | JNJ GIFTS | 1% OFF | VIEW ORDER | | ADD>> | ADD>> |
| 16 | HOLIDAY FLORALS | 1% OFF | VIEW ORDER | | ADD>> | ADD>> |
| 17 | FLORAL SUPPLY CO. | 1% OFF | VIEW ORDER | | ADD>> | ADD>> |

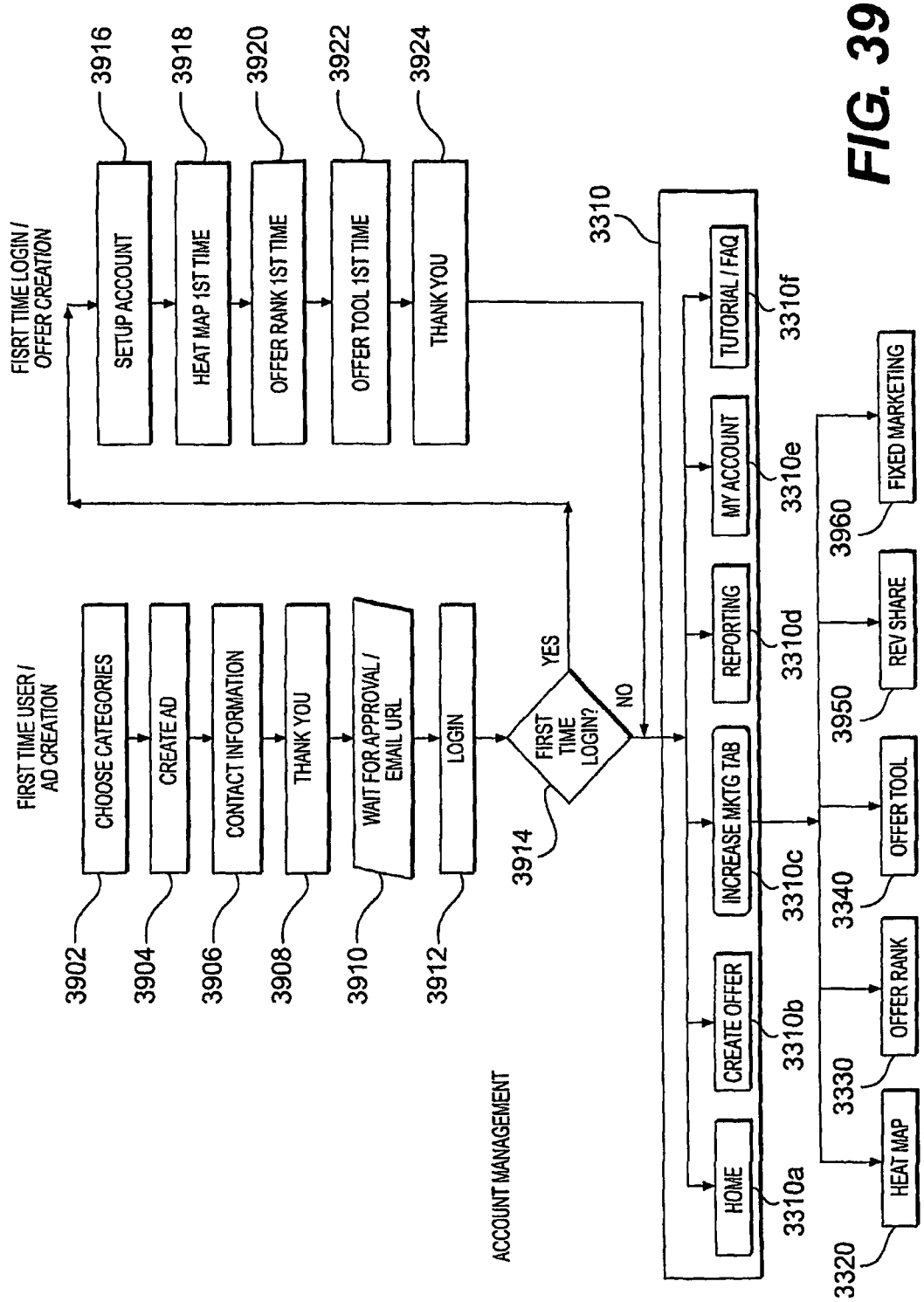

| CHOOSE CATEGORIES | CREATE AD | SETUP ACCOUNT | HELP | SIGN-UP DEMO | CONTACT US |

WELCOME TO NEXT JUMP'S AUTO ENROLL PROGRAM

THIS SIGNUP WIZARD WILL HELP YOU CREATE YOUR OWN AD CAMPAIGN IN FOUR EASY STEPS: CHOOSE CATEGORIES, CREATE YOUR AD, SETUP YOUR ACCOUNT, AND MANAGE YOUR ACCOUNT. YOUR ADS WON'T APPEAR UNTIL YOU VERIFY YOUR ACCOUNT AND SUBMIT YOUR BILLING INFORMATION

CHOOSE CATEGORIES

PLEASE SELECT THE PRIMARY MASTER AND SUB-CATEGORY THAT BEST DESCRIBES YOUR BUSINESS.
WHAT'S THIS?

VALUE WILL BE DEPENDENT ON MASTER CATEGORY OR POTENTIALLY SUBCATEGORY
"MANUAL OVERRIDE" FUNCTION WILL ENABLE US TO SET CUSTOM REV-SHARE RATES ON THE BACK END.

MASTER CATEGORY       SUB-CATEGORY        REVENUE SHARE

[HEALTH AND BEAUTY ▽]  [BATH AND BODY PROD ▽]   [10%]    WHAT'S THIS?

BOTH CATEGORY BOX ENTRIES WILL CORRESPOND TO NJ PERKS
SITE CATEGORIES

THERE WILL BE A CATEGORY IN BOTH BOXES FOR "OTHER" FOR
WHICH REV SHARE % WILL BE SET TO 10%

THANK YOU

THANK YOU FOR PLACING YOUR AD. YOU WILL BE RECEIVING AN EMAIL FROM US IN THE NEXT TWO DAYS WITH ACCESS TO YOUR ACCOUNT WHEN YOUR AD IS APPROVED. IF YOU HAVE ANY IMMEDIATE QUESTIONS, PLEASE FEEL FREE TO CONTACT US AT:
XXXXXXXX

FIG. 40D

HELP   SIGN-UP DEMO   CONTACT US

CHOOSE CATEGORIES   CREATE AD   SETUP ACCOUNT

SETUP ACCOUNT
CONTACT INFO  ○ USA & TERRITORIES   ○ CANADA   ○ OTHER INTERNATIONAL
FIRST NAME*: [          ]
LAST NAME*: [          ]
EMAIL ADDRESS*: [          ]
PHONE NUMBER*: [          ]
ADDRESS*: [          ]
CITY*: [          ]
STATE*: [ ▽ ]   ZIP*: [     ]
BILLING INFO
CARDHOLDER'S NAME [          ]
BILLING ADDRESS 1 [          ]
BILLING ADDRESS 2 [          ]
CITY [          ]
STATE [    ]   ZIP CODE [     ]

CREDIT CARD TYPE
○ VISA   ○ MASTERCARD   ○ AMERICAN EXPRESS
CREDIT CARD NUMBER (NO DASHES OR SPACES.)
[                    ]
EXPIRATION DATE
[ 1 ▽ ]  [ 2006 ▽ ]
SECURITY CODE (WHAT IS THIS?) [   ]

[ <<BACK ]   [ CONTINUE>> ]

FIG. 43A

| HOME | CREATE OFFER | INCREASE MKTING | REPORTING | MY ACCOUNT | TUTORIAL/FAQ |
| --- | --- | --- | --- | --- | --- |
| HEAT MAP | OFFER RANK | OFFER TOOL | | | |

SEE HOW YOUR COMPETITORS' OFFERS STACK UP. THEN CREATE YOUR OWN TO INCREASE YOUR ESTIMATED OFFER RANKING.
HOW DOES IT WORK?
GET YOUR RANK BY SELECTING A DATE RANGE BELOW

STEP 1
VIEW USER ACTIVITY WITHIN CATEGORY USING HEAT MAP

STEP 2
VIEW COMPETITOR OFFERS & RANK STATUS USING OFFER RANK

STEP 3
CREATE OFFER TO COMPETE WITHIN CATEGORY USING OFFER TOOL

PROFLOWERS ▽
ACTIVE OFFERS CATEGORIES ▽
SUBMIT

| RANK | MERCHANT | OFFER | TRAFFIC |
| --- | --- | --- | --- |
| 4 | PROFLOWERS | 15% OFF PLUS VASE | ☐☐☐ |
| 1 | 111 | 35% OFF | ☐☐☐☐☐ |
| 2 | 222 | 35% OFF | ☐☐☐☐☐ |
| 3 | 333 | 35% OFF | ☐☐☐☐ |
| 4 | PROFLOWERS | 15% OFF PLUS VASE | ☐☐☐ |
| 5 | 444 | 35% OFF | ☐☐ |
| 6 | 555 | 35% OFF | ☐☐ |
| 7 | 666 | 35% OFF | ☐☐ |
| 8 | 777 | 35% OFF | ☐ |
| 9 | 888 | 35% OFF | ☐ |
| 10 | 999 | 35% OFF | |

WILL NOT SHOW MERCHANTS RANK WHEN LOGGED IN FOR THE FIRST TIME AS THERE WILL NOT YET BE AN OFFER

SEE MORE >>

<<BACK    CONTINUE>>

*FIG. 43C*

| HOME | CREATE OFFER | INCREASE MKTING | REPORTING | MY ACCOUNT | TUTORIAL/FAQ |

HEAT MAP    OFFER RANK    OFFER TOOL

STEP 1
VIEW USER
ACTIVITY WITHIN
CATEGORY USING
HEAT MAP

STEP 2
VIEW COMPETITOR
OFFERS & RANK
STATUS USING
OFFER RANK

STEP 3
CREATE OFFER TO
COMPETE WITHIN
CATEGORY USING
OFFER TOOL

MERCHANT NAME: [DEFAULT]

OFFER AMOUNT: !?!
(% DISCOUNT) [◆▶]

LENGTH OF OFFER: !?!   [✓] UNLIMITED   [3 MONTHS ◆▶]   DEFAULTS TO "UNLIMITED" IF USER UNCHECKS BOX APPEARS W/ 3 MONTH MIN. DEFAULT

URL: !?! [DEFAULT]

FULL DESCRIPTION: !?! [DEFAULT]   MAX 300 CHARACTERS

[<<BACK]   [CONTINUE>>]

*FIG. 43D*

| HOME | CREATE OFFER | INCREASE MKTING | REPORTING | MY ACCOUNT | TUTORIAL/FAQ |

1410

WELCOME <MERCHANT NAME>. USE THIS CONTROL CENTER TO ADJUST YOUR MARKETING. GET STARTED BY SELECTING TO CREATE AN OFFER. WE HAVE CREATED SOME TOOLS TO HELP YOU GET A SENSE OF USER ACTIVITY WITHIN YOUR CATEGORY (HEAT MAP) AND SOME VISIBILITY INTO YOUR COMPETITOR OFFERINGS (OFFER RANK).

ACCOUNT ACTIVITY SUMMARY

ONLINE LEAD GENERATION

FOR CURRENT DATE THURSDAY, NOVEMBER 9, 2006

| AD NAME | AD STATUS | START DATE | END DATE | AD PAGE IMPRESSIONS | CLICKS | CTR |
|---|---|---|---|---|---|---|
| 20% OFF | ACTIVE | 04/05/06 | 08/31/06 | 59 | 40 | 68% |

ALL ACTIVITY
FOR WEEK BEGINNING
(ONLY PREVIOUS WEEK IS SHOWN AS THERE IS A 1 WEEK REPORTING DELAY)

| TRANS AMOUNT | NET SALES | DISCOUNT% | DISCOUNT$ |
|---|---|---|---|
| | | | |

*FIG. 44A*

| HOME | CREATE OFFER | INCREASE MKTING | REPORTING | MY ACCOUNT | TUTORIAL/FAQ |

SELECT DATE RANGE ------ DEFAULT SHOULD BE FOR LAST 7 DAYS

FROM: [        ]    TO: [        ]

[SEE REPORT ON NEXT PAGE]

*FIG. 44B*

```
[MERCHANT NAME]
REPORT FOR 10/16/06 - 10/22/06
CLOSING DATE: 10/22/06
```

| [MERCHANT NAME] | NEXT JUMP, INC. |
|---|---|
| [ADDRESS LINE 1] | 261 FIFTH AVE |
| [ADDRESS LINE 2] | 8TH FLOOR |
| [CONTACT NAME] | NEW YORK, NY 10016 |
| [CONTACT NUMBER] | 212-685-7101 |
| [CONTACT EMAIL] | |

| PREVIOUS BALANCE | PAYMENTS | + | ADJUSTMENTS | = | NEW BALANCE |
|---|---|---|---|---|---|
| $0.00 | $232.85 | | ($232.85) | | $0.00 |

PLEASE PAY BY:
THIS IS NOT A BILL
DO NOT REMIT PAYMENT
YOUR CREDIT CARD HAS ALREADY BEEN CHARGED.

ACTIVITY THIS PERIOD

REGISTERED CARD PROGRAM

ONLINE ACTIVITY:

| TRANS DATE | TRANS ID | PROVIDED BY: | TRANS AMT | NET SALES | DISCOUNT % | DISCOUNT $ |
|---|---|---|---|---|---|---|
| 10/16/2006 | 000000008 | AMEX | $68.52 | $61.67 | 10% | $6.85 |
| 10/16/2006 | 000000010 | AMEX | $93.80 | $84.42 | 10% | $9.38 |
| 10/18/2006 | 000000033 | M/C | $118.17 | $106.35 | 10% | $11.82 |
| 10/19/2006 | 000000038 | V | $164.97 | $148.47 | 10% | $16.5 |
| 10/19/2006 | 000000040 | V | $73.48 | $66.13 | 10% | $7.35 |
| 10/19/2006 | 000000045 | DISCOVER | $54.10 | $48.69 | 10% | $5.41 |
| | | TOTAL | $573.04 | $515.74 | | $57.30 |
| | | | | TOTAL ONLINE ACTIVITY DUE | | $57.30 |

STORE LOCATION ACTIVITY:
123 MAIN STREET, NY, NY 01234

| TRANS DATE | TRANS ID | PROVIDED BY: | TRANS AMT | NET SALES | DISCOUNT % | DISCOUNT $ |
|---|---|---|---|---|---|---|
| 10/17/2006 | 000000012 | M/C | $129.54 | $116.59 | 10% | $12.95 |
| 10/18/2006 | 000000025 | AMEX | $25.87 | $23.28 | 10% | $2.59 |
| | | TOTAL | $155.41 | $139.87 | | $15.54 |
| | | | | TOTAL STORE LOCATION ACTIVITY | | $15.54 |
| | | | | TOTAL REGISTERED CARD PROGRAM | | $72.85 |

COST PER CLICK PROGRAM

CLICK ACTIVITY:

| AVERAGE COST PER CLICK | # OF CLICKS | TOTAL |
|---|---|---|
| $1.00 | 160 | $160.00 |
| TOTAL COST PER CLICK PROGRAM | | $160.00 |

| AMOUNT CHARGED TO YOUR CREDIT CARD | TOTAL DUE | $232.85 |
|---|---|---|

NOTICES
THANK YOU FOR BEING A NEXT JUMP CUSTOMER.
FOR CUSTOMER SERVICE INQUIRIES, PLEASE EMAIL MERCHANTSERVICE@NEXTJUMP.COM OR CA --------------

| HOME | CREATE OFFER | INCREASED MKTING | REPORTING | MY ACCOUNT | TUTORIAL/FAQ |

COMING SOON

*FIG. 44E*

| NEW ACTIVITY | AMOUNT $ |
|---|---|
| TRANSACTIONS FOR APRIL ROGERS<br>CARD#: XXX-XXXXXX-12345 | |
| JUNE 14, 2004<br>RIALTO NEW YORK CITY NY<br>328756108 FOOD/BEV<br>REFERENCE: 3200748987462810B4 | 92.85 |
| JUNE 15, 2004<br>HYATT REGENCY NEW YORK CITY NY<br>003514780 FOOD/BEV<br>REFERENCE: 3200419960096807030 | 54.31 |
| JUNE 17, 2004<br>1-800-FLOWERS MILFORD CT<br>003512781 RETAIL MERCHANDISE<br>REFERENCE: 3200419960096802890 | 54.97 |
| JUNE 17, 2004<br>15% WORK PERKS SAVINGS AT 1-800-FLOWERS<br>1-800-FLOWERS # 003512781 $54.97<br>REFERENCE: 3200419960096829387 | -7.69 |
| JUNE 19, 2004<br>HICKEY FREEMAN NEW YORK CITY NY<br>003532987 RETAIL MERCHANDISE<br>REFERENCE: 3200419960096822908 | 3,123.57 |
| JUNE 19, 2004<br>40% WORK PERKS SAVING AT HICKEY FREEMEN<br>HICKEY FREEMEN # 003532987 $120.00<br>REFERENCE: 3200419960096823521 | -1,874.14 |
| JUNE 20, 2004<br>DUANE READE 047639 NEW YORK CITY NY<br>003532987 DRUG STORE/PHARMACY<br>REFERENCE: 3200419960096829387 | 28.56 |
| JUNE 21, 2004<br>PHILIPS ELECTRONICS FARGO ND<br>003533256 RETAIL MERCHANDISE<br>REFERENCE: 3200419960096833424 | 818.56 |
| JUNE 21, 2004<br>40% WORK PERKS SAVINGS AT PHILIPS ELECTRONICS<br>PHILIPS ELECTRONICS # 003533256 $320.00<br>REFERENCE: 320041960096B129783 | -491.13 |
| JUNE 21, 2004<br>TIVO INC RBS CA<br>701787873 96756<br>REFERENCE: 3200419600968129783 | 12.95 |
| JUNE 22, 2004<br>COSI #41 NEW YORK CITY NY<br>003532987 FOOD/BEV<br>REFERENCE: 3200419600968122987 | 15.63 |

COMMUNICATION SYSTEM AND METHOD FOR NARROWCASTING

This application is a Continuation of U.S. application Ser. No. 12/309,261 filed Apr. 21, 2010, which is a U.S. National Stage Application of International Application No. PCT/US2007/016287 filed Jul. 17, 2008, which claims the benefit of U.S. Provisional Patent Application Nos. 60/831,193 filed on Jul. 17, 2006, 60/850,263 filed on Oct. 10, 2006, 60/924,591 filed on May 22, 2007, and 60/924,592 filed on May 22, 2007, all of which are incorporated herein by reference.

BACKGROUND

Field

The present invention relates to a communication system and method, and more particularly, to a communication system and method for narrowcasting information based on active data gathering and active learning, providing merchant network services, and transaction processing for accumulating and redeeming rewards on a registered card with a spend, save, and give feature.

Discussion of the Related Art

Traditional communication systems and methods of reaching desired audiences among the masses mainly rely upon the broadcasting model, such as mass mailings and television/radio advertisements to inform potential consumers of various offerings in the hopes of increasing business.

But, the traditional broadcasting model is highly inefficient and research has shown that only a small fraction of the population pays any attention to these broadcasts. Using free standing inserts ("FSI") as an example, it has been estimated that merchants spend about $3 billion annually on marketing campaigns, while the amount actually redeemed by the consumers (i.e., those that have responded) is estimated to be only about $30 million, or only about a 1% response rate. Response rates to other forms of broadcast are generally unknown and difficult to quantify.

Merchants also use emails as a cheaper marketing channel in an effort to make the marketing process more efficient. But, consumers become overwhelmed with unsolicited advertisement emails (i.e., "spam") and all of its various forms of unsolicited advertisements, such as "pop-ups" (e.g., unsolicited advertisements that pop up during Internet use) and discard these indiscriminant communications. The result is tremendous waste in marketing spend for a miniscule return.

In an attempt to focus the communications to be more relevant, the communications industry has recently been developing ways to match information to recipients to find more information of interest. This is often referred to as targeted marketing. This can be based on demographic data. But, this information, for example gender and location of residence, is generally insufficient to assure offers that may be interesting to the user. To supplement this information, others try to obtain information to profile the users' interests.

Unfortunately, profiles are only as useful as the information provided by the user. If the user provides false information or does not provide any information during registration, the targeted information will be irrelevant and therefore useless. Usually profiling is achieved by presenting users with vague questions to elicit the required information. For example, a typical "general interest" category may be listed as "outdoors." If a user designates "outdoors" as an interest during registration, the user may get advertisements and/or offers ranging from hiking shoes to picnic accessories to travel magazines because such a preference is so vague. These so-called targeted communications are only slightly more effective than general broadcasting.

Some service providers have begun to supplement the vague user preference categories with tracked user activities, such as purchases made by the user. But, targeted advertisements and offers from these known systems are ineffective because the offered contents are almost always done in hindsight, i.e., based on past activities and, therefore, tend to be too late.

In addition to targeting communications, certain business use incentives to attract customers. For example, coupons are one of the vehicles used to encourage consumers to purchase specific products and/or spend at a particular business. Currently, some 300 billion coupons are distributed annually in the United States through an approximately $6 billion national coupon industry. Approximately half of the estimated $6 billion goes towards the actual incentive with the other half going towards administration. Combining this estimate with the fact that approximately 99% of the coupons end up in the trash, unused, and unredeemed, consumers only benefit from approximately $30 million in redeemed incentives (i.e., only about 0.5% of the $6 billion actually goes to the consumers).

What is needed, therefore, is a cost-efficient and convenient incentive redemption system and method that would provide benefits to both the consumers and merchants.

Another type of incentive typically used to draw consumers to usage is a rewards/loyalty program. The main marketing thrust of a rewards/loyalty program is to register, maintain, and increase consumer usage of a particular merchant or service provider by offering various incentives to the members of the program. Approximately 160 million people belong to an airline loyalty program, and approximately 32 million people belong to a credit card rewards program. Businesses spend an estimated $25 billion on rewards and incentives. Companies spend an estimated $50 million on employee rewards and recognition programs.

One of the most popular incentives used by rewards/loyalty programs is the "points" system. The idea is the member accumulates certain number of points for specified activities defined by the sponsor of the program (e.g., 1 point for every $1 spent, 1 point for visiting a sponsoring merchant, etc., 1 point for every mile traveled, etc.). Then, the member is given the opportunity to redeem the accumulated points for a "reward." The reward may be a product, service, or even cash that can be obtained by redeeming a specified number of points (e.g., 10 back for every point, a free camera for 3,400 points, a free plane ticket for 50,000 points, etc.).

There are various disadvantages of the current points based incentive programs. First, the rewards available for redemption are extremely limited. Typically, products available for redemption are generally products that are overstocked or outdated and are sitting in warehouses, either purchased by the sponsors at a discount or contracted by the warehouse vendors to help move the products. Therefore, majority of the members find themselves ordering products they do not need or do not find very appealing to burn the points before losing them or letting them go to waste.

Second, the redeemable price and the cost spent are generally disproportionate. That is to say, the amount the member must spend to accumulate a point is far greater than the point is worth when the time comes to redeem it. For example, many reward programs equate 1 point for every $1 spent. But, a typical rewards catalog will list a camera, for example, with a street price of $150 to be redeemable with 3,400 points. As another example, typical airlines equate 1 point for every 1 mile traveled. But, to obtain a free plane ticket to a destination within the continental United States, typical airlines require 50,000 points or more. Given that the distance between the east coast and the west coast is only about 3,000 miles; such an "incentive" does not necessarily encourage a consumer to become a member just for the reward. Even cash back reward programs typically only give back 1% of the amount spent, and many sponsors push to apply the cash back as credit against the bill or issue the cash as gift certificates.

Third, the redeeming process is extremely inefficient and inconvenient. The typical wait time between requesting for redemption of the points to actually receiving the reward is about 4 to 8 weeks, depending on the requested reward. Even when cash back is requested, the processing time generally takes about 4 to 6 weeks, especially when a check or gift certificate is to be issued. Because of the delay in the processing, the points total will not reflect the pending redemption amount until the points are redeemed. Accordingly, the offered "rewards" do not appeal to consumers who understand that the economics behind the rewards program are not only inconvenient but are not really incentives at all.

SUMMARY OF THE INVENTION

Accordingly, one aspect of this invention provides for a communication system with client devices in communication with at least one communication network. user data stores are also in communication with the communications network and store user data of users using respective ones of the client devices. offer data stores also in communication with the communications network store offers from merchants. A narrowcasting engine includes an active data gathering module to collect the user data, and an active learning module to generate a user profile based on the user data. The communication engine selects dynamically offers from the offer data store based on the profile, and communicates the selected offers in the offer data store to the users.

The user data collected by the active data gathering module can include demographic, behavioral, and preference data. The preference data can include a request for future reminders of past lost opportunities; and the behavioral data can include at least one of click-throughs, hovers, and search terms of offers presented on the client device.

In addition, the active data gathering module allows a user to participate in a preference game for obtaining preference data of the user.

Preference building can be accomplished by presenting questions and offers available to a user on a user interface, in which the questions and offers are dynamically created for the user based on initial user data. Answers to the questions are received through the user interface and processed to generate preference data of the user. Offers presentation can then be changed dynamically on the user interface in near real-time based on the preference data.

In some instances the initial user data is supplied by a network to which the user belongs. Such network could be a sponsor of a loyalty/rewards program.

Preference building can also be accomplished by presenting to a user a calendar interface that includes indicia for past offers from merchants. A selection interface then allows the user to designate past offers that the user wishes to be reminded of in future offerings.

Further, the profile generated by the active learning module includes a persona type, selected from a predetermined set of personas, for users. The profile can also includes an indication of a life stage of users.

The system can also extend to an offer datastore for storing offers from merchants and an offer ranking module for rank the offers in the offer datastore based on popularity. Merchants can also use an offer bidding module to modify the offers based on the rank of the offer from the offer ranking module.

The invention also encompasses a method for communication, including collecting user data of users in a user datastore; storing merchant offers in an offer datastore; generating a persona of users based on the user data; storing the persona in a persona datastore; segmenting the offers in the offer datastore based on the persona stored in the persona datastore; segmenting users into segmentation cells; matching the offer mixes with the user segmentation cells based on rules associated with each cell; and transmitting the offer mix to the users.

The rules can include at least one of suppression rules, designation rules, and offer mix integration rules and the offer mix integration rules determine which offers are to be combined to form the offer mix. the persona can be defined as before.

In addition, the invention extends to a system for creating a merchant offer that uses an enrollment module to solicit and receive merchant information and offer information; a heat map module to display on the client devices consumer activity on the communication network; and a datastore to store the merchant information and the offer information.

The display of the consumer activity generated by the heat map module includes a graphical representation depicting varying levels of activity over a period of time based on at least one of product, product type, and merchant. The graphical representation includes at least one of varying shapes, sizes, or color in proportion to the varying levels of activity.

The system also extends to a card transaction processing module that generates purchase transaction data associated with a payment card. This operates with an offer datastore including offers from merchants; and a transaction matching module that receives the purchase transaction data associated with the payment card and match the purchase transaction with the merchants in the offer datastore. A rewards module determines an incentive to be applied to the payment card based on any offer associated with the matched merchant and generates a qualified transaction data to be transmitted to an issuer of the payment card.

Also, the system can include an offer datastore including offers from merchants; and a registered card module to register payment cards to be used for a purchase transaction. These work together with a transaction matching module that matches the purchase transaction with the merchants in the offer datastore; and a rewards module that determines an incentive to be applied to the payment cards based on any offer associated with the matched merchant and generates a qualified transaction data to be transmitted to an issuer of the payment cards.

A card processing module can be added to determine the amount to be credited back to the payment cards identified in the qualified transaction data. Another addition is a statement generator that generates a card statement including itemized listing of the purchase transaction and the amount credited back to the payment cards. A points module can be used to convert a designated number of points into a monetary value and apply the converted monetary value to the purchase transaction. The points module could also convert a designated number of points into a monetary value and apply the converted monetary value to a saving account. Alternatively, the points module could convert a designated number of points into a monetary value and apply the converted monetary value to a charity account.

The invention also extends to testing a market segmentation by segmenting users into user segmentation cells, in which the user segmentation cells being associated with market segments. Messages including an offer mix are generated for the user segmentation cells associated with the users. Messages are then sent to a subset of the users associated with the user segmentation cells. These users' responses are then analyzed to identify a type of message eliciting a high response rate. The messages can then be refined based on the identified type of message; and the refined messages can then be sent to all of the users of the segmentation cells.

It is possible to generate a first message for a first subset of the users, and a different second message for a second subset of the users. Typically, the generating, sending and analyzing processes are repeated for a predetermine number of times.

Thus, the systems, sub-systems and methods of this invention have numerous facets, many of which can be combined in different configurations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 7-11 are views illustrating the testing and launch process according to the present invention;

FIG. 12 is a block diagram that illustrates active data gathering according to an exemplary embodiment of the present invention;

FIG. 16 is an exemplary web page illustrating intelligent questioning according to an exemplary embodiment of the present invention;

FIGS. 17A-17G are exemplary illustrations of the data collection process according to the present invention;

FIG. 19 is an exemplary profile of a persona in accordance with the present invention;

FIGS. 20-22 are exemplary illustrations of the various reports generated in accordance with the present invention;

FIGS. 25-30 show an exemplary embodiment of segmentation and preference gathering/learning according to the present invention;

FIG. 36 is an exemplary view of an offer rank module of the present invention;

FIG. 37 is an exemplary view of an offer bid module of the present invention;

FIG. 39 is a merchant workflow diagram of an exemplary embodiment of the present invention;

FIGS. 40A-40D are exemplary screenshots shown during an auto-enroll process in accordance with the present invention;

FIGS. 43A-43D are exemplary screenshots shown during a merchant setup process in accordance with the present invention;

FIGS. 44A-44E are exemplary screenshots of various merchant tools in accordance with the present invention;

FIG. 48 is a view of an exemplary registered card statement in accordance with the present invention;

FIGS. 56A-56F are exemplary views of a portal for accessing a rewards/loyalty program.

DETAILED DESCRIPTION OF THE PREFERRED EMBODIMENTS OF THE INVENTION

Figure 1A:
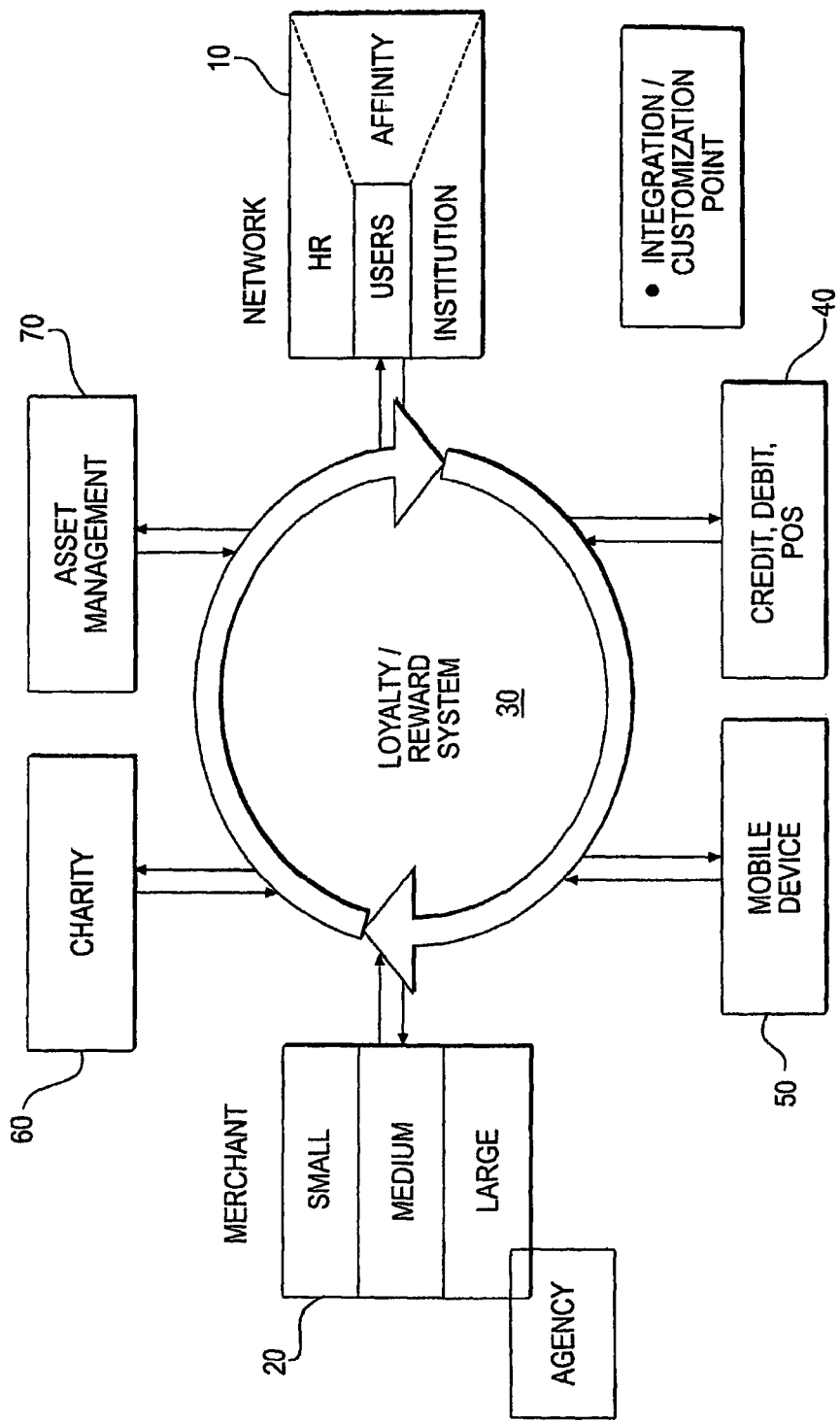
FIG. 1A is an overview of the various components of the present invention.

Reference will now be made in detail to the preferred embodiments of the present invention, examples of which are illustrated in the accompanying drawings.

Overview of the Narrowcasting System and Method

The present invention is directed to presenting relevant communications to relevant audiences at the relevant time. In particular, the system and method for narrowcasting is directed towards presenting communications in a discrete manner via closed-loop marketing. As used herein, "closed-loop" marketing refers to a marketing channel where a marketing campaign can be traced from its launch to the end user. The narrowcasting system and method of the present invention is directed to communicating relevant offers from providers of goods and services to relevant potential consumers at relevant times, although the system and method of the present invention may be applied to other venues and applications without departing from the scope of the invention.

Relevance of the communicated offers is only as accurate as the preference data provided by the users. While users provide some type of preference data to merchants, accurate preference data is difficult to obtain without an established trust. As mentioned above, prior art solutions of obtaining customer preference data have relied on formal surveys or questionnaires. Preference data elicited from these prior art mechanisms are generally of lower relevance and marketing value. By contrast, preference data provided by customers in affirmatively requesting for a specific merchant offer during the course of online shopping as a matter of customer service, for example, is highly relevant.

Accordingly, the present invention is directed to establishing a system and method that provides "customer service" experience to the users rather than the prior art approach of "selling" products and services to the users. To illustrate, in accordance with the present invention, a consumer that is shopping for a computer laptop may view an expired offer for a computer laptop from a specific merchant (e.g., Dell). The present invention allows for the consumer to request a reminder regarding similar offers in the future. At this point, the consumer has made an explicit request about a specific merchant offer regarding a specific product. Hence, similar offers in the future will likely result in a higher rate of purchase (i.e., a conversion rate). The higher the rate of conversion, the more profitable the customer interaction becomes, and the more valuable the marketing service is to the merchant.

As users realize that they are being "serviced" by relevant offers and/or choices at the most opportune times, trust is increased in the system's ability. As trust increases, usage of the system increases. In turn, as usage increases, more accurate preference data are obtained, which then act to provide even more relevant offers at more relevant times.

The present invention increases the "trust" aspect of the users' experience by leveraging the relationship already established between the users and their affiliated "networks" (e.g., employers, financial institutions, institutions, etc.) by implementing the system and method of the present invention on a "rewards/loyalty" platform. However, the system and method of the present invention may be implemented on other types of business models without departing from the scope of the invention. In the exemplary embodiment of the present invention, the system and method of the present invention operates on a rewards/loyalty platform of networks of which the users are already members, instant trust is already created between the system of the present invention and that of the users. Initial sets of data for the potential users (e.g., demographic, behavioral, preference information) are provided by the networks already in a trust relationship with the users, thereby making the initial preference analysis already highly relevant and accurate even before usage by the users. Therefore, the first impression of the system of the present invention to first time users is one of relevance and trust, thereby setting the tone for high usage.

While "relevance" of offers can increase usage by increasing trust, breadth (i.e., quantity) and depth (i.e., quality) of products and services available on the system are integral to increasing usage of the system. Moreover, as explained in the Background of the Invention, quality of the incentives as well as convenience of redeeming the incentives are also significant factors in increasing the usage of the rewards/loyalty program. In accordance with the present invention, the narrowcasting system of the present invention includes various payment and redemption modules to increase the usage of the rewards/loyalty program by benefiting the members, participating merchants, and the program sponsors alike.

FIG. 1A shows an overview of the various components of the present invention. As shown, the system of the present invention generally includes a user network 10, merchant network 20, and a loyalty/rewards system 30. As explained in detail below, the loyalty/rewards system 30 integrates with other existing components such as the credit, debit, point-of-sales (POS) systems 40, cellular phone systems 50, charity organizations 60, and financial/asset management systems 70.

Figure 1B:
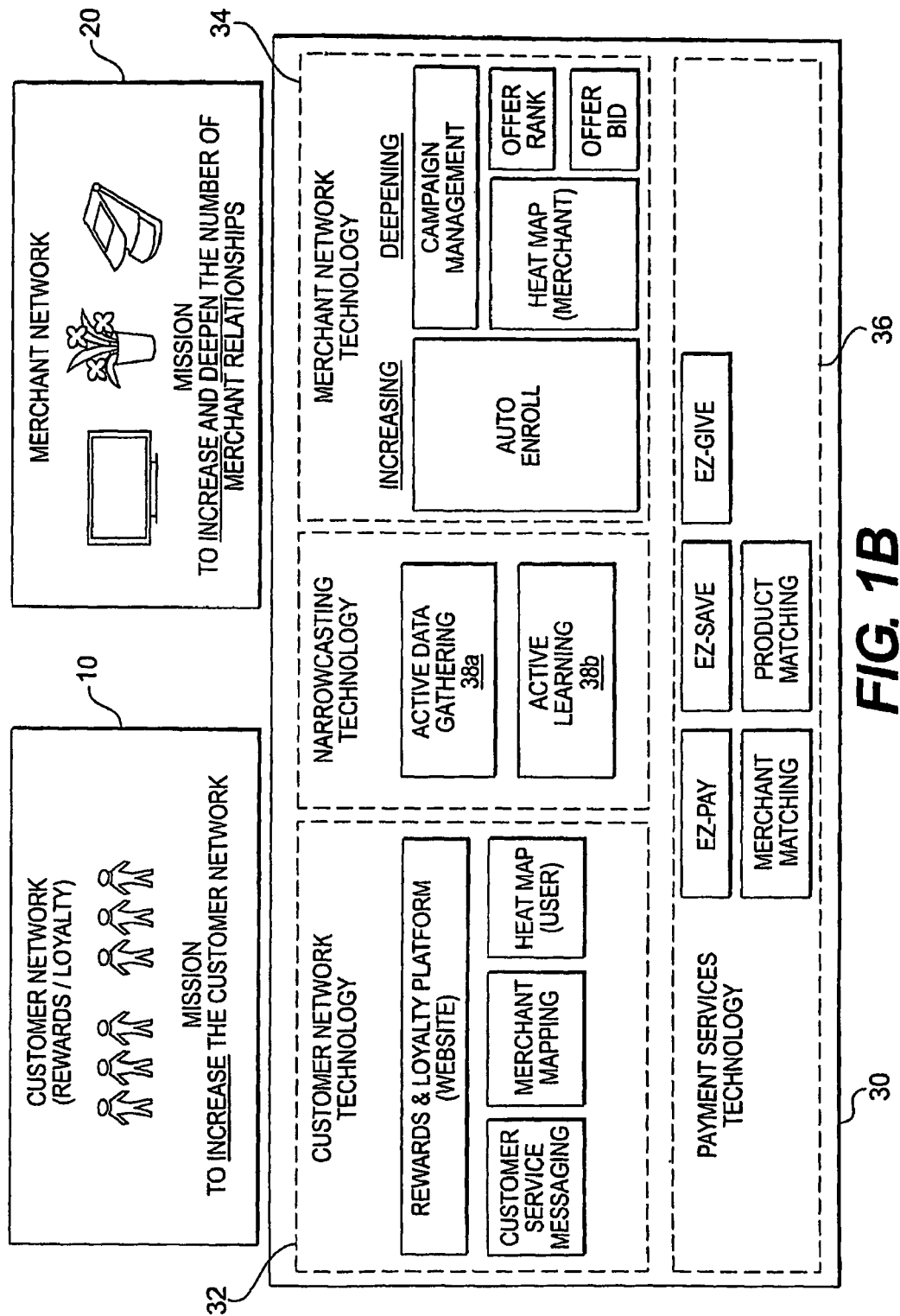
FIG. 1B is a block diagram view of the loyalty/rewards system.

FIG. 1B shows a block diagram view of the loyalty/rewards system 30 of FIG. 1A. As shown in FIG. 1B, the loyalty/rewards system 30 includes customer network technology component 32, merchant network technology component 34, payment services technology 36, and narrowcasting technology 38. Each of these components is described in more detail below.

Narrowcasting

"Narrowcasting," as used in the exemplary embodiment of the present invention, is a scientific approach to marketing using computer, behavioral, and statistical science to target a market. Narrowcasting is a communications model that provides the right product to the right customer at the right time through the right communications channel. The narrowcasting system and method of the present invention accomplishes this task by using information obtained from trusted relationships, explicit preferences designated by the users, and inferred behavioral preferences obtained by tracking users' activities to dynamically provide relevant offers at relevant times to the right users. Unlike prior art systems, the narrowcasting system of the present invention creates synthetic behavioral profiles referred to herein as "personas" with associated rules to match offers to the users. The matched offers are then sent via the most effective communications channel. An exemplary embodiment of the narrowcasting system and method of the present invention is described below.

Narrowcasting System

As shown in FIG. 1B, the narrowcasting system 38 includes an active data gathering component 38a and active learning component 38b. The details of these components are described with reference to FIG. 2.

Figure 2:
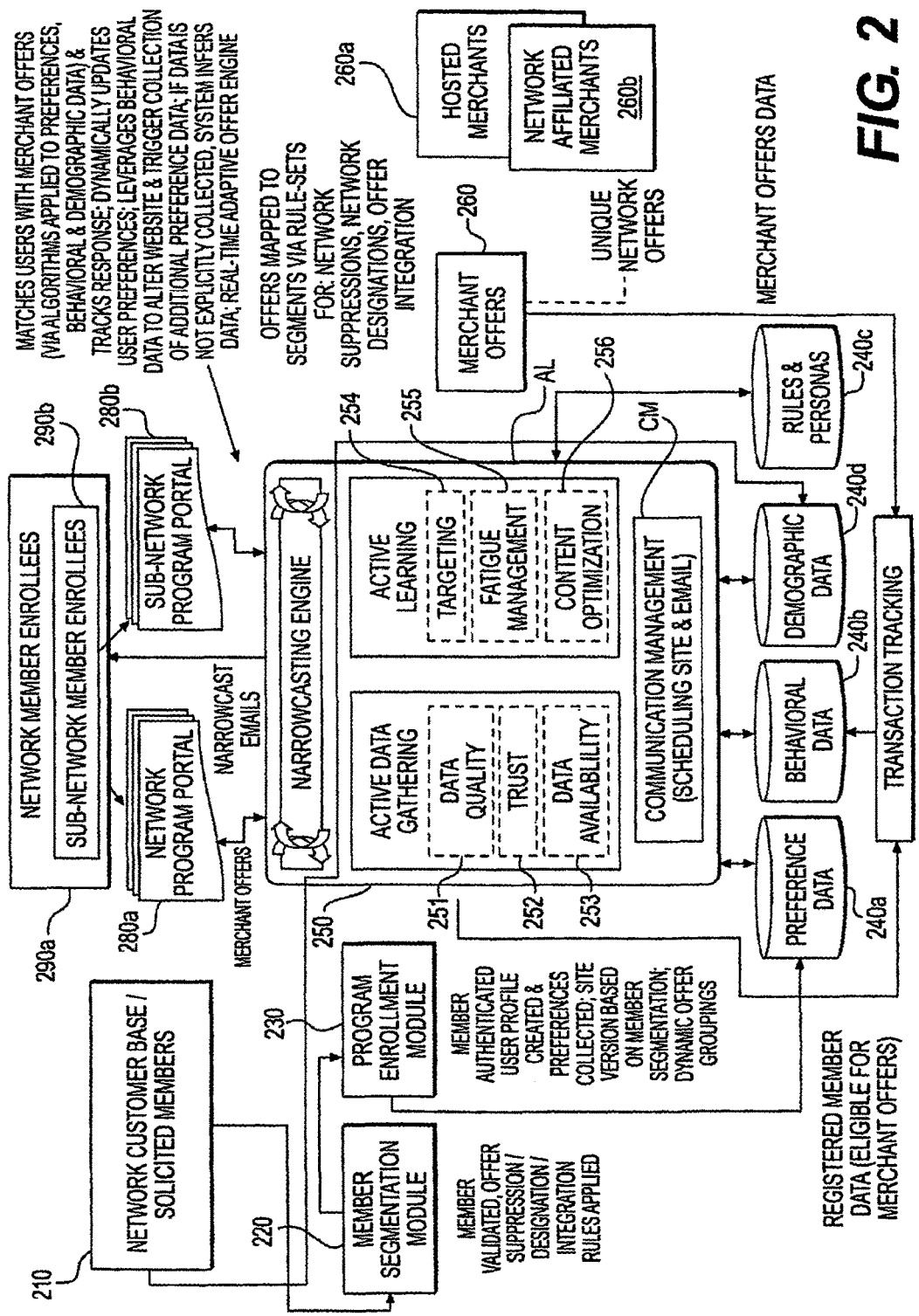
FIG. 2 is a system diagram illustrating an exemplary embodiment of the present invention.

FIG. 2 shows an overall diagram of an exemplary embodiment of the present invention. In its simplest form, narrowcasting engine 250 dynamically matches the most relevant offers from various providers of goods and services, referred to herein as "merchants," (260a, 260b) to the most relevant users enrolled with the narrowcasting system (290a, 290b) at the most relevant time. To accomplish this end, the narrowcasting system of the present invention includes various components.

As shown in FIG. 2, the narrowcasting system of the present invention includes a user network member database 210 and a merchant offer database 260. The term "user network" as used herein refers to a group to which the users belong. Examples of user networks include employers (i.e., HR), institutions (e.g., universities, credit card companies), affinity groups (e.g., trade groups), and other entities with members who are networked through the entity. Although not shown, networks register with the narrowcasting system of the present invention to setup narrowcasting services for their members. For example, the narrowcasting system 38 may be used by the networks to provide benefit services (e.g., perks, loyalty, or reward programs) to their members. The narrowcasting system 38 may provide the offers in the offer database 260 to the registered networks' members as network membership benefits. Accordingly, the network member database 210 contains information about the members provided by the registering networks including demographic and other personal information. Therefore, most of the users of the narrowcasting system 38 are members of a registered network. In another exemplary embodiment, access to the narrowcasting system 38 may also be granted to non-network members, such as network members' family members and associated individuals.

Merchant Offer Database

Merchant offer database 260 contains various offers, such as incentives and discounts, offered by various merchants (260a, 260b). In the exemplary embodiment of FIG. 2, merchants may be divided into two categories: (1) hosted merchants 260a, and (2) network affiliated merchants 260b. Hosted merchants 260a are a class of merchants who register with the narrowcasting system 38 to provide offers to the users. Network affiliated merchants 260b area class of merchants who have a working relationship with the members' networks. For example, a particular merchant (e.g., a flower shop) may be a sponsored merchant for a particular network (e.g., an affiliated credit card network) while another merchant (e.g., bookstore) has no affiliation with any of the member networks. Therefore, the sponsored merchant is classified as a network affiliated merchant 260b while the non-affiliated merchant is classified as a host merchant 260a.

Narrowcasting Engine

The narrowcasting engine 250 is a computer programmed to dynamically match the users (290a, 290b) with the offers in the merchant offer database 260 while updating and facilitating various transactions and activities provided by the narrowcasting system 38. In particular, the narrowcasting engine 250 is connected to a user preference data store 240a, a user behavioral data store 240b, rules/personas data store 240c, and a demographic data store 240d. The data stores 240a, 240b, 240c, and 240d may be any type of appropriate data storage device known in the art. The data stores 240a-240d may each be independent storage devices, sub-portions of a single storage device, or any combination thereof without departing from the scope of the invention. Moreover, the user preference data, behavioral data, rules/personas, and demographic data may be stored as flat files or as records in a relational database or databases without departing from the scope of the invention.

Demographic data includes personal information about the user, such as name, company, title, location, gender, age, marital status, etc. obtained from the network member database 210 and directly communicated by the users during an enrollment stage. Behavior data include such information as general interests, viewing and transaction activities on the system (e.g., click-throughs), and inferred specific items of interest of the user. The user preference data, as described in more detail below, are directed to specific requests from the users that indicate the users' future preferences. The narrowcasting engine 250 also dynamically updates the user preference data from users' activities, constantly supplementing the users' preference data with newly obtained information. The types of data and how they are obtained are explained in further detail below.

Based on the users' demographic, behavioral, and preference information, the narrowcasting engine 250 creates synthetic behavioral profiles (i.e., "personas") and stores/updates the profiles in the rules/personas data store 240c. Using the personas and rules associated thereto, the narrowcasting engine 250 selects the most appropriate offers from the offer database 260 for each of the users (290a, 290b) and presents the dynamically generated communications to the users (290a, 290b) through the network program portal (280a, 280b). Personas are explained in more detail below.

The narrowcasting engine 250 tracks users' activities on the system and dynamically updates user preference, behavioral, and demographic data into the appropriate data stores 240a, 240b, and 240d, respectively, based on the users' activities. Some of the activities facilitated and tracked by the narrowcasting engine 250 include user selections and viewing activities on the network program portal (280a, 280b). If the user takes advantage of the offers presented in the narrowcasted communication, the narrowcasting engine 250 tracks the users' transaction regarding the accepted offer through the transaction module 270.

Transaction Module

The transaction module 270 tracks the transaction between the merchant related to the accepted offer and the user to report the users' activities. The transaction module 270 also calculates the payments due to or from the networks, merchants, and to the narrowcasting system. The transaction module 270 is described in more detail below with regard to the registered card implementation.

Member Segmentation

The member segmentation module 220 processes information regarding the members to initially set up membership registration including assignment of member identification ("member ID"), membership validations, offer suppression/designation, etc. Upon log in, the registered members are then directed to the program enrollment module 230. The program enrollment module 230 creates and/or updates profile information of the user, such as designation of preferences as well as information missing from the network member database 210. The member segmentation module 220 and program enrollment module 230 are explained in further detail below.

As explained above, an exemplary embodiment of the present invention is a system and method of narrowcasting various offers and incentives to members of affinity groups/networks. For instance, one example is an employer sponsored portal accessible by an employee to access company benefits hosted by the narrowcasting system 38. Such employer-based portals may be set up, in part, to allow employees to obtain perks and benefits, such as negotiated discounts from affiliated merchants 260b, for example. Another example is a financial network, such as credit card companies, who set up portals accessible by card members to obtain loyalty rewards and perks.

To host such benefits programs, a network registers with the narrowcasting system 38 and provides information about their members. As explained above, member information is stored in the network member database 210. The member segmentation module 220 sets up member user access accounts by, for example, validating the member users, assigning member user IDs, and offer suppression/designation/integration rules. The offer suppression/designation/integration rules are a set of rules set by the user networks to suppress offers from specified merchants and/or service providers, to designate specified merchants and/or service providers to provide offers, and integrate various offers together for narrowcasting. An example of offer suppression is a sponsoring network (e.g., a product company) may not want their members to receive offers from their competitors. An example of offer designation is a sponsoring network (e.g., a credit card company) may want their members to specifically take advantage of offers from affiliated merchants.

Figure 3:
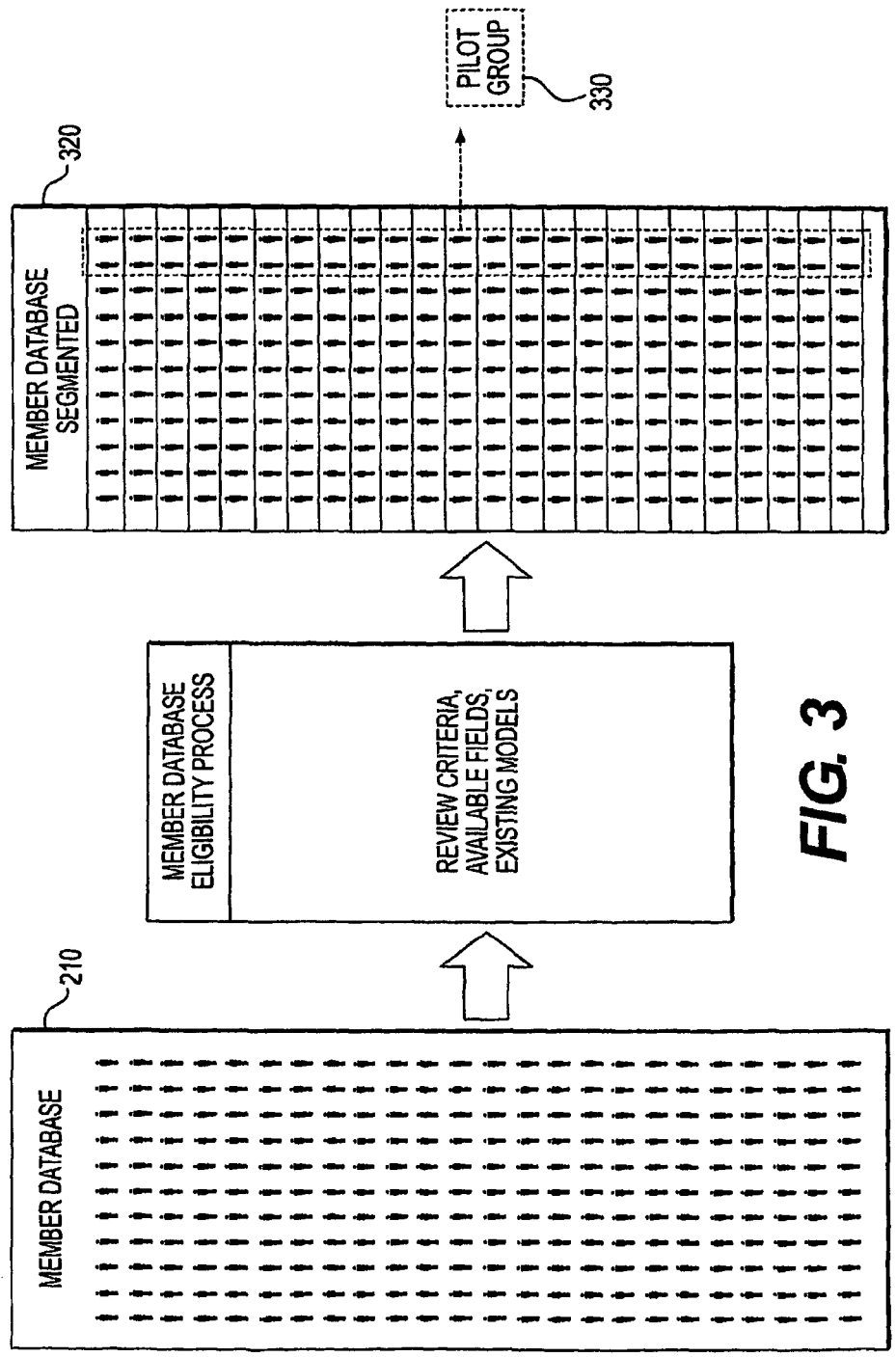
FIG. 3 is a block diagram illustrating member segmentation.

More specifically, as shown in FIG. 3, the member segmentation module 220 obtains members' information from the network member database 210. Member data generally includes demographic data and preference data provided to the user network. For instance, if the user network is an employer-sponsored website for its employees, the employer already has substantial information about the employee, such as name, address, and position data. If the user network is a credit card company, the credit card company has the card member's information, such as name, address, income, and credit history including debt information. Moreover, credit card companies may also have past purchase history information collected from their members' interaction with specific merchants and special interest areas, such as interest in electronics, music, sports, etc. The level of detail of the members' information depends on the nature of the user network.

The member segmentation module 220 processes the member users' data based on the demographic and preference data using eligibility rules and existing marketing models to create a market segmented member database 320. In particular, for descriptive purposes only, each horizontal row of the segmented member database 320 represents members associated with a particular market segment based on their demographic and preference information. As explained further below, this segmentation is dynamically adjusted as the users' preference information changes over a period of time. The initial segmentation is made based on rules and models applied to the information provided by the networks.

Member Enrollment

To create more accurate segments of members, the members are directed to access program enrollment module 230 through an enrollment website, for example, to create, update, and/or supplement the members' information obtained from the user network. Additional and/or missing demographic and preference data may be collected through the program enrollment module 230 to supplement the data from the member user database 210. The gathered preference and demographic data are stored in the user preference data store 240a and the user demographic data store 240d, respectively.

Pilot Groups

Once the segmented member database 320 is populated, a pilot group 330 of the segmented member database 320 is generated. The pilot group 330 is a sampling of members across all the market segments (denoted in the vertical dotted line) to obtain a workable subset that accurately represents the entire collection of members. This pilot group 330 is processed to create initial rules and member cells to be tested and verified as accurate representation of the members' personas, the process of which is explained further below. Once the sampled set of members in the pilot group 330 has been validated, the determined rules and personas are applied to the entire body of members.

Figure 4:
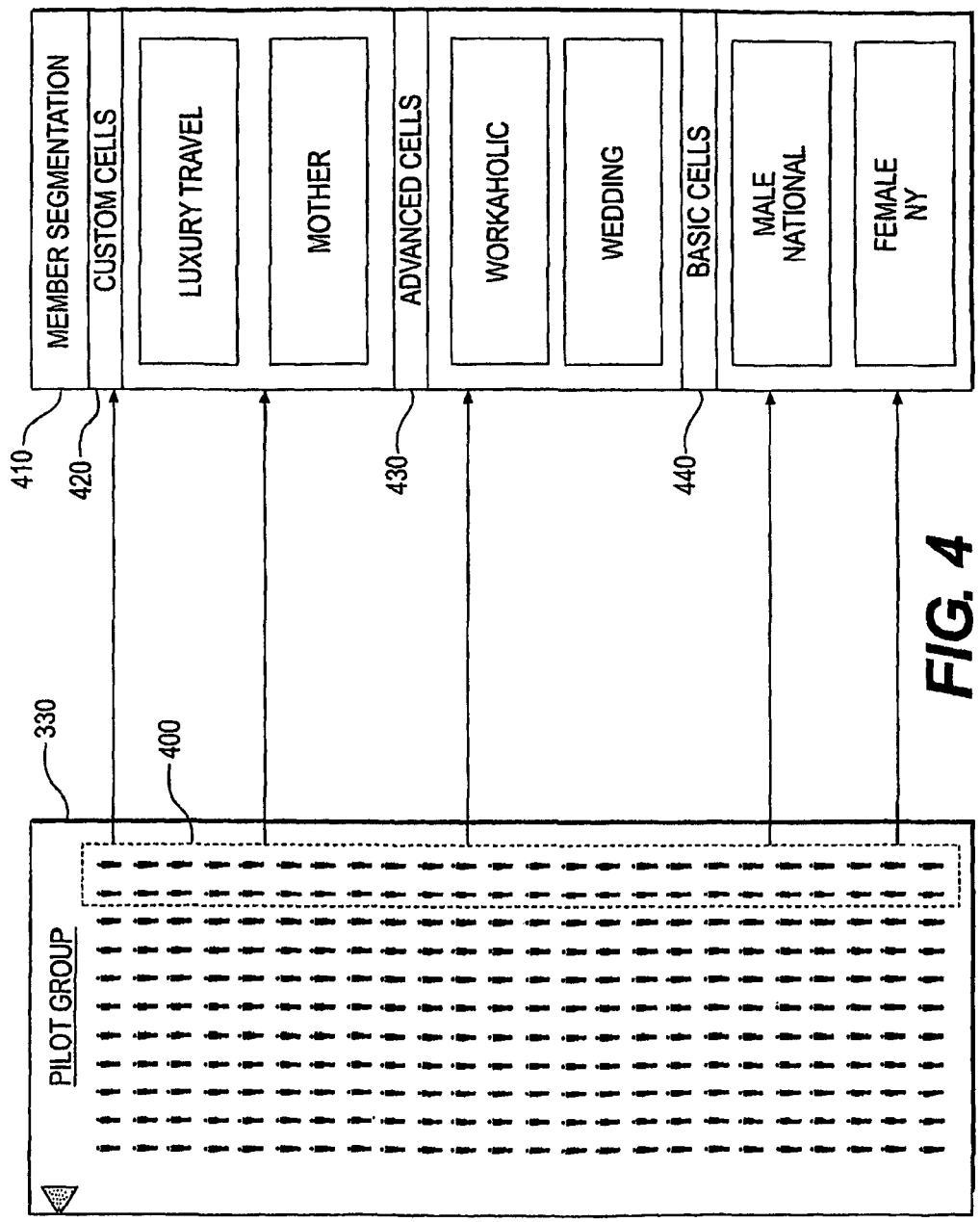
FIG. 4 is a block diagram illustrating segmentation cells.

As shown in FIG. 4, a sample subset 400 of the pilot group 330 is used to create member segmentation cells 410. Member segmentation cells 410 are generally categorized into three types of cells: (1) custom cells 420, (2) advanced cells 430, and (3) basic cells 440. Custom cells 420 refer to member segmentation categories with rules customized in accordance with the directions from the affinity group or network for select members. For example, a credit card company may want to categorize certain segments of its members as "luxury travel" members. As another example, an employer may want to categorize certain segments of its employees as "officers."

Advanced cells 430 are directed to member segmentation categories and associated rules generated by the narrowcasting system 38. Advanced cells 430 are created based on demographic, preference, and behavioral data collected about the members. For example, a certain combination of demographic, preference, and behavioral data suggests that a particular segment of member users are "workaholics" while another segment of member users are preparing for a "wedding."

Basic cells 440 refer to member segmentation categories generated from basic demographic information. For example, one basic cell may be designated as "males" in the "national" region while another basic cell may be designated as "females" in the state of "New York." Specific segmentation cells are generally created based on the needs of the network and the benefit services it wants to provide for its members. However, segmentation cells may be created as marketing testing beds for merchants requesting to move certain types of items, for example. This process will be explained in further detail below.

Once the member segmentation cells and associated rules have been determined, the members in the sampled subset 400 of pilot group 330 in the segmented member database 320 are assigned to appropriate member segmentation cells. A member user may be associated exclusively to a particular cell or end up being associated to multiple cells based on the segmentation rules. The member segmentation cells and rules associated thereto are stored in rules/personas data store 240c (FIG. 2).

Offer Segmentation

The member segmentation cells 420, 430, and 440 have associated rules that decide which offers in the offer database 260 will be associated with which segmentation cell. As explained above with respect to FIG. 2, the offer database 260 is populated with various types of offers from hosted merchants 260a and network-affiliated merchants 260b. As explained above, network-affiliated merchants 260b may be groups of merchants that provide unique offers to members of particular networks due to their affiliation to the particular network. For instance, a particular employer may have a negotiated discount with a specific clothing store for its employees to encourage loyalty to that particular clothing store. As another example, a particular credit card company may have negotiated incentives with a particular merchant if the member user uses the particular credit card to transact with the merchant. Other merchants who wish to use the narrowcasting system of the present invention to provide various offers to the member users are generally classified as hosted merchants 260a with no particular affiliation to the user networks.

Figure 5A:
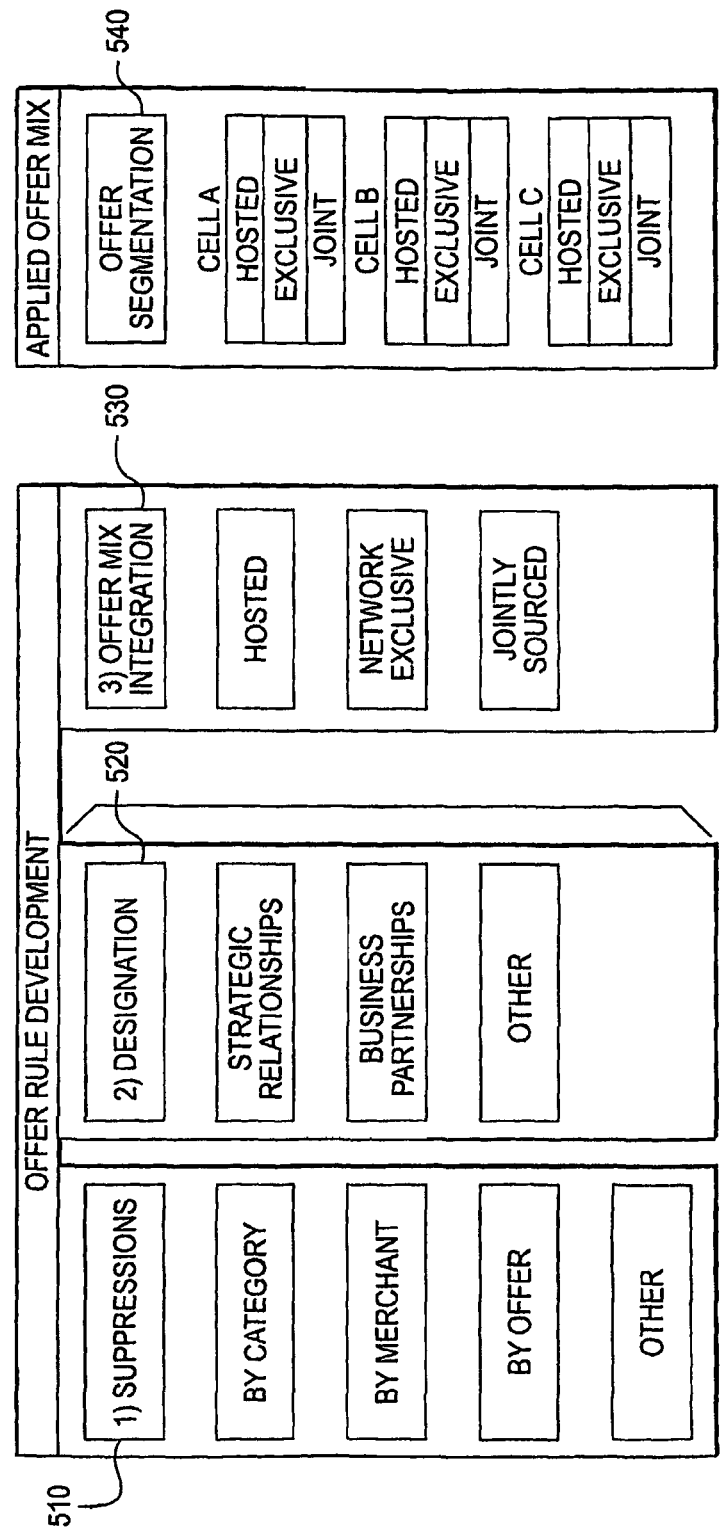
FIGS. 5A-5B are block diagrams illustrating offer segmentation and an exemplary offer mix.
Figure 5B:
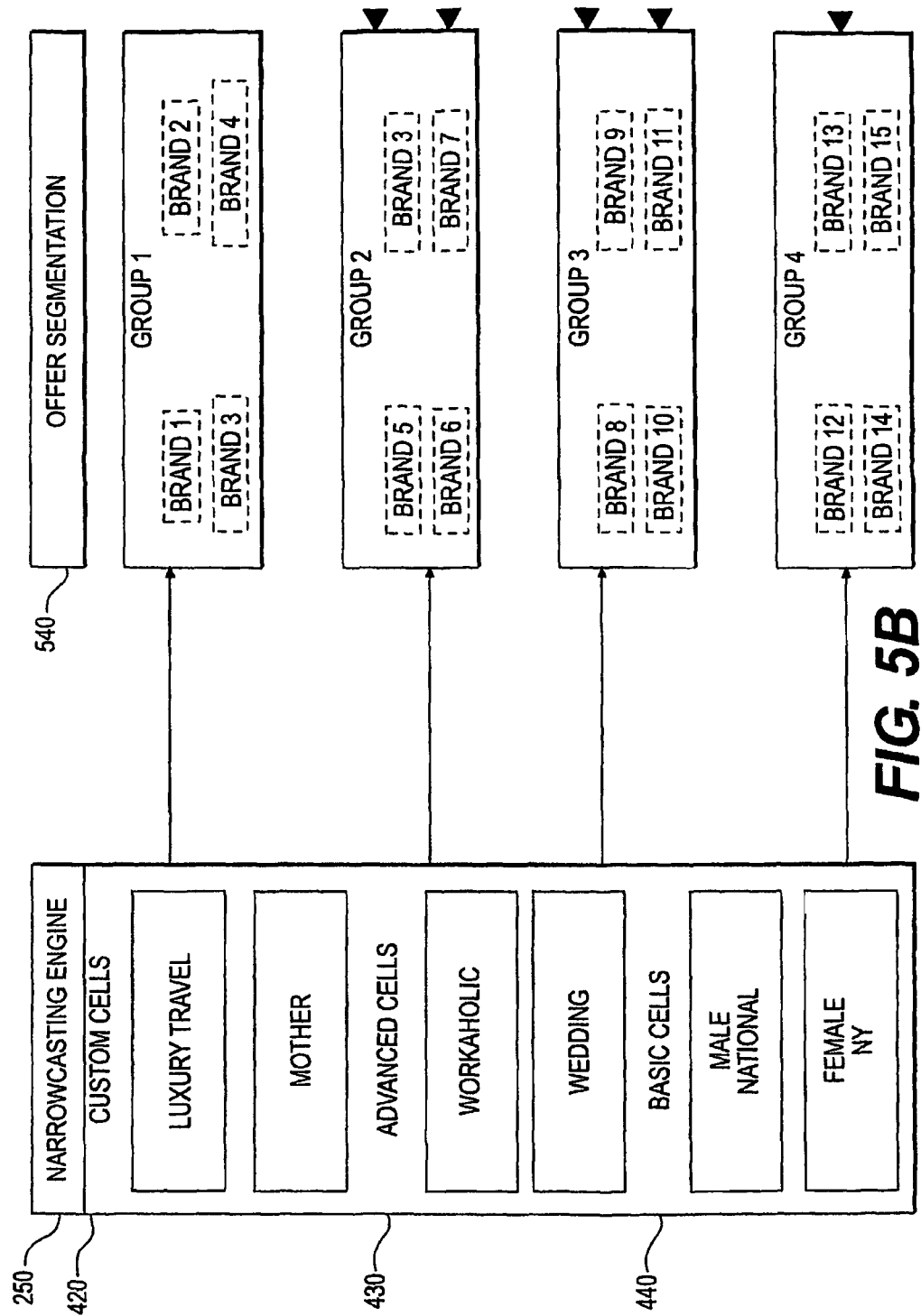

The offers in the offer database 260 undergo offer segmentation based on rules stored in the rules/persona data store 240c. As shown in FIG. 5A, various rules may be applied to segment the offers. in the offer database 260. For example, the offer segmentation rules may include suppression rules 510, designation rules 520, and offer mix integration rules 530. In particular, the networks may have reasons to exclude certain offers from being made available to their members. Some examples of suppression rules 510 may include suppressing certain offers from being assigned to specified segmentation cells by categories (e.g., offers related to "flowers"), by merchant (e.g., competitors), by offers (e.g., "instant rebates," "free shipping"), and other suppression criteria requested by the user networks. Conversely, networks may have reasons to specifically designate certain offers to be made available to their members. Some examples of designation rules 520 may include offers based on strategic relationships, business partnerships, and other designation criteria requested by the affinity groups/networks. The offer mix integration rules 530 determine which offers are to be mixed together to form an offer mix. For example, offer mix integration rules 530 may designate certain hosted offers, network exclusive offers, and jointly sourced offers into an integrated mix of offers. The offer mix resulting from the offer mix integration rules 530 are segmented and designated to specific cells in the offer segmentation module 540.

More specifically, the narrowcasting engine 250 (FIG. 2) matches various offer mixes resulting from the offer mix integration 530 with the member segmentation cells 420, 430, and 440 based on the rules assigned to each cell stored in the rules/persona data store 240c (FIG. 2). FIG. 58 shows exemplary offer segmentations matched with some of the exemplary member segmentation cells.

Branding

Figure 6A:
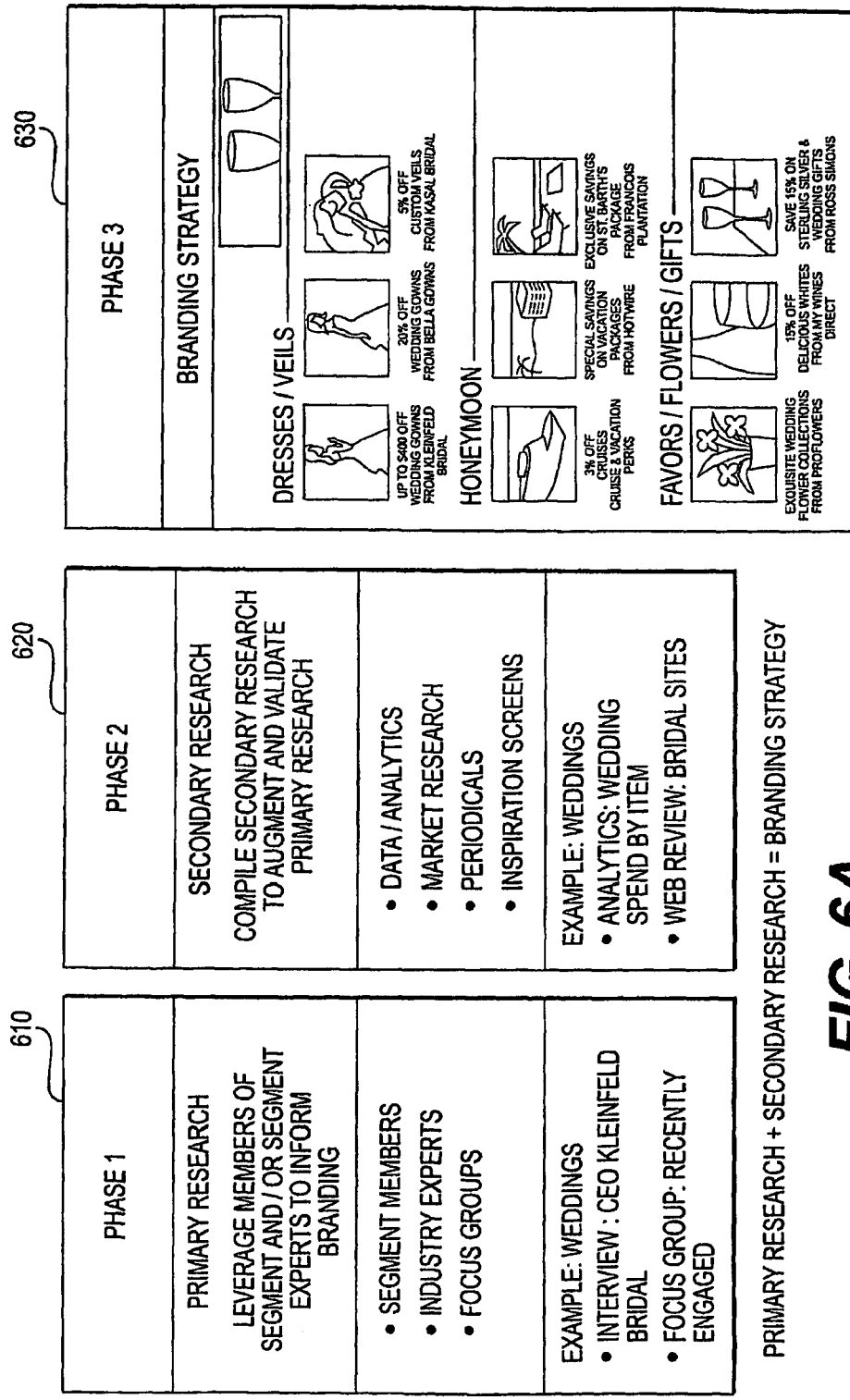
FIGS. 6A-6B are block diagrams illustrating a branding approach and an exemplary branding result.

To draw interest and make an impression of relevance to the members who wish to enroll and eventually use the programs created by the narrowcasting system of the present invention, the narrowcasting system 38 provides branded site customization for each member based on their affiliated network and assigned segmentation cells. The narrowcasting system 38 applies branding strategies based on a two-phase approach. For example, as shown in FIG. 6A, Phase 1 block 610 compiles results from primary research to leverage members of the segment and/or segment experts to obtain informed branding. Research is conducted by posing various preference questions to member users associated with the member segment for which the branding strategy is being built. Some examples of primary research resources include feedback from segment members, information from industry experts, and opinions from focus groups.

Figure 6B:
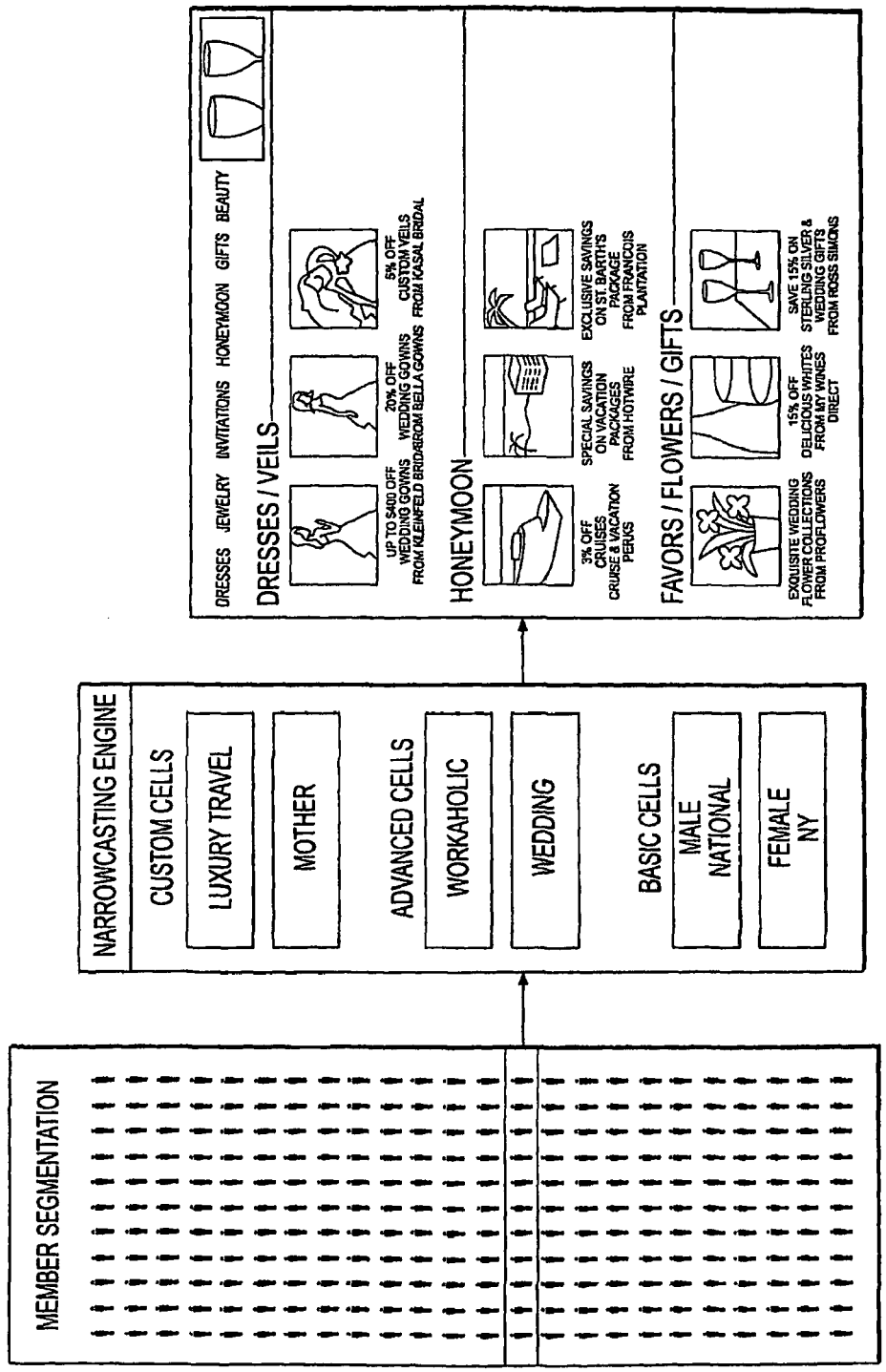

In Phase 2 block 620, results from secondary research are compiled to augment and validate primary research results. Some examples of secondary research resources include data/analytics, market research, industry periodicals, and inspiration screens from other websites. The results of Phase 1 and Phase 2 are combined to obtain a branding strategy 630. FIG. 6A shows an example of the branding approach using the "Weddings" member segment. As shown in FIG. 6B, the obtained branding strategy for a member segment (e.g., "Weddings") is associated with a segment cell. Thereafter, the obtained branding strategy is applied and provided to members who are associated with the segment cell.

CABR (Credibility, Affinity, Benefit, and Redemption)

Figure 7:
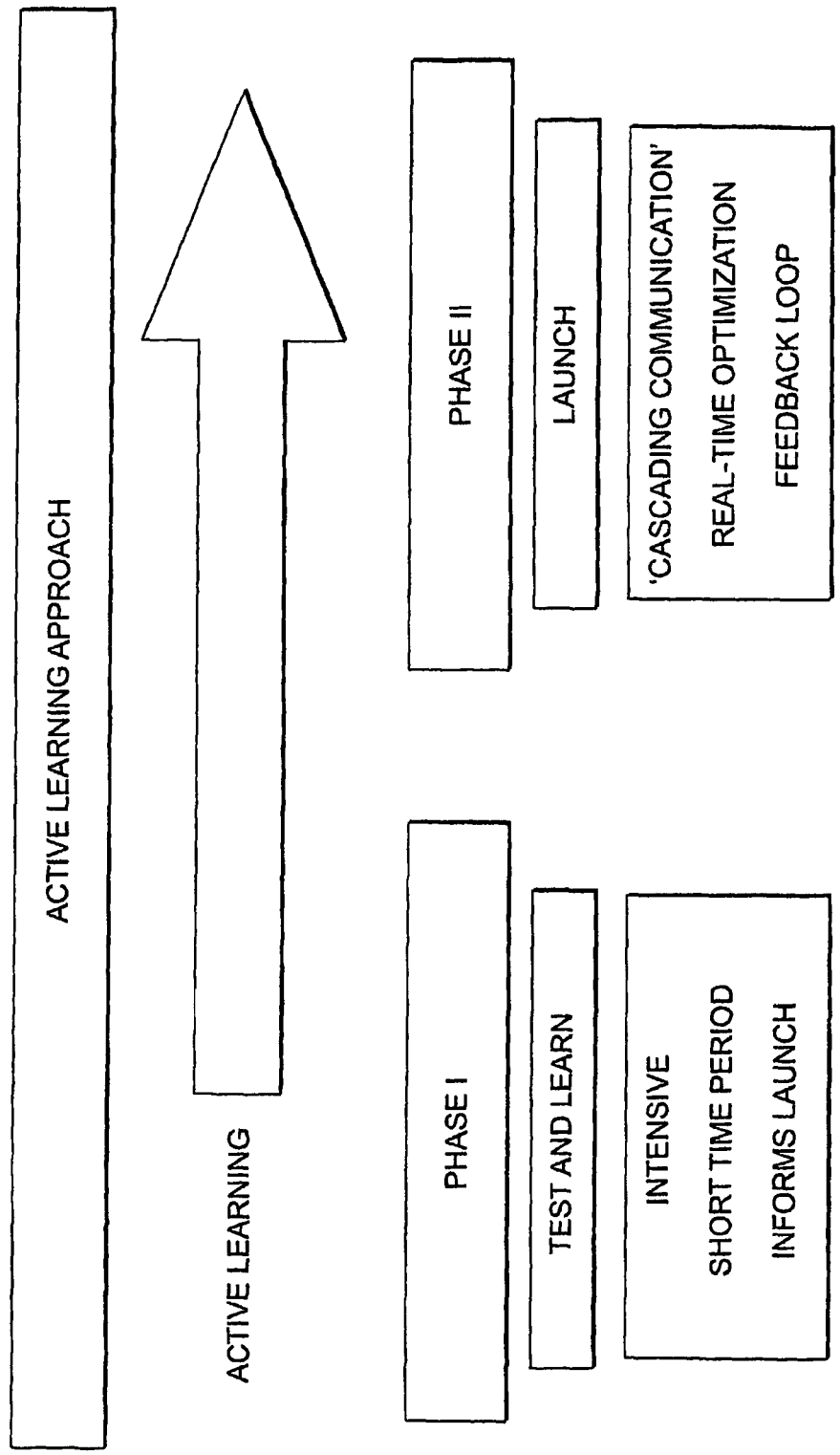

Once members and offers have been segmented, the narrowcasting system 38 tests the segmentations using the active learning approach. The active learning approach according to the present invention includes a two phased approach. As shown in FIG. 7, the first phase (Phase I) includes testing a sampling of members and teaming their response to the offer segmented mix developed for the segments associated to the tested members. The responses are analyzed and results are "learned". for refinement. The results of Phase I are applied to Phase II which includes launch of the programs and initiatives developed by the narrowcasting system using real-time optimization and feedback loop.

Figure 8:
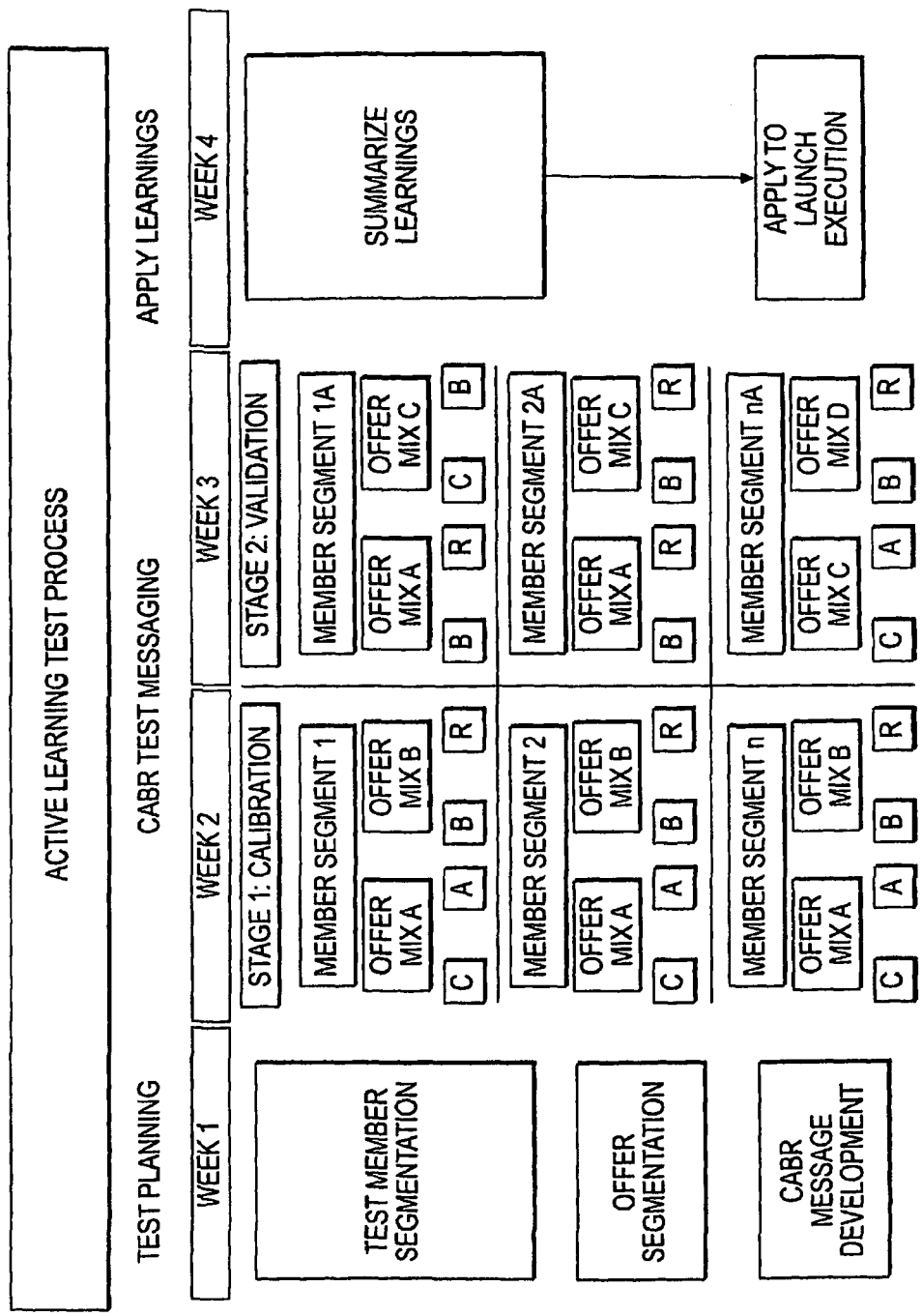

FIG. 8 shows Phase I of the active learning process according to the present invention. In the test planning stages of Phase I, test member segmentation, offer segmentation, and CABR messages are developed for each segment of the test members. "CABR" stands for credibility, affinity, benefit, and redemption. "Credibility" messages focus on the networks' value-proposition, business model, and/or third party validation (e.g., review articles from reputable entities). "Affinity" messages focus on the relationship between the members and their networks. "Benefit" messages focus on value-added offers. "Redemption" messages focus on how to redeem the offers emphasizing on ease, time-savings, and convenience. The following are examples of CABR messages directed to the same benefit program:

Credibility—"You already enjoy the many benefits that only [Network] members have access to, now you have another—the ability to save 10%-70% at your favorite brand name merchants every day through the [Network's] program."

Affinity—"Because you are a valued [Network] member, you're eligible to enjoy savings of 10%-70% at your favorite brand name merchants every day, as well as gain access to private events and product launches through the [Network's] program."

Benefit—"Visit the [Network's] program today and save 10%-70% at your favorite brand name merchants every day."

Redemption—"Save 10%-70% at your favorite brand name merchants every time you purchase—simply by making your purchases through the [Network's] program."

CABR messages are messages that emphasize one of the four categories to determine what type of messages the users in each of the segmented cells respond to more readily. For instance, users in a particular segmented cell may respond to messages geared towards "credibility" and "redemption" while users in a different segmented cell may respond better to messages geared towards "affinity" and "benefit."

Once the test planning is complete, the developed CABR messages are sent to the test member segments with various offer mixes determined from the offer segmentation in the calibration stage. The purpose of the calibration stage is to gather response data from the test members receiving the CABR messages. Once the responses have been gathered and analyzed, a second CABR message is sent with different offer mixes in the validation stage. The purpose of the validation stage is to verify the results of the analysis gathered during the calibration stage and to further refine the CABR messages based on the responses during the validation stage. FIG. 9 shows in more detail examples of the calibration and validation CABR messaging.

In the last stage, all of the data gathered through the calibration and validation stages are analyzed and summarized. The information learned during the testing stages is then incorporated into the launch of the messages to all of the members. Depending on the learning, launch methodology is tailored for each member segment. For instance, FIG. 10 shows an example of launching email messages to the members in segments A-J based on the learning. As shown, messages related to launch of messages for members of segment A may include a teaser, invitation 1, and invitation 2 in successive periods. For members of segment B, the teaser and invitation 1 messages are sent in successive periods with a delayed invitation 2 message by one period.

Figure 11:
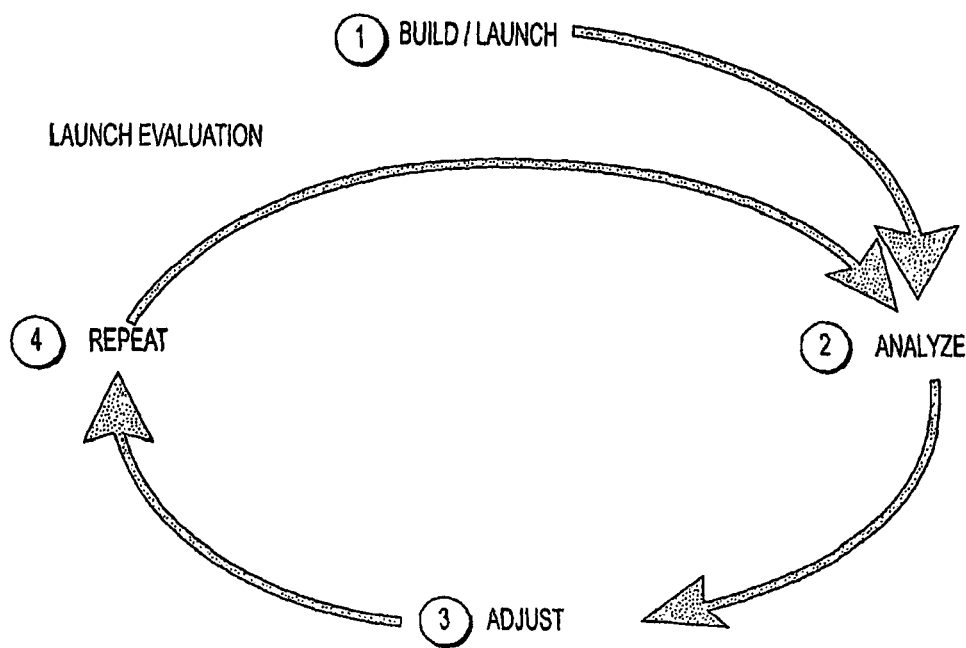

In this way, the narrowcasting system 38 dynamically gathers, analyzes, and adjusts the effectiveness of each narrowcasted message. As shown in FIG. 11, the narrowcasting system of the present invention uses the active learning process in a continuous feedback loop to build/launch, gather, analyze, and refine each narrowcasted message such that the next message is more accurate and effective in eliciting responses from the users.

"Active Data Gathering" (ADG) and "Active Learning" (AL)

Having described some of the components of the narrowcasting system of the present invention, the narrowcasting communications in accordance with the present invention is implemented using a two-prong approach to target the right product to the right person at the right time: (1) active data gathering, and (2) active learning model. To this end, using artificial intelligence, for example, the narrowcasting engine 250 (FIG. 2) includes an active data gathering ADG and active learning AL that performs the active data gathering process and the active learning process to obtain future buying data of each member.

As shown in FIG. 2, the active data gathering includes three aspects: (1) data quality 251, (2) trust 252, and (3) data availability 253. The data quality 251 is directed to the effectiveness of particular data elements in regard to predicting future buying behavior (i.e., "forward looking" data). For example, reminder data has the highest data quality, while behavioral click data is of a lower quality.

The trust 252 is directed to the quantity of preference data per user and works to increase the amount gathered per user. As used herein, "preference" data refers to data that is communicated by the user to indicate future buying preferences. The most trusted communications are those that have been specifically requested by the user. Therefore, preference data are the highest quality data to determine the most relevant offers for the user. For example, reminder data is used to send emails to members, alerting them to the offer that they asked to be alerted about. Untargeted marketing emails diminish trust, in that the user may stop believing that giving preference information will result in a more relevant and customized experience. For this reason, preference data is preferably gathered continually so as to maintain trust. One process used to gather preference data is called "intelligent questioning." Intelligent questioning, described in further detail below, uses algorithms from the active learning AL to infer a user's preferences and gives the user an opportunity to confirm those inferences. For example, the active learning AL may infer that a particular user is likely to be interested in purchasing at a particular merchant. The narrowcasting engine 250 will confirm this inferred preference by dynamically presenting the user with a preference question (e.g., a reminder) about that merchant and detecting the user's reaction.

The data availability 253 is directed to evaluation of raw data and ensures that the data is normalized for marketing purposes. For example, reminder data is binary (i.e., the user accepts or rejects the offered reminder) and therefore can be easily used, while suggestion and search data (e.g., names of products, merchants, etc.) must be normalized before use.

The active learning AL includes three aspects: (1) targeting management 254, (2) fatigue management 255, and (3) content optimization 256. The targeting management 254 is directed to control and tracking of response rates to various algorithms for inferring a user's interest in a particular merchant. Important factors in generating high response may include recency of data and customer type. Recency is a rating of how "old" the data is. The more recently the data is collected, the higher quality the data is and the stronger the response rate. Customer type is a classification of the shopping patterns of a user. For example, "type A" customers may be defined as people who are infrequent shoppers but spend a large amount when they do shop. "Type B" customers may be defined as people who shop frequently but spend less during each purchase. Based on the customer type, a user will be marketed to accordingly. Additional factors may be incorporated into the targeting management 254, such as behavioral and demographic data. The fatigue management 255 is directed to monitoring of response rates of individual users and alters the frequency of communication to that user. The content optimization 256 is directed to testing and monitoring of response rates of users to messages with different CABR positionings described above. These aspects of the active learning module AL combine to optimize response rates.

For example, a typical "type A" customer may be an investment banker and a typical "type B" customer may be a bank teller. The investment banker (type A) is extremely busy and has little time available to read marketing messages. Accordingly, the fatigue management 255 is used to limit the quantity of emails to this user to only the most relevant offerings resulting in infrequent, but highly responded to emails. The bank teller (type B), by contrast, will receive more frequent and consistent emails, as they tend to enjoy reading the messages and enjoy a variety of offers. The content optimization 256 is used to determine that the "Credibility" and "Redemption" messages (from the CABR framework described above) are most effective for "type A" as these customers desire assurance of quality and a fast redemption while "Benefit" messages are most effective for "type B" as these customers are frequent shoppers with the knowledge and time to price-compare. In this manner, the active learning AL "learns" to optimize response rates for individual users.

Communication Management

The communication management CM is directed to managing the schedule of the narrowcasted communications, such as email and website communications sent to the users. The communication management CM is used to interface with the active learning AL to match users and offers, for example, and is used to interface with the active data gathering ADG to determine what additional preference data should be gathered from a particular user, for example.

FIG. 12 illustrates the data gathered during the active data gathering process according to the present invention. As shown in FIG. 12, the active data gathering process of the present invention includes obtaining data about each member provided by the networks and the merchants obtained directly from the members. These explicit data include information such as names, physical addresses, email addresses, gender, age, and specified preference information that is obtained during registration and completed transactions. The active data gathering process also includes obtaining data inferred from members' activities on the narrowcasting system of the present invention. For instance, gender and location information may be inferred based on activities and choices made by the members while accessing their portals. For example, if the user searches for items and offers generally attributable for males (e.g., men's clothes, men's shoes, power tools, electronic gadgets, etc.), the narrowcasting engine 250 may infer that the user is a male. If the user searches or selects items and offers from walk-in stores in a particular region, the narrowcasting engine 250 may infer that the user lives in that particular region. In this example, it is possible that the user is a female in one region who is looking for a gift item for a male who lives near the stores of interest. Accordingly, the active data gathering process according to the present invention is performed on a continual basis, constantly updating the users' activities to modify the explicit and inferred data to obtain an accurate profile. As more information about the user is gathered, the information presented to the user, including preference questions and offers, is refined to be more relevant to the user. As the information presented to the user becomes more relevant, the user is induced to provide more information about the user as the user will spend more time viewing and selecting the information presented, thus triggering even more preference data gathering about the user. Therefore, this feedback loop continues to allow a significant amount of preference data gathering of the user.

Figure 13:
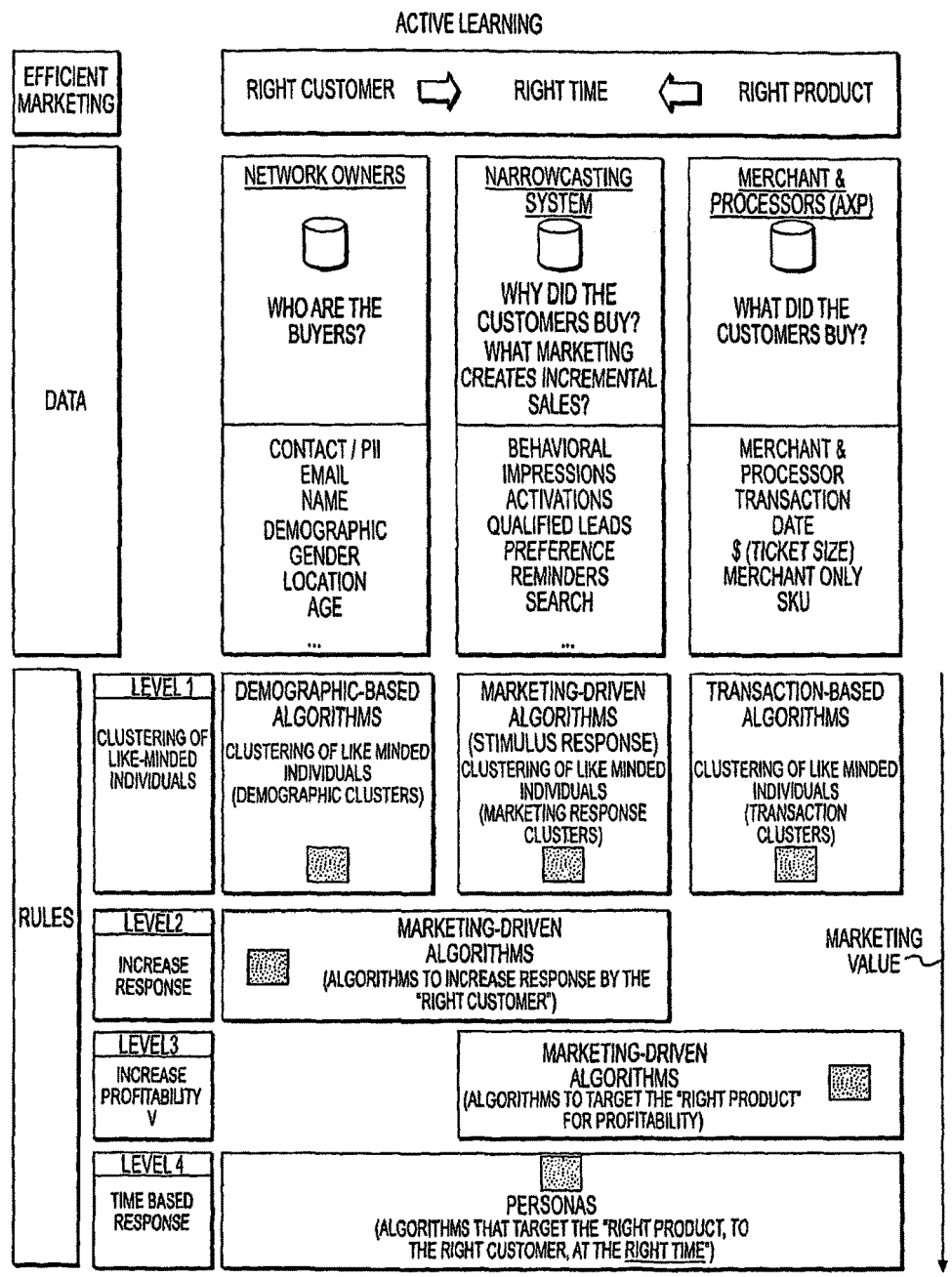
FIG. 13 is a block diagram that illustrates active learning according to an exemplary embodiment of the present invention.

FIG. 13 illustrates the active learning model according to the present invention. The narrowcasting system of the present invention takes the traditional marketing approach used by networks, which traditionally identifies "who" the buyers are, and approaches used by the merchants, which traditionally identifies "what" the consumers buy, and optimizes the effectiveness of a marketing campaign by identifying "why" a buyer purchases a particular product.

In particular, as shown in FIG. 13, networks typically collect demographic data and cluster like-minded individuals based on their demographic data (i.e., "demographic clusters"). Accordingly, the networks use demographic-based algorithms to target information to the users. On the other hand, merchants typically collect transactional data and cluster like-minded individuals based on their transaction data (i.e., "transaction clusters"). Accordingly, the merchants use transaction-based algorithms for their targeted marketing initiatives. In contrast, the narrowcasting system of the present invention combines the demographic clusters from the networks with their marketing response (i.e., "marketing response clusters") to increase the response from marketing initiatives from the right customer. Additionally, the narrowcasting system of the present invention combines the transaction clusters from the merchants with the marketing response clusters to target the right product for profitability.

Moreover, the narrowcasting system of the present invention leverages the demographic clusters and the transaction clusters with the marketing response clusters to create "personas" that target the right product to the right customer at the right time. The active learning module AL leverages known user data (i.e., preference, behavioral and demographic data) to infer a particular user's future buying preferences. For example, based on personas and other segmentations, it is inferred that a certain user, such as a member of the persona or segment, will have interest in a particular merchant. To confirm this interest, the active data gathering module ADG may dynamically present the user with a preference question (e.g., a reminder) or with an offer (e.g., a prominent link on the website portal or email) and monitor if the user responds. In this manner, the system uses behavioral data to infer a user's future buying preferences and uses the website to confirm that interest, generate more preference data, and refine the algorithm.

Communications

As shown in FIG. 2, based on the results of the active data gathering module ADG and active learning module AL, the narrowcasting engine 250 controls two types of communication: direct and indirect communications. Direct communications refer to narrowcasted communications, such as emails, based on preference data (i.e., "forward looking" data). All communications sent by the narrowcasting engine 250 are targeted, but direct communications, such as emails, leverage the highest quality data—i.e., preference data—which is most predictive of future purchasing behavior. These messages build trust, as they are "customer service" driven (i.e., responding to a users request) and help to generate more preference data. Indirect communications are communications, such as newsletters and website personalization (i.e., website placements) that are based on behavioral data (i.e., "looking back" data). Indirect communications may be used to drive users to the portal website and capture additional preference data.

Preference Building

The narrowcasting system of the present invention collects and builds preference profiles of a user in a continuous, dynamic process. The narrowcasting system of the present invention employs several mechanisms for collecting and building user preference profiles. As already described above, the narrowcasting system of the present invention initially obtains highly specific and relevant information from the networks who register with the narrowcasting system of the present invention to host benefit programs for their members (i.e., network member database 210). As briefly described with reference to FIG. 2-4 above, building the initial preference profile of the member user according to the present invention begins with member user's data that is already comprehensive and reliable.

As a preface to describing the preference building aspect of the present invention, it is important to note that because users of the present invention are members of the registered networks, the users' demographic data are more detailed and reliable than those collected by prior art systems. Some examples of networks include employers, financial institutions, such as banks, lenders, and credit card companies, and other trusted groups, such as trade groups (e.g., American Automotive Associations) and institutional organizations (e.g., American Bar Association). Because the narrowcasting system of the present invention provides network members access to offers from hosted/affiliated merchants and service providers, the network provides member information to the narrowcasting system of the present invention to provide benefit services for their member. Accordingly, the narrowcasting system of the present invention begins with data that prior art systems strive to obtain.

As described above, member information provided by the networks is analyzed and segmented and stored in the user preference data store 240a and the user demographic data store 240d along with member segmentation rules stored in rules/personas data store 240c. The narrowcasting engine 250 uses the data in the user preference data store 240a, the user demographic data store 240d, and the rules/personas data store 240*c* to create initial member segmentation cells and offer segmentations. Therefore, even if a user who enrolls with the narrowcasting system of the present invention without providing any further information, the user receives highly relevant offers to the user from the moment the user activates his or her account.

In addition to the information provided by the networks, the narrowcasting system uses the registration/activation process to obtain even more relevant information about the users. As described in detail below, the narrowcasting engine 250 uses the initial data about the user stored in the user preference data store 240*a* and the user demographic data store 240*d* to generate questions to refine/supplement information about each user who enrolls with the narrowcasting system. This "intelligent questioning" process allows the narrowcasting engine 250 to validate, modify, and/or refine the member's data. The information collected during the registration/activation process is added to the user preference data store 240*a* and the user demographic data store 240*d*, and member segmentation cells and associated rules stored in the rules/personas data store 240*c* are refined. Thus, while prior art systems begin the collection of user information during the registration process, the narrowcasting system of the present invention uses the registration process to verify and/or supplement the information already stored in the user preference data store 240*a* and the user demographic data store 240*d*.

Figure 14:
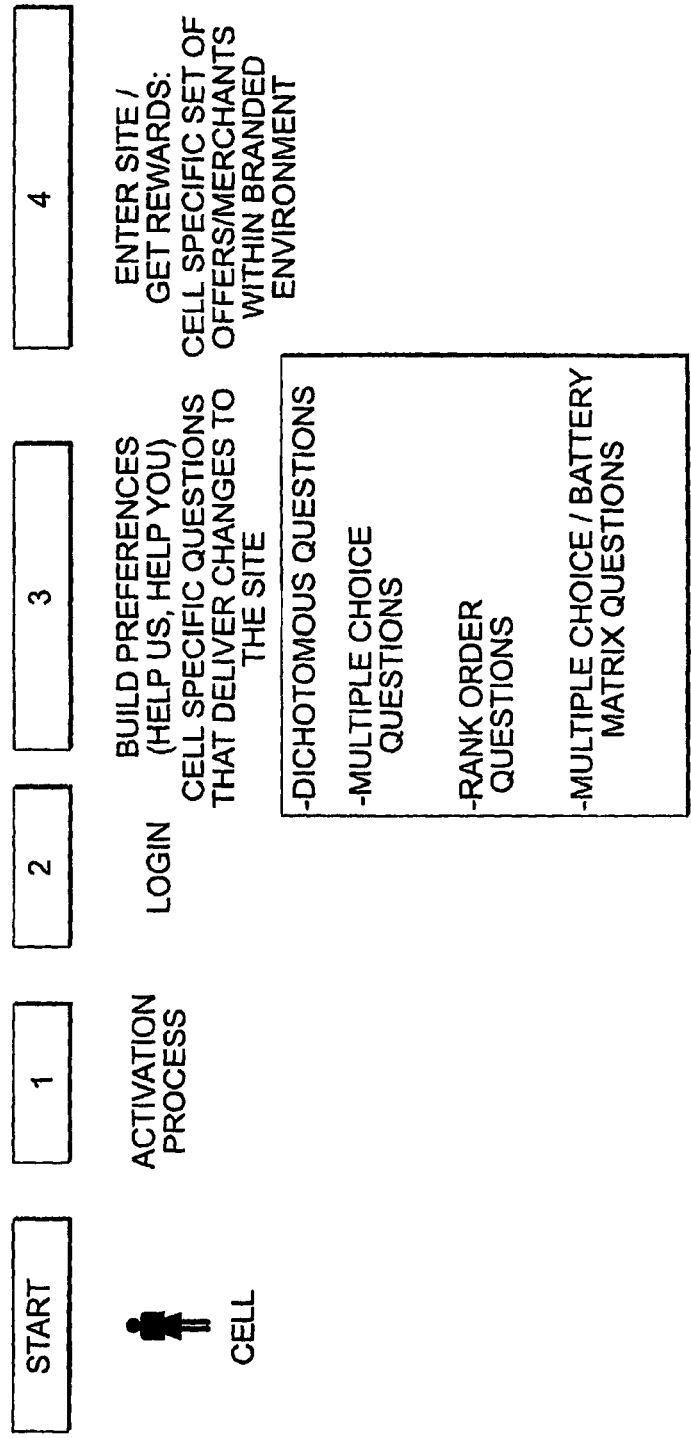
FIG. 14 is a diagram that illustrate the registration and activation of benefit sites in accordance with the present invention.

In particular, FIG. 14 shows a more step by step view of the registration/activation process. As shown in FIG. 14, a user (already associated with a member segment cell) accesses the network program portal 280*a*, 280*b* (FIG. 2) to register and activate the benefits program. If the user is responding to an invitation message, the portal may be accessed via a link embedded in the invitation. If the user is already enrolled, the network program portal (280*a*, 280*b*) may be accessed manually by typing in the assigned address to the portal or via pre-established links on the users' computer, such as through an Intranet site. When the user logs in for the first time, the user is guided through an initial preference building process. In reality, as described above, the narrowcasting system of the present invention already has preference data initially provided by the networks stored in the user preference data store 240*a* and the user demographic data store 240*d*. However, to the user, the process of identifying preferences at this stage is a first time for the user. Therefore, while the preference selection process during activation may be perceived as an initial preference setup to the user, in reality, the preference building process during registration for the narrowcasting system of the present invention is a process to refine the preference profile for the particular user.

To engage the member user to assist in refining the preference building process, the narrowcasting engine 250 begins the intelligent questioning process by presenting the user with various questions through the portal 280*a*, 280*b*. The questions are dynamically generated to be cell-specific to the user, the cells being assigned during the member segmentation process as shown in FIG. 4. The types of questions may be dichotomous questions (e.g., "yes" or "no"), multiple choice questions (e.g., selection from a set of answers), rank order questions (e.g., rank a list of answers based on level of interest), or multiple choice/battery matrix questions. Other types and methods of presenting the questions may be used without departing from the scope of the present invention. For instance, instead of directly asking questions, the questions may be offered as an interactive interface, such as a game, to input the member user's preference selections. Because the narrowcasting engine 250 has access to the initial preference data for the user as stored in the user preference data store 240*a* and the initial demographic data stored in the user demographic data store 240*d*, the questions presented are preferably designed to be more specific to the user than broad questions generally employed by prior art systems, thereby presenting less but more pertinent questions about the user.

Figure 15:
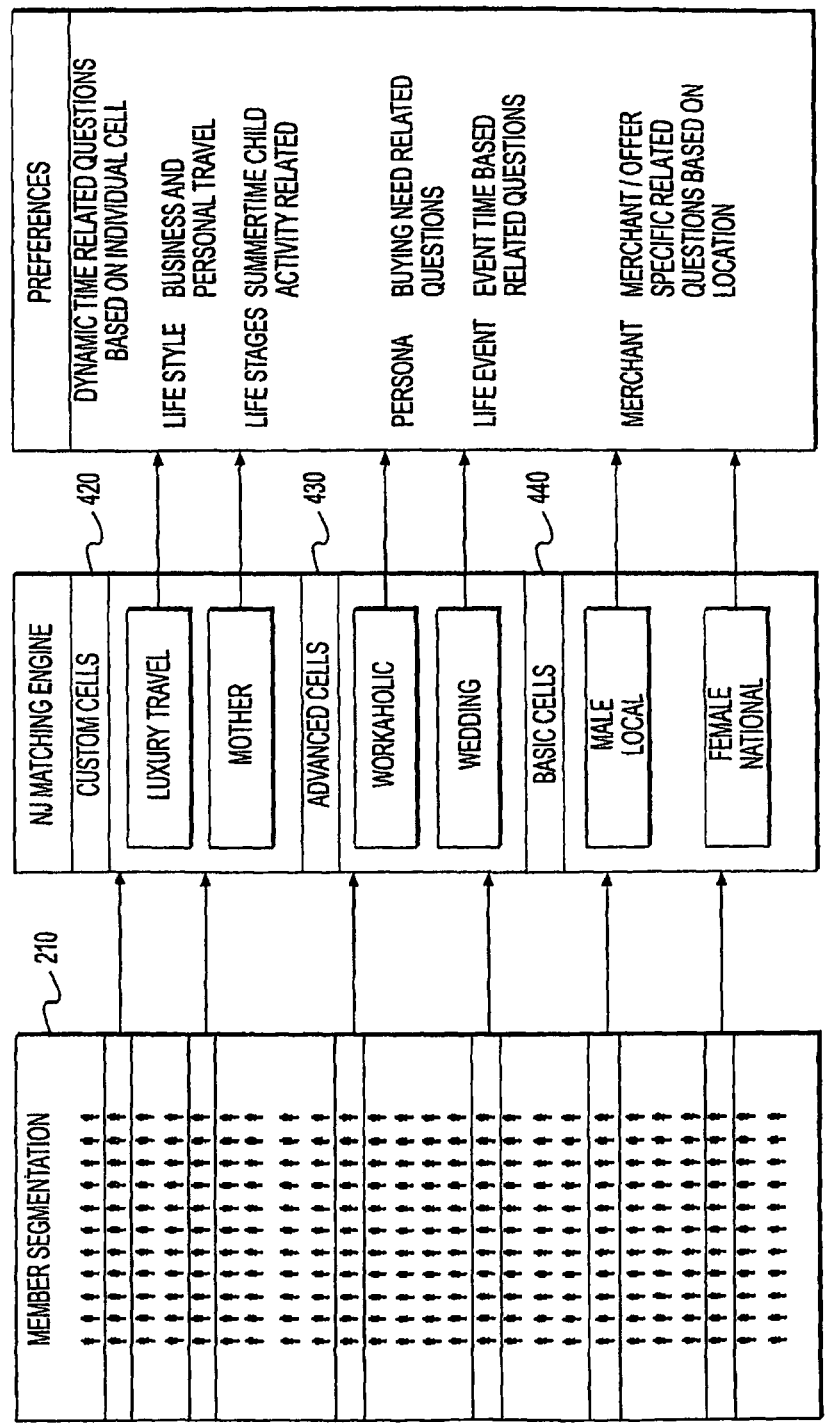
FIG. 15 is a diagram that illustrates the preference questions generated based on segmented cells.

For instance, FIG. 15 illustrates examples of the type of customized questions generated for users based on their member segmentation profiles. As shown, members in the network member database 210 are segmented into the relevant markets presented by their initial preference information. From the segmentation information, various segmented cells 410 (custom cells 420, advanced cells 430, basic cells 440) are created and associated with each user. When a user logs in to register/access the benefit page through network program portal (280*a*, 280*b*), the user is presented with dynamic questions related to the user's associated cell. As described below, these preference questions may be asked during registration/activation of the user's benefit site as well as during continual use of the site. All of the information provided during the registration process is then stored in the user preference data store 240*a* and the user demographic data store 240*d*.

Figure 16:
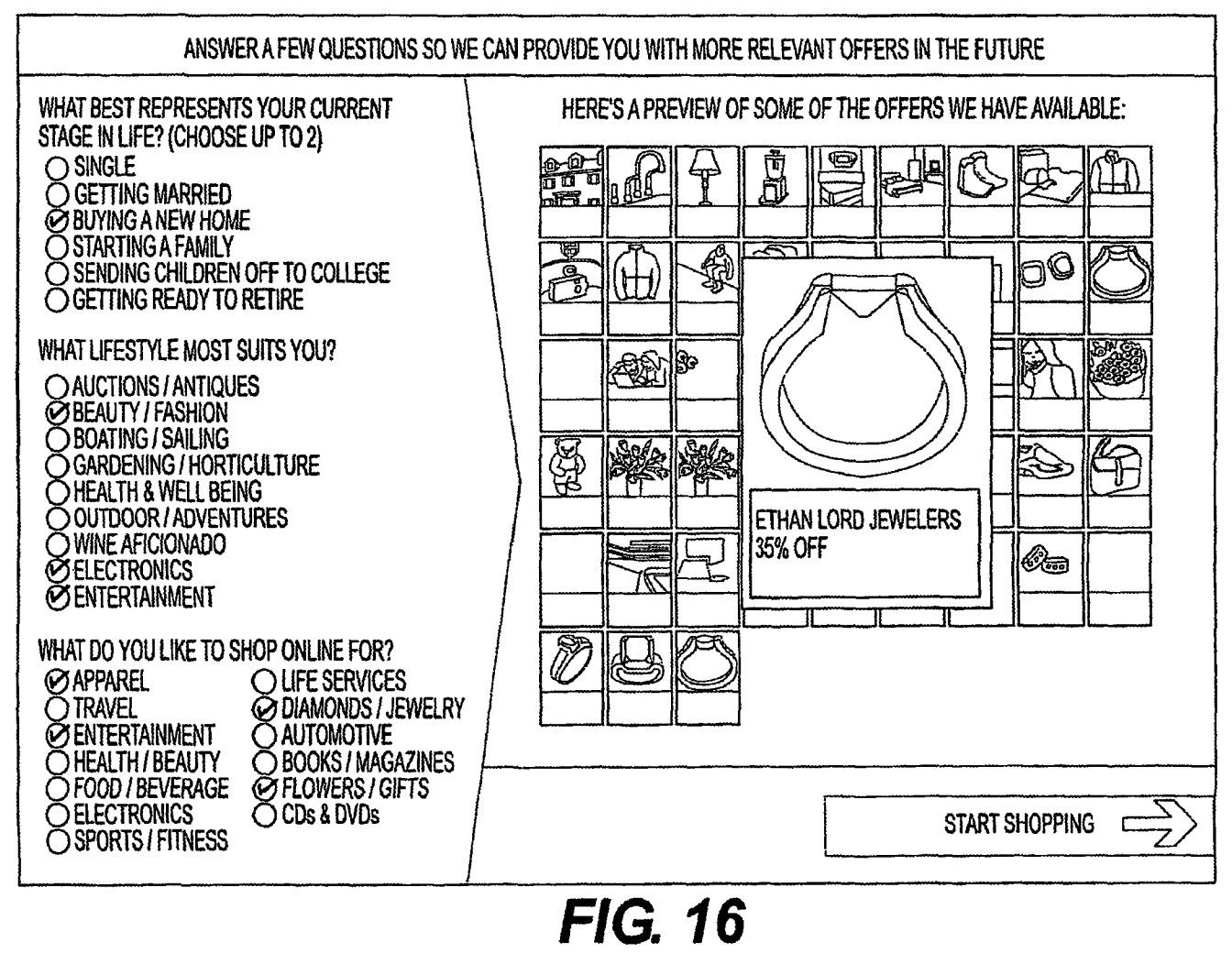

FIG. 16 shows an example of a preference building page engaging the user in intelligent questioning. As shown in FIG. 16, various questions are presented to the user. These questions are dynamically created for the specific user based on the information already obtained from the user's network in setting up the account. In addition, this page also displays some of the offers available to the user "waiting inside." Again, these presented offers are dynamically created for this particular user based on the information obtained from the network. As the user begins to answer the questions, the presented offers dynamically change based on the user's answers. For instance, as shown in FIG. 16, if the user selects "buying a new home," the offers shown on the left will change to include items related to homes (e.g., offers related to mortgages, furniture, etc.). Moreover, if the user moves the cursor over to one of the offers displayed, the offer pointed to by the cursor enlarges the offer to display specific information regarding the offer (e.g., jewelry, shown in FIG. 16). During this time, the narrowcasting engine 250 keeps track of all the activities being performed by the user. For example, the narrowcasting engine 250 may keep track of which offers the user appears to be interested in by tracking the offers viewed and how long the offer is viewed (e.g., by measuring the time of the cursor hovering over a particular offer to view the details). The narrowcasting engine 250 may also keep track of the answers being selected/de-selected. All of the collected information is used to add, modify, or refine the information about the user already stored in the user's preference data store 240*a*, the user's behavioral data store 240*b*, and the user's demographic data store 240*d*.

Once the member user has been given the chance to designate his/her preferences, the member user is given access to the benefits site. The benefits site is dynamically generated by the narrowcasting engine 250 customized for the user based on the user's associated member segment cell generated from the preference data provided by the network. If the user has provided further information during the registration process, whether explicitly (e.g., answers to the questions) or implicitly (e.g., by hovering over an offer), the narrowcasting engine 250 dynamically adjusts the user's associated preferences based on the information provided and dynamically adjusts the offer mix to be presented to the user. In this way, the narrowcasting system of the present invention instantly provides relevant offers from the first time the user accesses the benefit program hosted by the narrowcasting system.

Once the preference data provided by the networks and by the user during the registration/activation process is processed, the narrowcasting system of the present invention tracks users' activities throughout the user's access to the narrowcasting system to further collect and analyze preference information of each user. The three types of data collected by the narrowcasting system of the present invention are demographic data, preference data, and behavioral data. For exemplary purposes only, the preference data is stored in the user preference data store 240a, the demographic data is stored in the user demographic data store 240d, and behavioral data is stored in the user behavioral data store 240b. As already described, the information may be stored in separate databases or stored in different portions of the same database without departing from the scope of the invention. The demographic data includes, but is not limited to, home and work locations, gender, income level, job title, and marital status. The data may be obtained from employee data files. Preference data includes, but is not limited to, current and future purchase decisions obtained from user suggestions, requests, and selections. Behavioral data includes, but is not limited to, shopping habits and purchasing behavior over a period of time.

As described above, all of the contents presented to the user are dynamically generated and tracked in a real-time, continuous feedback loop. In general, the intelligent questioning during the active data gathering process includes reminders, searches, suggestions, and calendaring features. The reminder feature notifies users of up-coming offers or missed offers and asks whether the user would like to be reminded of the offer or similar offers in the future. For instance, if the user missed a 2-hour special sale or promotion, the user can request the system to notify the user if another or similar offer comes up in the future. If there is an offer a month away that the user does not want to miss, the user may request a reminder prior to the offer (e.g., days, hours, or minutes before the offer takes effect). To facilitate the notification of offers, the narrowcasting system of the present invention displays offers (past, present, and future) on a calendar such that the user can view important offers at a glance. The reminder feature may be connected to the calendar feature to optimize the opportunity for the user to interact with the system.

The search feature allows the user to search for specific offers available to the user. The user may search for offers specific to a product or category of products, merchant or type of merchant, time, and the like. The specific search parameters may be varied without departing from the scope of the present invention. All aspects of the search performed and the results viewed are stored as preference data.

The suggestion feature allows a user to suggest specific merchants, products, and/or services not found in the search to be added to the narrowcasting system of the present invention. The suggestions made by the user are also stored as preference data. The users' activities related to all of these features are collected and analyzed to validate, update, modify, and/or refine the users' preference and behavioral data.

Data Collection

Figure 17A:
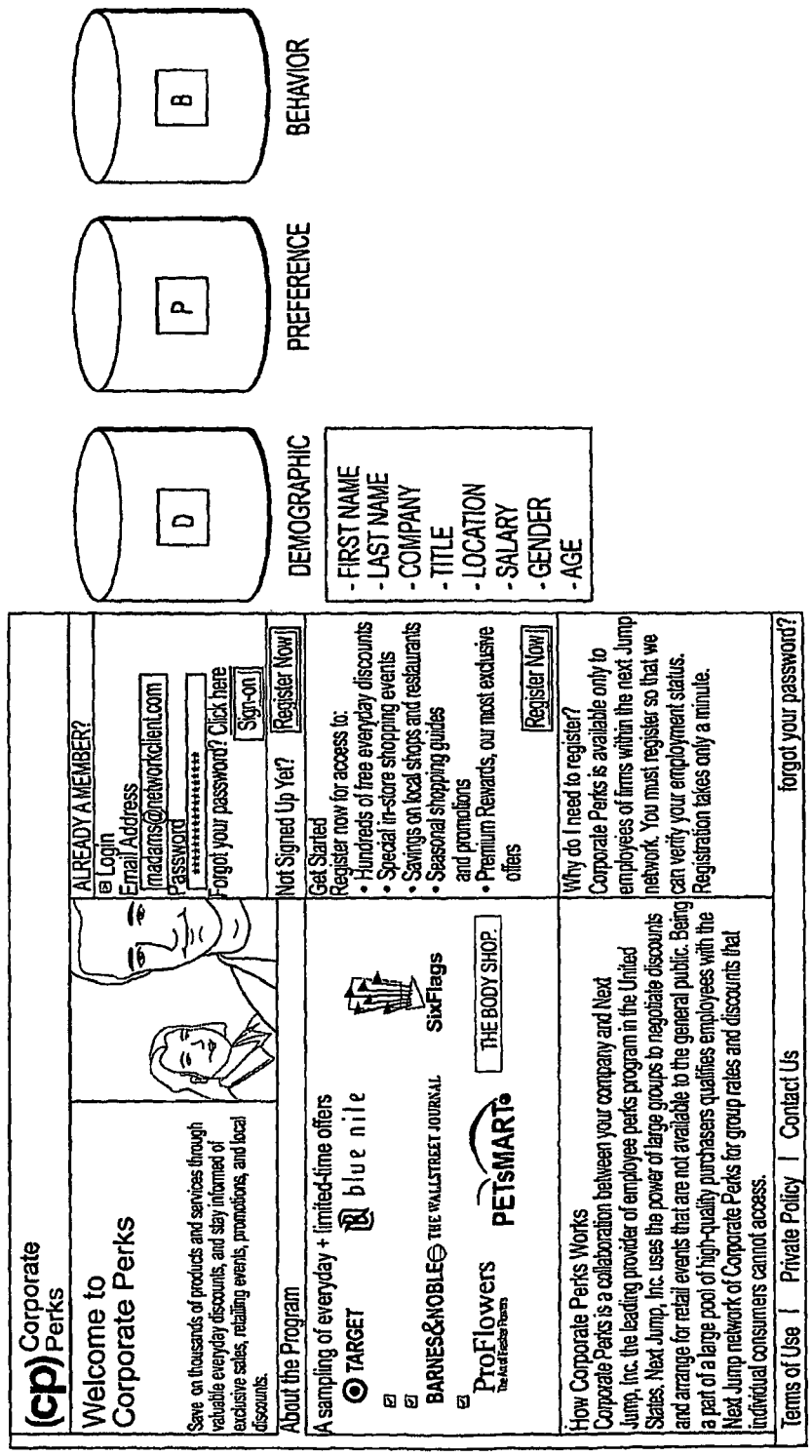
Figure 17B:
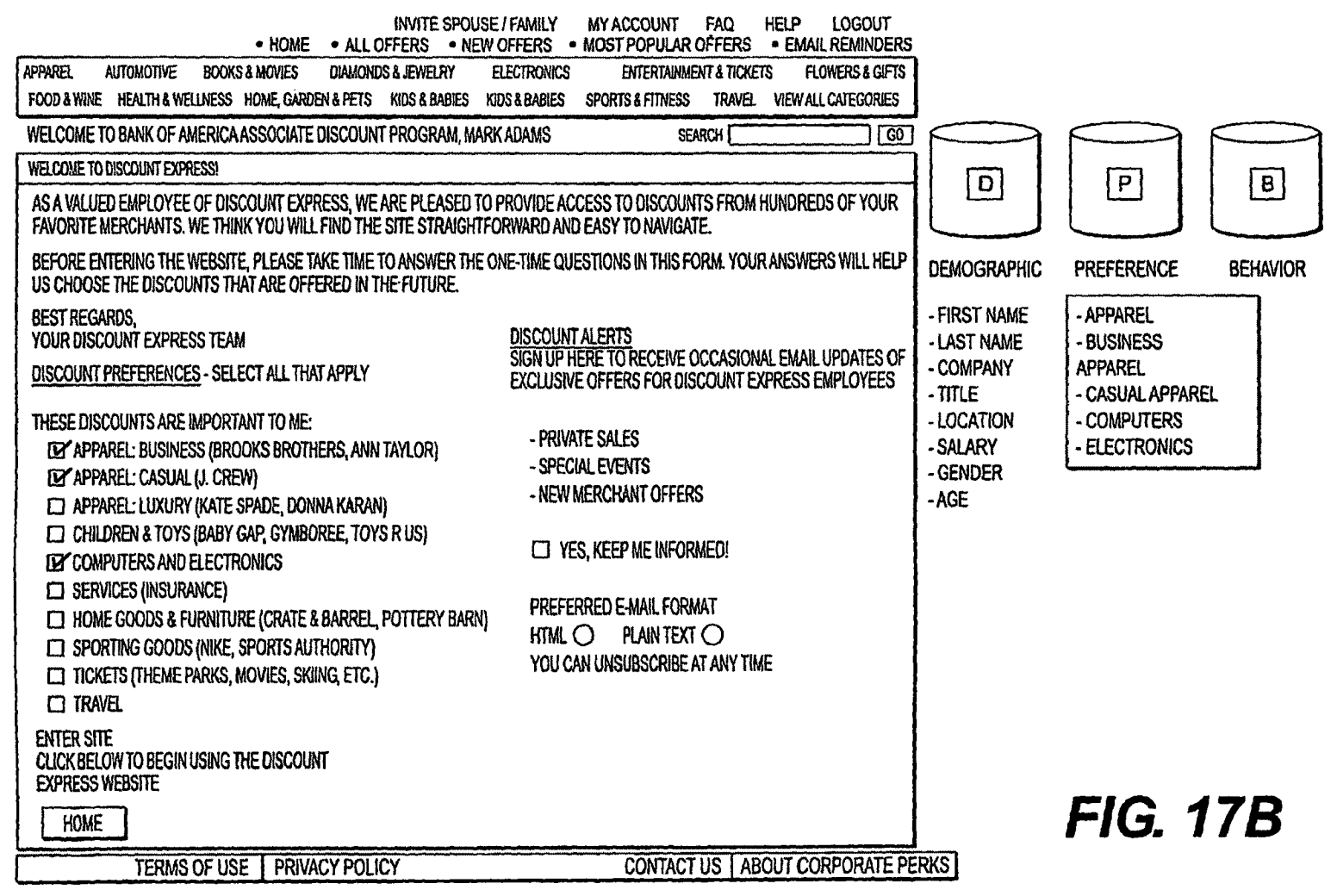

FIGS. 17A-17G illustrates an example of how these different types of data are collected. FIGS. 17A and 17B show activities of a user who is responding to an invitation to register and activate the benefit program hosted by the narrowcasting system of the present invention for the user's network. At the time the user is taken to the registration page through the network program portal (280a, 280b), the user's demographic information is already in the user demographic data store 240d as provided by the network. As described above, the registration process may be used to add or update any of the demographic information. FIG. 17B shows that once the user logs onto the portal, the user is invited to select his or her preference of interest as well as administrative items (e.g., communications channel). The preference information provided by the user is then stored in the user preference data store 240a as preference data.

FIGS. 17C and 17D show a user beginning to use the benefit program. For instance, the user may start searching for particular items and offers from a particular merchant stored in the offer database 260. The search terms used in the search are tracked and stored as preference data as shown in FIG. 17C. In addition, any selections made by the user as showing interest in particular offers from particular merchants are also stored as shown in FIG. 17D. FIG. 17D also illustrates the calendar and reminder features discussed above.

Figure 17E:
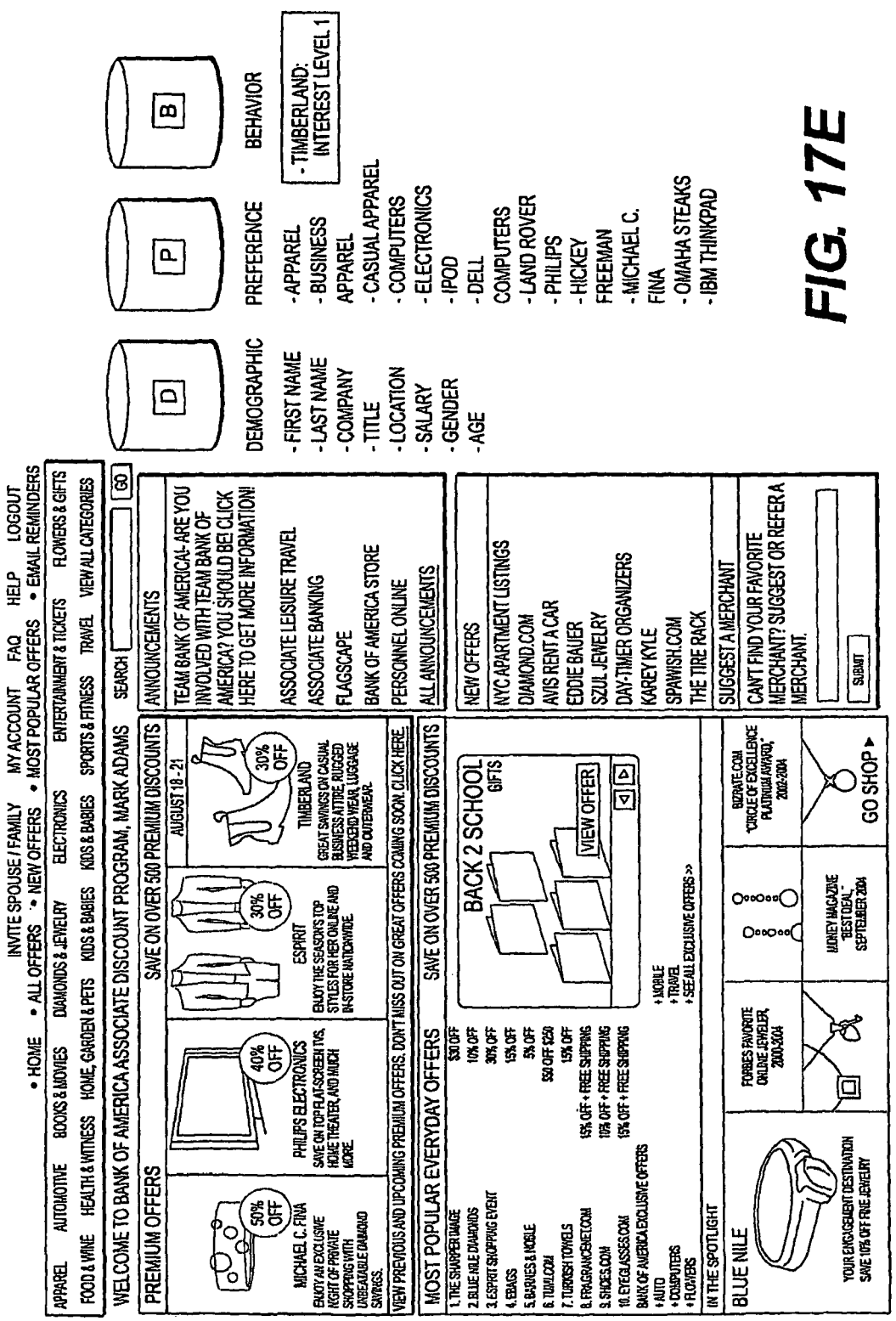
Figure 17F:
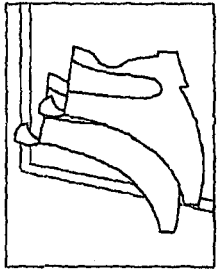
Figure 17G:
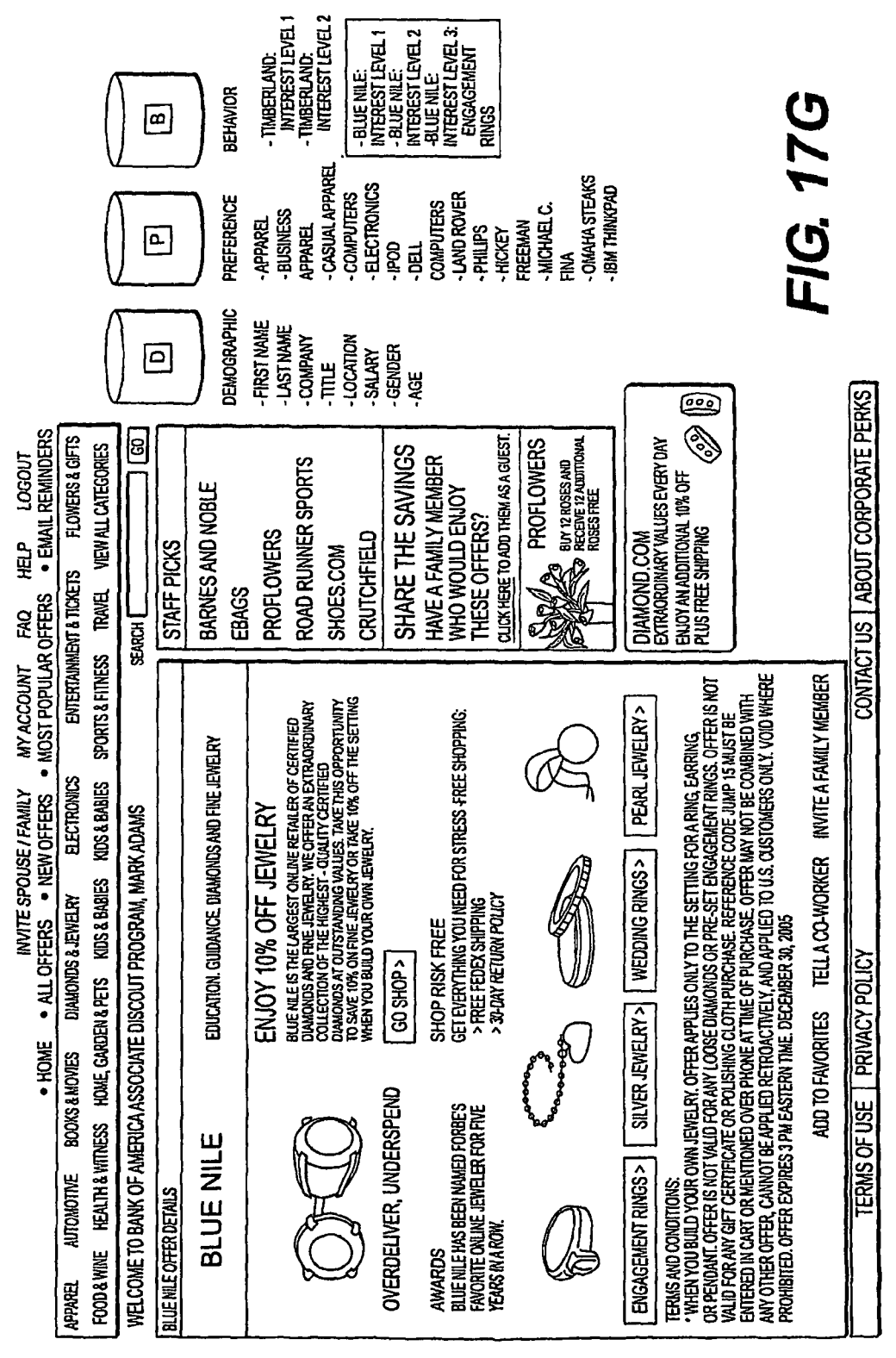

FIGS. 17E-17G show collection of user's behavioral data during activity on the benefit site. For instance, FIG. 17E shows that the user selected a particular offer (e.g., shoes) from a particular merchant (e.g., shoe store) to view further information about the offer (e.g., Interest Level 1). This information is stored in the user behavioral data store 240b. FIG. 17F shows that the user, upon viewing a detailed description of the offer, adds the item in the offer to the shopping cart, for example (e.g., Interest Level 2). This information, again, is stored in the user behavioral data store 240b. FIG. 17G shows the data stored in the user behavioral data store 240b after the user has viewed, selected, and clicked to a particular item for purchase (e.g., Interest Level 3) from a particular merchant (e.g., an engagement ring from a jewelry store). This information may include the actual purchase of the item. As described, the narrowcasting system of the present invention not only collects demographic and preference data about a user before and during activities on the benefit site, but the narrowcasting system of the present invention also collects behavioral data to build an accurate profile of each user to be used by the narrowcasting engine 250 to present relevant offers to the users at relevant times.

Figure 18:
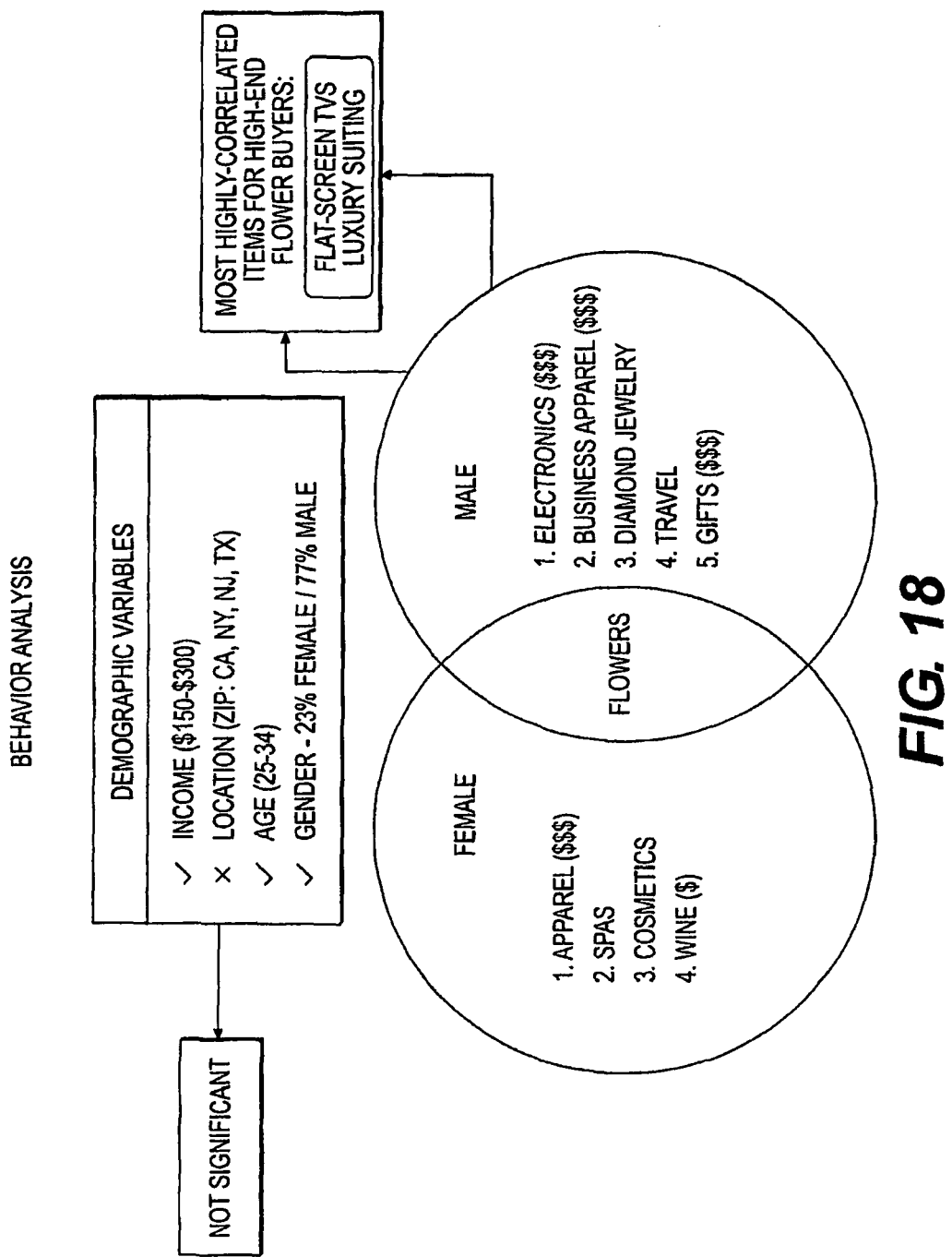
FIG. 18 is a chart illustrating an exemplary behavioral analysis according to the present invention.

In addition to collecting and building demographic, preference, and behavioral data, the narrowcasting engine 250 analyzes the information to determine correlations and most pertinent variables. As an example, as shown in FIG. 18, the narrowcasting engine 250 is able to analyze the behavior of males and females in a particular demographic profile. According to the analysis, the most highly-correlated items for high-end flower purchasers are flat-screen televisions and luxury suits, while location of the correlated purchasers does not appear to be significant. Such highly-correlated information generated by the narrowcasting engine 250 is used to create rules for the segmented cells 410 as well as analysis reports, explained in detail below. Throughout the data gathering process, the narrowcasting engine 250 collects not only the explicit data provided by the networks, users, and merchants, but collects inferred data as well to supplement the explicit data to more accurately predict the users' preferences. As briefly mentioned above, inferred data refers to information about the user that is inferred from the explicit data gathered. For example, if a user does not furnish where the user lives, the explicit data gathered about the user, such as repeated transactions at a particular store, is used to infer that the user lives near the store. Moreover, the preference data gathered by the narrowcasting system of the present invention represents future buying data rather than past purchase histories and behaviors characterized by the prior art systems.

Personas and Life Events

The demographic data, preference data, and behavioral data collected for each user in accordance with the present invention allows for narrowcasting engine 250 to present highly relevant information to the users at relevant times. As described above, the narrowcasting engine 250 provides relevant information by segmenting the members and offers into associated segment cells 410 and delivering the offer mix 530 to the users associated with the specific segmented cells 420, 430, and 440. As described above, members of custom cells 420 are segmented in accordance with specified parameters from the network. That is to say, custom cells 420 and the rules associated thereto are customized in accordance with the networks' requests. Members of basic cells 440 are segmented in accordance with basic demographic data (e.g., gender and location, such as males living in New York). Basic cells 440 are used as "targeted broadcast" communications by the narrowcasting system of the present invention. For example, basic cells 440 may be defined by rules used to send communications to users across networks or to large segments for newly provided programs and services. The targeted users can be narrowed or broadened based on the demographic data selected as the communications criteria for the segmented members for the cell. Members of the advanced cell 430 are segmented based on "personas" and/or "life events," as further explained below.

A "persona" is a synthetic personality and rules associated thereto based on specific demographic, preference, and behavioral data, all within the context of time. More specifically, an individual's behavior and preferences, especially related to purchasing habits, are related to a specific time period in the individual's life. For example, an individual who is single and at the beginning stages of his or her career will exhibit a particular purchasing behavior that is different from the behavior of an individual who is established in his or her career and is newly married. An individual who has recently had a baby will display still yet a different purchasing behavior than the other two individuals. The "personas" generated by the narrowcasting engine 250 are based on the premise that an individual will be in a particular life style for a finite amount of time. By detecting particular trigger events (based on preference and/or behavioral data—e.g., purchase of an engagement ring, purchasing a home, purchasing a minivan, etc.) and observing the following purchase preferences and behaviors, a more accurate profile, and eventually future purchasing data, can be obtained.

Accordingly, a persona in accordance with the narrowcasting system of the present invention is characterized by a defined event, a trigger of the event, duration of the event, and the user's location in the timeline of events. In particular, the personas generated by the narrowcasting engine 250 relate to the "directional" (i.e., future trend of purchases) of the user in his or her purchasing behavior rather than the "data point" (i.e., item of purchase) of the user's purchases.

As an example, a "workaholic" persona is defined by rules that look for users who work in a particular industry, have a high level of education, and have an income above a particular threshold. "Workaholics" tend to purchase expensive items such as high end electronics and jewelry and tend to travel frequently. FIG. 19 shows a fictitious user who is segmented into a "workaholic" cell. Accordingly, rules developed for the "workaholic" cell are used to create offer segmentation for the workaholics, and those who are segmented into the workaholics cell are presented with the appropriate offers relevant to this persona. The narrowcasting engine 250 segments the offers based on the workaholic persona and delivers the most appropriate offers to those in this cell, such as offers related to flat screen televisions and diamond jewelry, as shown in FIG. 19.

Similarly, "life events" are cells segmented based on demographic, preference, and behavioral data that indicate a particular stage of life that the user is in. For example, a "wedding" life event is defined by rules that look for users who are single or divorced, who recently researched and/or purchased engagement rings, or viewed offers from wedding dress vendors. These patterns indicate that the user may be planning for a wedding that may occur n a short period of time. Another example may be a "baby" life event that is defined by rules that look for users who are married (or users who fit the "weddings" profile) who recently researched and/or purchased baby necessities. These patterns indicate that the user may be expecting a baby in a short time. Accordingly, the offers segmented by the narrowcasting engine 250 according to the life events may include travel offers for their honeymoon or offers for family-friendly vehicles, such as minivans. Therefore, the narrowcasted communications according to the present invention proactively communicate offers that are relevant and timely. Prior art systems, by contrast, are reactive, and thus present offers that are irrelevant and or too late to be of use to a user.

In each case as described above, a defined event (e.g., new job, wedding) is detected based on a trigger of the event (e.g., business apparel, engagement ring). Using data gathered from other individuals, a duration of these events can be approximated (e.g., 1-5 years for the workaholic, 6-12 months for the wedding). The individual's position within this time frame can be determined based on the preference and behavior data (e.g., luxury car may indicate the latter stages of the workaholic while purchase of a wedding gown may indicate the wedding date is near). By using these established personas, future purchasing data can be determined and appropriate offers (e.g., vacation or honeymoon packages) may be presented to the appropriate individuals at the most relevant times in their life stage.

Reports

The narrowcasting engine 250 dynamically tracks, collects, and updates all data that is communicated between the users and the merchants. In addition, the narrowcasting engine 250 analyzes the responses from the user to provide various services to the networks and/or merchants hosted by the narrowcasting system of the present invention. From the networks' perspective, the offers provided by the affiliated merchants 260b are generally based on contractual terms that provide financial incentives for both parties. Therefore, results of the users' activities and any transactions that results need to be accounted for. Moreover, if the network is a financial institution, such as a credit card company, analysis of user responses and activities may be used to pursue the networks' own marketing campaign to draw more members.

From the merchants' perspective, affiliated merchants 290 are interested in the users' activities/transactions as well as the other side of the contractual obligations with the networks hosted by the narrowcasting system of the present invention. Moreover, whether the merchant is an affiliated merchant 260b or just a hosted merchant 260a, the merchants 260a, 260b may be on a contractual relationship with the narrowcasting system of the present invention for the offers made to the users. Additionally, analysis of user activities and responses may provide valuable marketing information that may be important in developing the merchants' own marketing campaigns.

The narrowcasting engine 250 provides, but is not limited to, the following levels of analysis and corresponding reports to the networks and/or merchants: (1) Basic, (2) Analyzer, (3) Forecaster, (4) Scenario Builder, (5) Advisor, (6) Custom.

(1) Basic—The Basic level analysis provides quarterly reports of the users' activities on the system. The Basic report is useful in reporting of network members' activities as well as marketing campaigns, such as sales reports, leads, and campaign summaries.

Figure 20:
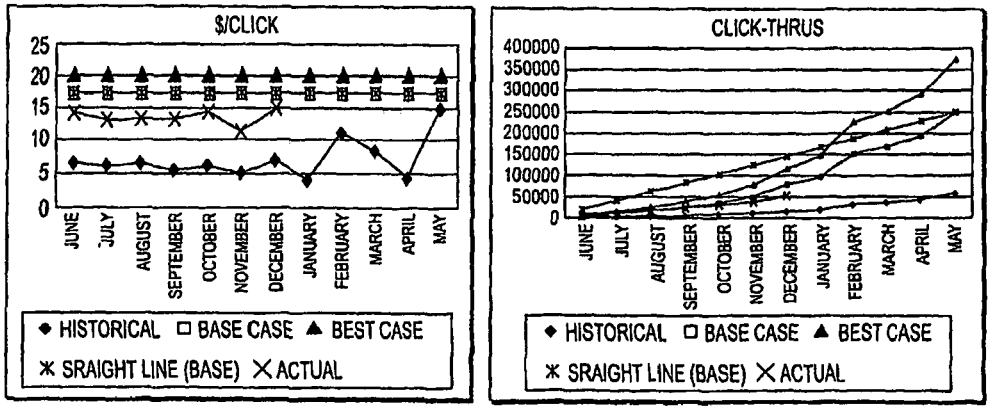

(2) Analyzer—The Analyzer level analysis provides weekly, monthly, quarterly, and yearly reports that provide, in addition to the Basic report, usage by segments and leads/sales by merchant. The Analyzer report provides historical trends. (FIG. 20)

(3) Forecaster—The Forecaster level analysis provides weekly, monthly, quarterly, and yearly reports that provide, in addition to the Basic report, forecasts by segments, forecast leads, forecast sales, and forecast response. The Forecaster report also provides historical trends. (FIG. 21)

Figure 22:
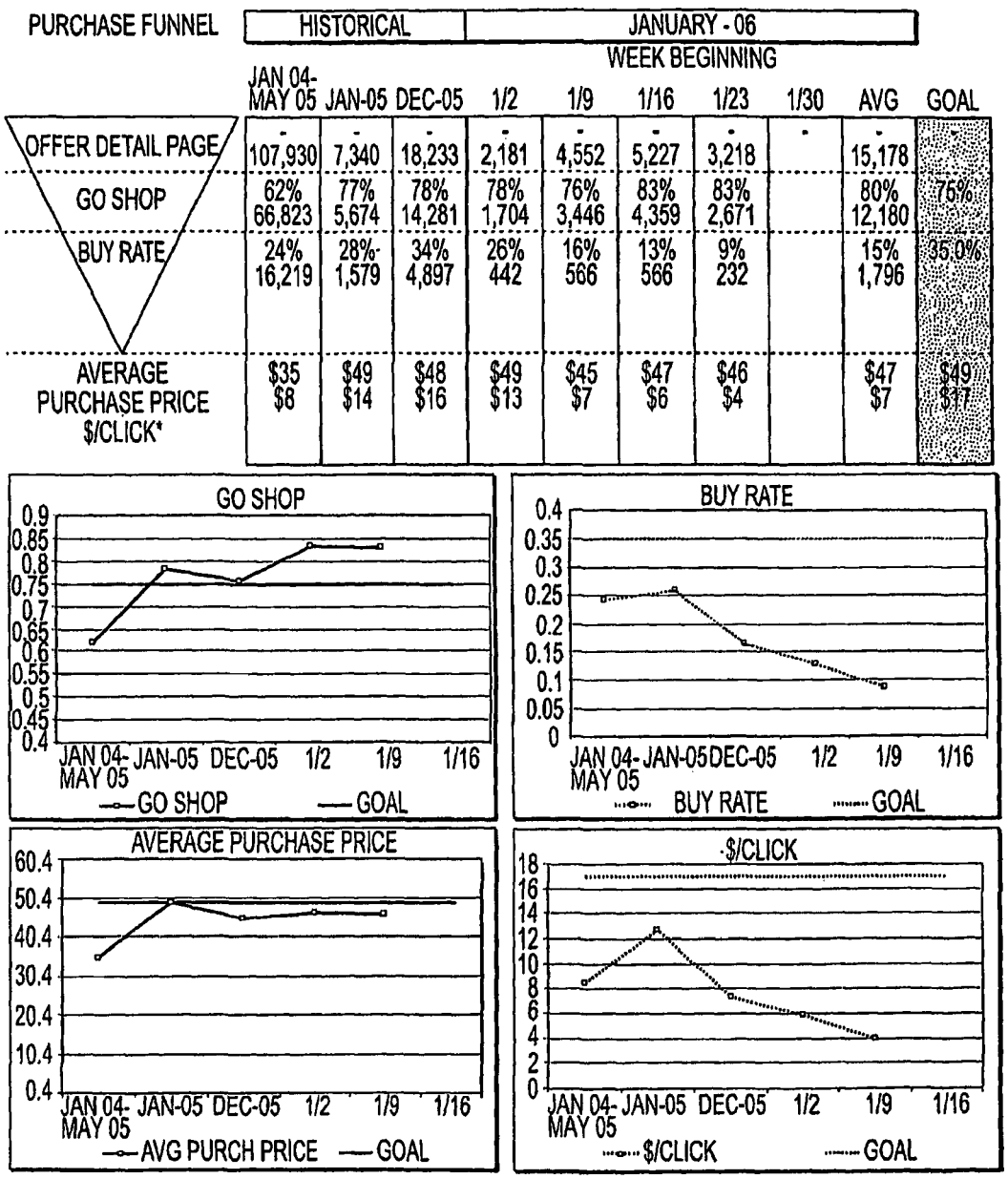

(4) Scenario Builder—The Scenario Builder level analysis provides weekly, monthly, quarterly, and yearly reports that provide, in addition to the Basic report, "what-if" scenarios, profitability analysis, demand curves, conversions, and buy rates. (FIG. 22)

(5) Advisor—The Advisor level analysis provides weekly, monthly, quarterly, and yearly reports that provide, in addition to the Basic report, executive level usage and activity recommendations, diagnostics, persona development, and user mappings.

(6) Custom—The Custom level analysis provides reports according to frequency and level of detail specified by the network/merchant.

Purchase Funnel

Figure 23:
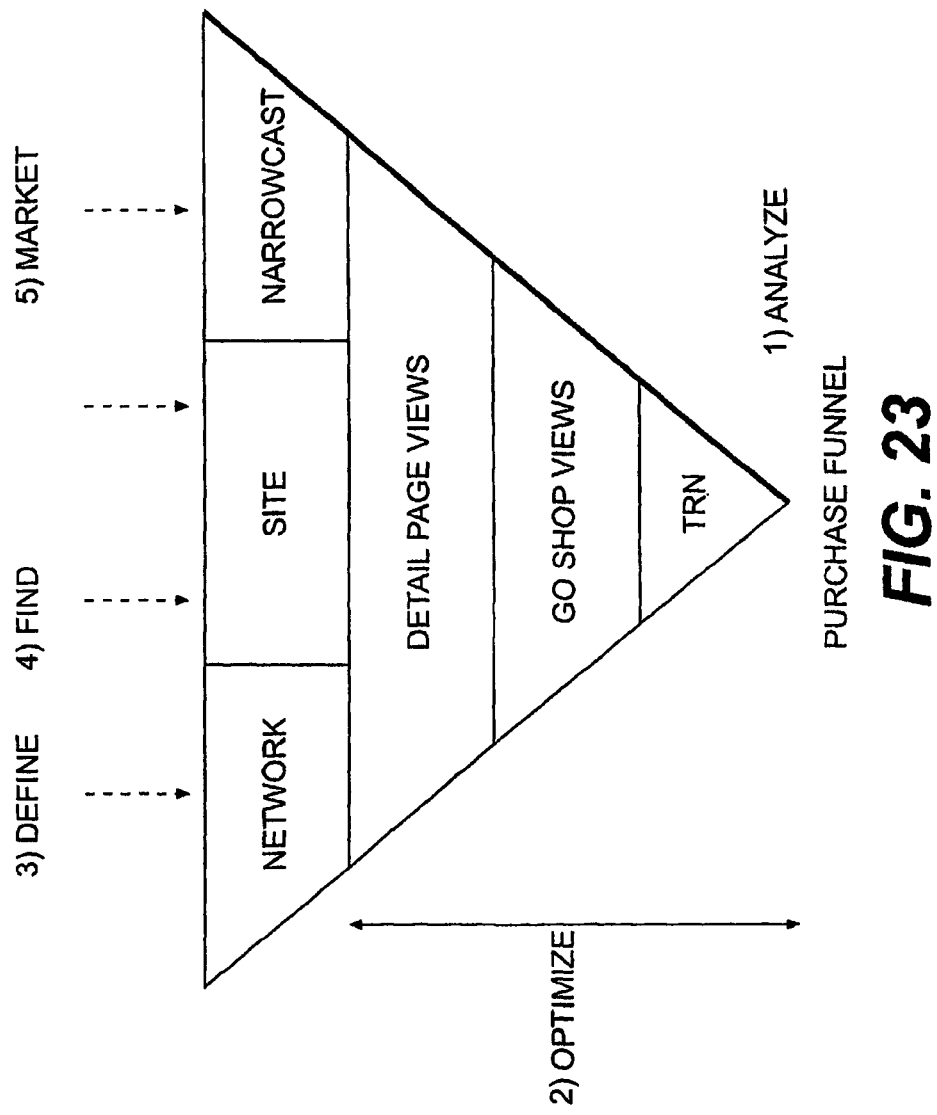
FIG. 23 is a diagram illustrating a purchase funnel of the present invention.

As shown in FIG. 23, the "purchase funnel" refers to the process of optimizing the narrowcasted communication. The narrowcasting system, according to the present invention, tracks the marketing-to-purchase process from end-to-end (i.e., "closed-loop"). In other words, the narrowcasting system of the present invention tracks users' responses from the delivery of the communication via the network (e.g., HR communication), site communication (e.g., web portal placements) and narrowcasting, all the way through to the transaction ("TRN"). Accordingly, the narrowcasting system according to the present invention can analyze and break down all the data obtained from the user from the beginning of the marketing initiative to the resulting purchase into granular detail. For example, conversion rates (i.e., user's favorable response of a communication) are tracked from marketing to portal-website, from portal homepage to offer detail page, from offer detail page to "go shop" (i.e., clicking to a merchant's website, coupon, etc), and from "go shop" to transaction (i.e., purchase). In addition, the present invention tracks these response rates for merchants, allowing the system to calculate averages for categories, subcategories, groups of similar merchants and the like. These calculations are benchmarks that can be used to diagnose where problems (i.e., marketing breakdown) in the purchase funnel exist. For example, a merchant may have an offer detail page to go shop conversion of 23%, but the average for like merchants is 45%. In addition to identifying the problem areas, the analysis allows for the development of products and services that are designed to fix specific steps in the purchase funnel.

Figure 24:
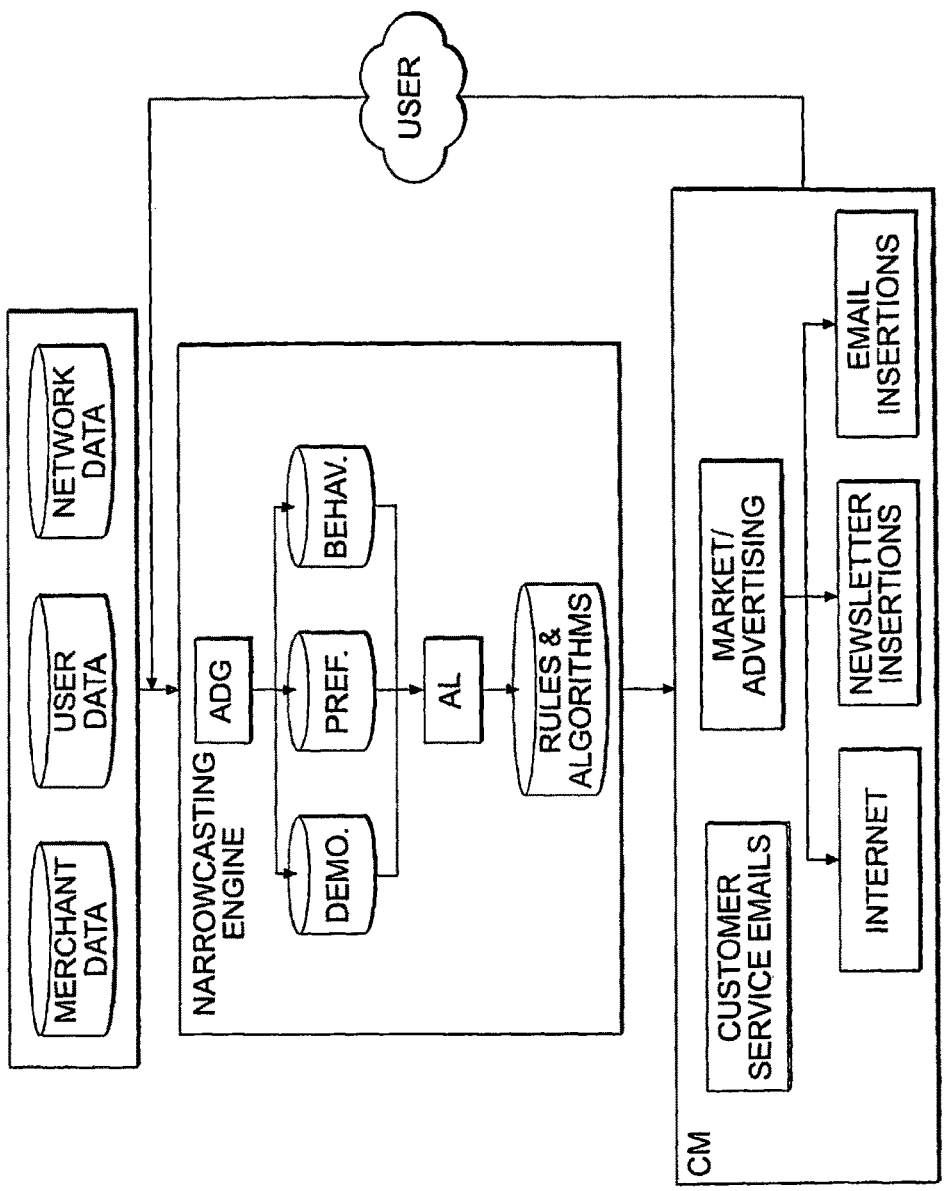
FIG. 24 is a block diagram illustrating an exemplary data flow according to the present invention.

FIG. 24 is a block diagram illustrating an exemplary data flow according to the present invention. As discussed in detail above, data collected from the network, the merchants, and the user are input to the narrowcasting engine of the present invention. The active data gathering ADG collects the data from these three sources through the active data gathering process as described above, and parses this data into the appropriate database (e.g., demographic, preference, and behavioral databases) in a format readily available for marketing. As discussed above, the data is also evaluated as to effectiveness in predicting future buying behavior (i.e., "forward looking" data). The active learning AL processes the collected data as described above and applies rules and algorithms that will determine what offers to present to a particular user (i.e., determine the right product for the right person at the right time). Based on results from the AL process, the communication management CM will send customer service emails (based on reminder and suggestion preference data, for example) and/or marketing/advertising communication (based on inferred data, for example). The communication of marketing/advertising messages occurs utilizing one or more mediums: internet (e.g., website portal), newsletter insertion (e.g., HR newsletters) and emails (email newsletters). The response is fed back into the system in real-time to collect and refine the data to be even more accurate and relevant.

Example

Figure 25:
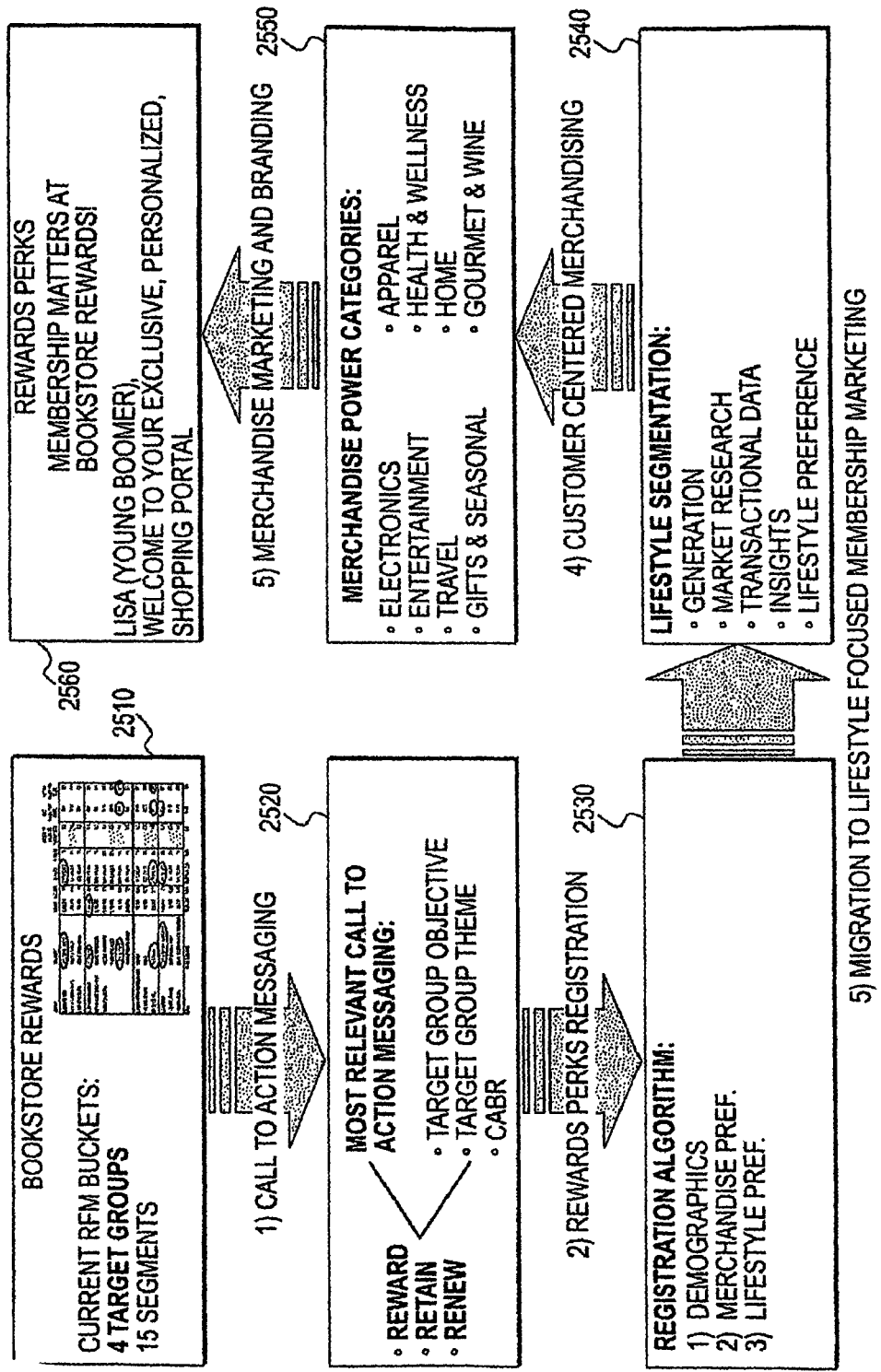

FIGS. 25-30 illustrate a non-limiting example of the narrowcasting system and method according to the present invention. In particular, FIGS. 25-30 show an exemplary embodiment of segmentation and preference gathering/learning in accordance with the present invention. As shown in FIG. 25, an existing user network (e.g., "BookStore") wants to establish a rewards program on the narrowcasting system of the present invention. In block 2510, the current membership are grouped and segmented as described above into RFM buckets. In this example, 4 target groups and 15 segments have been established and analyzed, as shown in FIG. 26. These segments can be grouped based on the target group or segment objective. For example, as shown in FIG. 26, BookStore is interested in retaining members of the Gold and Silver segments. Thus, the incentives and rewards for these segments can be designed around retaining these segments.

Once the groups/segments have been determined, a call to action messaging is developed and disseminated to the groups. As shown in block 2520, using target group objectives and themes, CABR is used to develop a message to promote the incentives (rewards), retention, and renewal of the members into the rewards program. Once the members, or potential members, receive the messaging, they are invited to register into the rewards perks program by providing a link, for example, to the rewards perks website.

Figure 27:
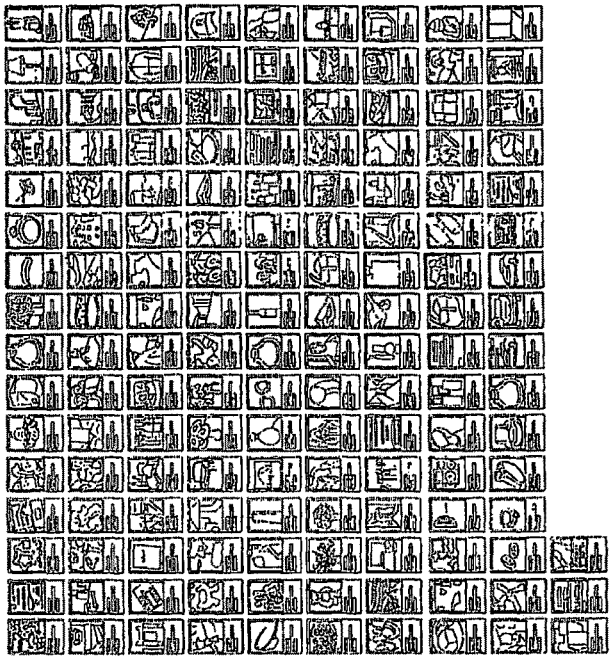
Figure 28:
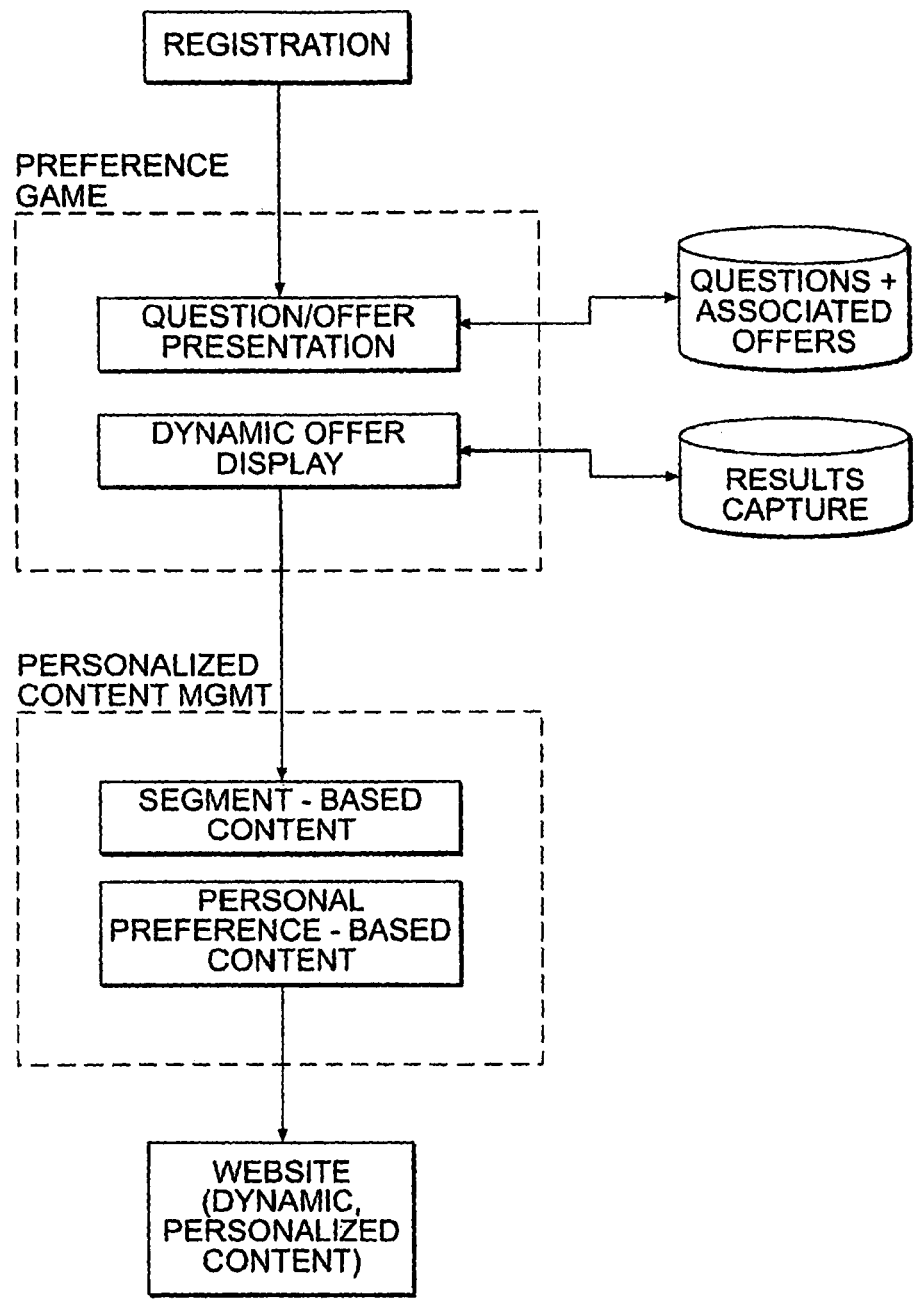
Figure 30:
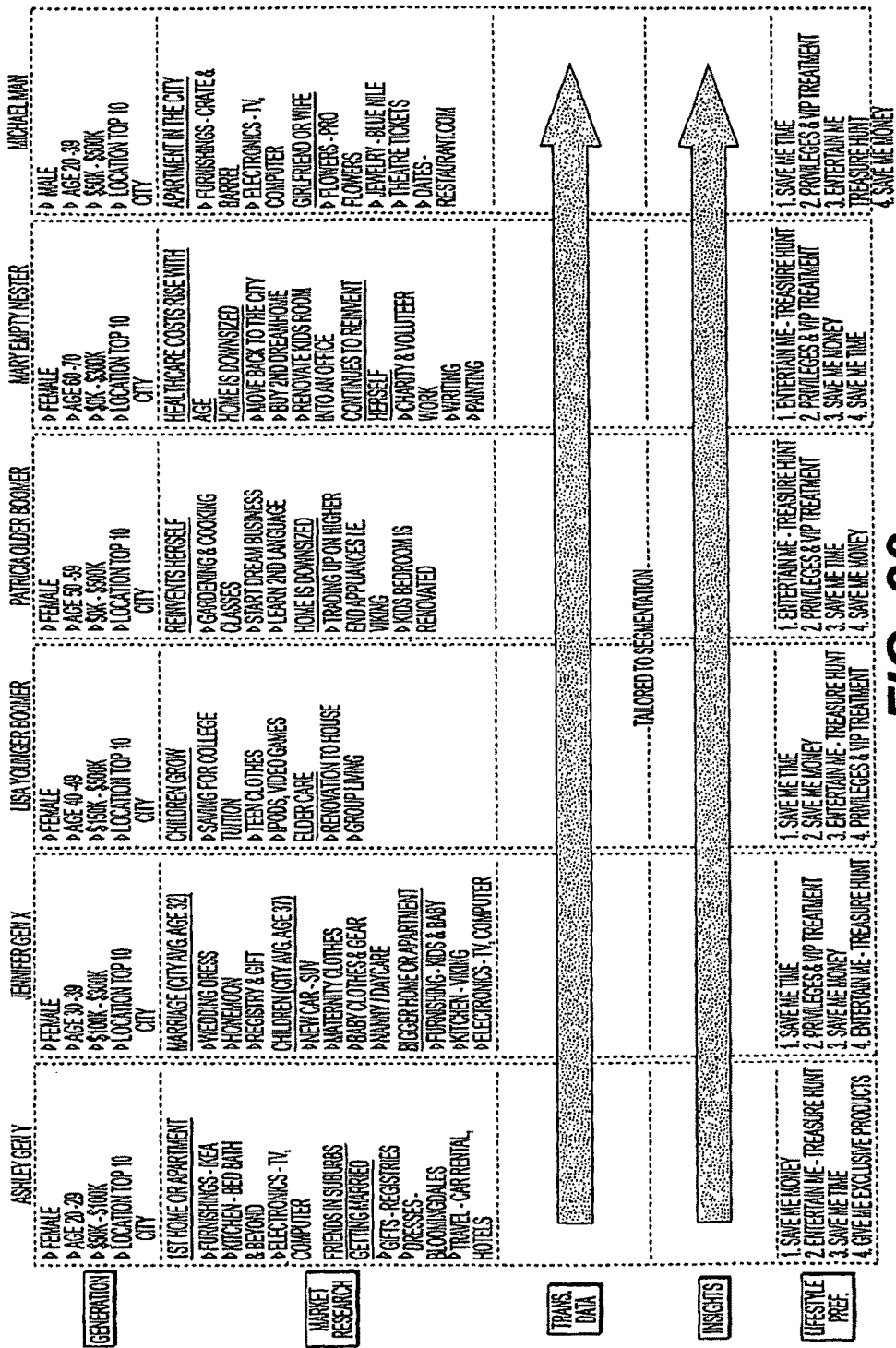

In block 2530, the user is then guided through the registration/login process. FIGS. 27-29 show the preference building interface (i.e., "preference game") to ascertain the preference data of the user during registration. As described above, the right side of the screen (FIG. 27) is populated with some of the offers found "inside" (i.e., once registration is complete). These offers, while appearing random, are actually populated based on data already known about the user. As the user answers the intelligent questions on the left side of the screen, the offers displayed on the right side of the screen dynamically changes, as shown in FIG. 29. Further, as the user interacts with some of the offers (e.g., hovers over a particular offer), the information of the user's interest is also gathered to build the user's preference profile. FIG. 28 is an exemplary flow of the preference building process during registration. Once the user's preference data is gathered during the registration process through the preference game, for example, the segmented content and preference based content are collected and dynamically arranged on the user's website as personalized content. (e.g., FIG. 29).

Based on the demographic, behavioral, and preference data gathered during the registration/prior activities, the narrowcasting system of the present invention migrates the analysis to lifestyle focused marketing. As shown in block 2540, based on the gathered data of the user, the user is profiled into personas to determine the user's lifestyle. Focusing on the user's lifestyle segmentation, the offers available in the system are segmented into the most relevant categories for the user, as shown in block 2550. In block 2560, the offers and the website are dynamically generated and branded and presented to the user to begin usage of the BookStore's rewards perks program.

Silent Marketing

As described above, the narrowcasting system according to the present invention has many applications. In particular, the narrowcasting system of the present invention in the exemplary embodiment as described above serves as a rewards/loyalty platform for networks while serving as a targeted marketing platform for merchants.

From the standpoint of the members, the narrowcasting system of the present invention provides relevant information to the users from the time the user first accesses the user portal. Because the users are members of a network and the portals are setup on behalf of the networks, the networks provide information about their users when registering to be hosted by the narrowcasting system of the present invention. Therefore, the narrowcasting system of the present invention begins with information that prior art systems strive to collect over a long period of time. Because the information provided to the users is relevant from the beginning of their experience on the portal, the users' first impression is that of credibility and trust of the communications provided by the narrowcasting system of the present invention. This reduces the number of ignored/deleted communications, such as emails and the like. More importantly, because the offers being made through the narrowcasting system of the present invention are branded through the network to which the users are members, the offerings are viewed as benefits or perks from a trusted entity and not perceived as spam. As the offerings become more relevant through usage, the trust relationship is increased, thereby perpetuating the collection of more data points to refine the users' future buying data even more.

From the standpoint of the networks, as the members find the offerings through the narrowcasting system of the present invention more relevant and useful, the network strengthens the relationship with the members. Accordingly, the members' loyalty to the network increases, thereby obtaining more business.

From the standpoint of the merchants, as the offerings are matched with relevant members, their marketing efforts become more efficient and productive. Rather than inundating the public with offerings that may not even get viewed, the narrowcasting system of the present invention provides accurate and productive results. To this end, the narrowcasting system of the present invention provides a "silent marketing" option as a test bed for merchants to perform market analysis of their products.

In particular, the narrowcasting system of the present invention is a "closed loop" network with proven marketing rules (e.g., personas). The term "closed loop" as used herein refers to a closed environment with a specific audience and defined rules. In contrast, an "open loop" network is the general public that has no boundaries and unspecified audience (e.g., anyone can access the network and identity is not authenticated). Because all of the potential customers in the narrowcasting system are members of the hosted networks that have been segmented and analyzed, products and/or marketing campaigns can be tested with accurate results with no public dissemination of information about the test.

For example, a merchant may wish to determine a market for a particular product. Traditionally, the merchant would pay for broadcast advertisements for the product to the general public to determine the market for the product. However, because the general public is an "open loop" network, the response is unpredictable and sporadic. Even if the products are sold, the data obtained is extremely diverse to determine the marketability of the product with any accuracy. However, using the narrowcasting system of the present invention, members have been already segmented and analyzed. Accordingly, a sampling of members using the preference, behavioral, and persona data can be generated and the product marketability tested. Because the narrowcasting system of the present invention uses the Internet and email, the results are almost immediate. Based on the returned results, a different or larger sample can be generated for either re-testing or validating the results. Moreover, prototype offers and other marketing campaigns can also be tested to determine their efficacy.

In another aspect, if the market is too small, traditional methods for testing marketability exhaust the test pool. In other words, the people that would have found the product useful have been used up for the test. Accordingly, there is no one else to market after the testing is performed. However, in the narrowcasting system of the present invention, because the audience consists of members of large networks (e.g., employers, institutions, affinity groups) and the market pool can be segmented and sampled over members of different networks, the total pool is not exhausted after testing. In other words, the narrowcasting system of the present invention creates a controlled sampling of a market in a controlled environment to obtain accurate results that can be re-tested without exhausting the marketable pool. This results in the ability to run additional tests without exhausting the market pool for the actual marketing campaign.

The narrowcasting system of the present invention can be used in this fashion to test marketability of products, cost valuation of products, effectiveness of marketing strategies, and other valuable marketability analysis in a controlled, efficient manner with near instant results. Moreover, because of the effectiveness of the narrowcasting system of the present invention, merchants can also use the narrowcasting engine 250 to move surplus products more effectively.

Merchant Network Services

As discussed above, while "relevance" of offers can increase usage by increasing trust, breadth (i.e., quantity) and depth (i.e., quality) of products and services available on the system are integral to increasing usage of the system. To increase the quantity and quality of the products/services, the system must be capable of increasing and deepening relationships with merchants that provide the products/ services. Accordingly, the narrowcasting system of the present invention includes various merchant network modules to increase the number of merchants, thereby the number of products and/or services, and deepen the relationship to increase the quality of offers for the products and/or services available from the merchants.

Auto-Enroll Module

A key barrier for increasing the number of merchants, thereby increasing products and services on the system, is the ease of enrollment with the rewards/loyalty program. Typically, rewards/loyalty programs require that participating merchants offer discounts and/or other incentives to be able to market to the members of the rewards/loyalty program members. This can pose challenges to mainstream merchants who do not need discounts to draw customers, and particularly to those offering discounts that are administratively challenging to provide (e.g., non-public or "private" offers, offers customized to specific communities or types of users, or any other offers that deviate from existing promotional plans). Hence, merchants may be dissuaded from participating in reward/loyalty programs that require discounts as a condition for participation.

On the other hand, a key barrier to increasing the quality of merchants is the challenge of increasing the number of high-end merchants (e.g., retailers of name brand designers) who participate in the rewards/loyalty program. High-end merchants can generally sell their products/services at market price without any discounts since the consumers of those products are typically affluent individuals. Hence, merchants with high quality products/services are dissuaded from participating in reward/loyalty programs that require discounts as a condition for participation.

Conversely, the merchants that offer the steepest discounts and/or incentives tend to be merchants with products/services that are less than desirable (e.g., out-dated products, unknown/unproven products, overstocked items, etc.). Hence, typical merchants participating in rewards/loyalty programs tend to be unknown or low end merchants, which tends to discourage users of long term usage as the quality and quantity of offers become sub par.

Figure 31:
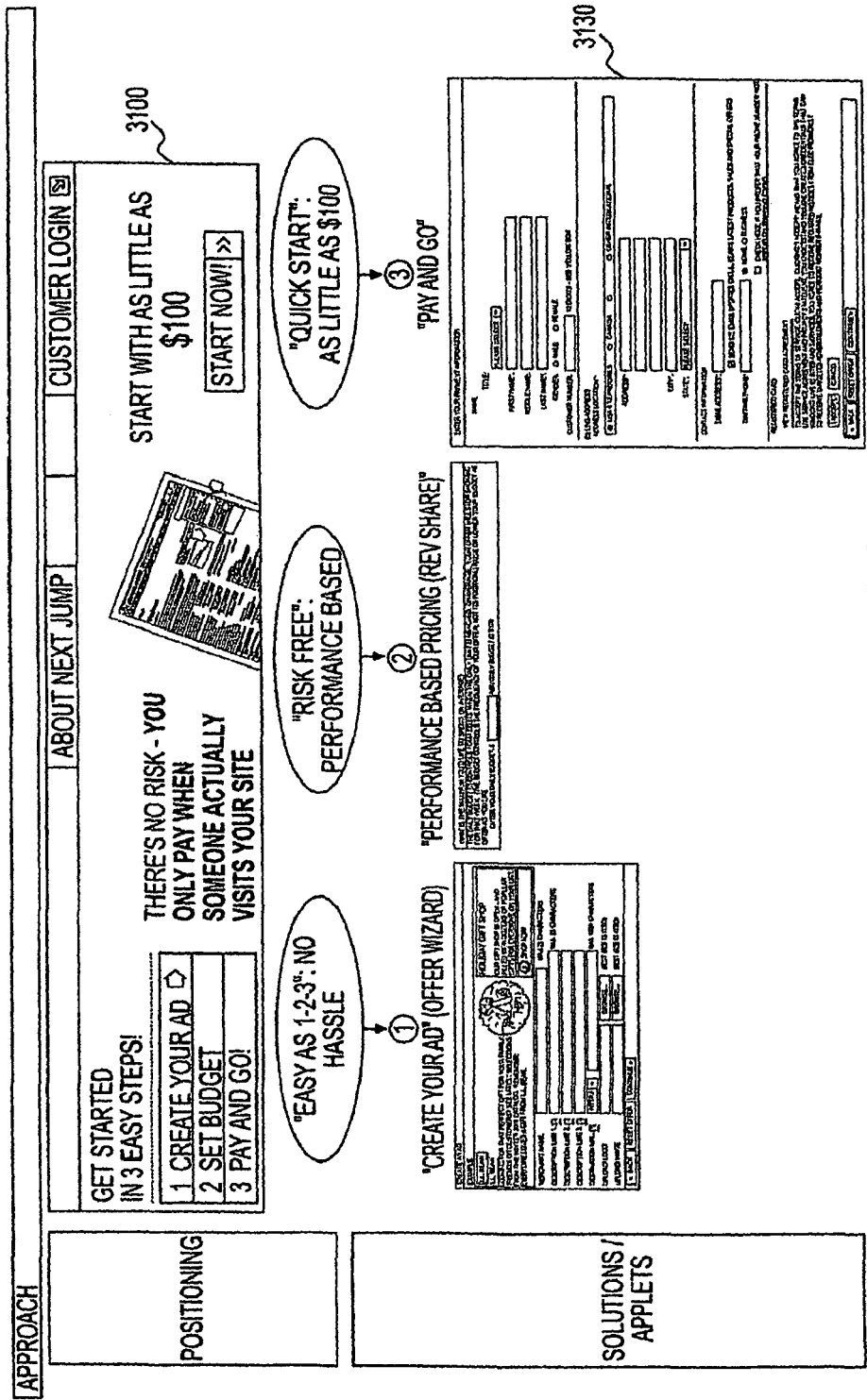
FIG. 31 is a view of an exemplary embodiment of the auto-enroll module of the present invention.

As shown in FIG. 31, an exemplary embodiment of the present invention includes an auto-enroll module 3100 that is implemented on a rewards/loyalty platform such that the system does not require merchants to provide discounts and/or incentives to become a participant. Rather, the incentives are provided by a rewards module, discussed in detail below, of the system of the present invention rather than by the merchants. In an exemplary embodiment, the rewards are provided out of the marketing spend accounts of the merchants. Hence, while the users are incentivized to purchase from participating merchants, the merchants do not have to offer discounts/incentives to be a participating member. In this way, the system and method of the present invention increases the number of merchants, especially the high-end merchants that do not typically join rewards/loyalty programs as discussed above. Moreover, the system and method of the present invention includes features, as discussed further below, to make the registration and administration of the participation easy and simple for the merchants to further increase the number of merchants participating in the network.

In the exemplary embodiment, the auto-enroll module 3100 is a secure communications module on the system of the present invention, such as an Intranet or Internet access portal as shown in FIG. 31. As shown, the auto-enroll module 3100 includes a website-like interface with instructions to guide the merchant through the registration/enrollment process. As shown in FIG. 31, the auto-enroll module 3100 includes an offer wizard 3110 that guides the merchant through a quick and easy process of creating an offer to be displayed to the user of the narrowcasting system of the present invention. The offer wizard 3100 may be a webpage having fields that allow entry of the merchant's information, the description of the offer, link to the merchant's website, and merchant's logo and/or other images regarding the offer. Other types of fields and/or interface may be used without departing from the scope of the present invention.

The auto-enroll module 3100 also includes options for participation. For instance, FIG. 31 illustrates a performance based pricing ("Rev-Share") module 3120 that allows the merchant to sign up for a budget-based enrollment for continuous, periodically recurring offers. In particular, when the amount budgeted by the merchant for a particular offer is spent within a cycle set by the merchant, the offer is suspended until the next cycle begins. The performance based pricing module 3120 allows the merchant to set/change the budget levels, set/change frequency of the display of the offers, as well as other administrative tasks regarding the offers made available to program members. The auto-enroll module 3100 further includes a quick start ("Pay and Go") module 3130. The quick start module 3130 allows a one time payment and activation of an offer to be made available to the program members.

Figure 32:
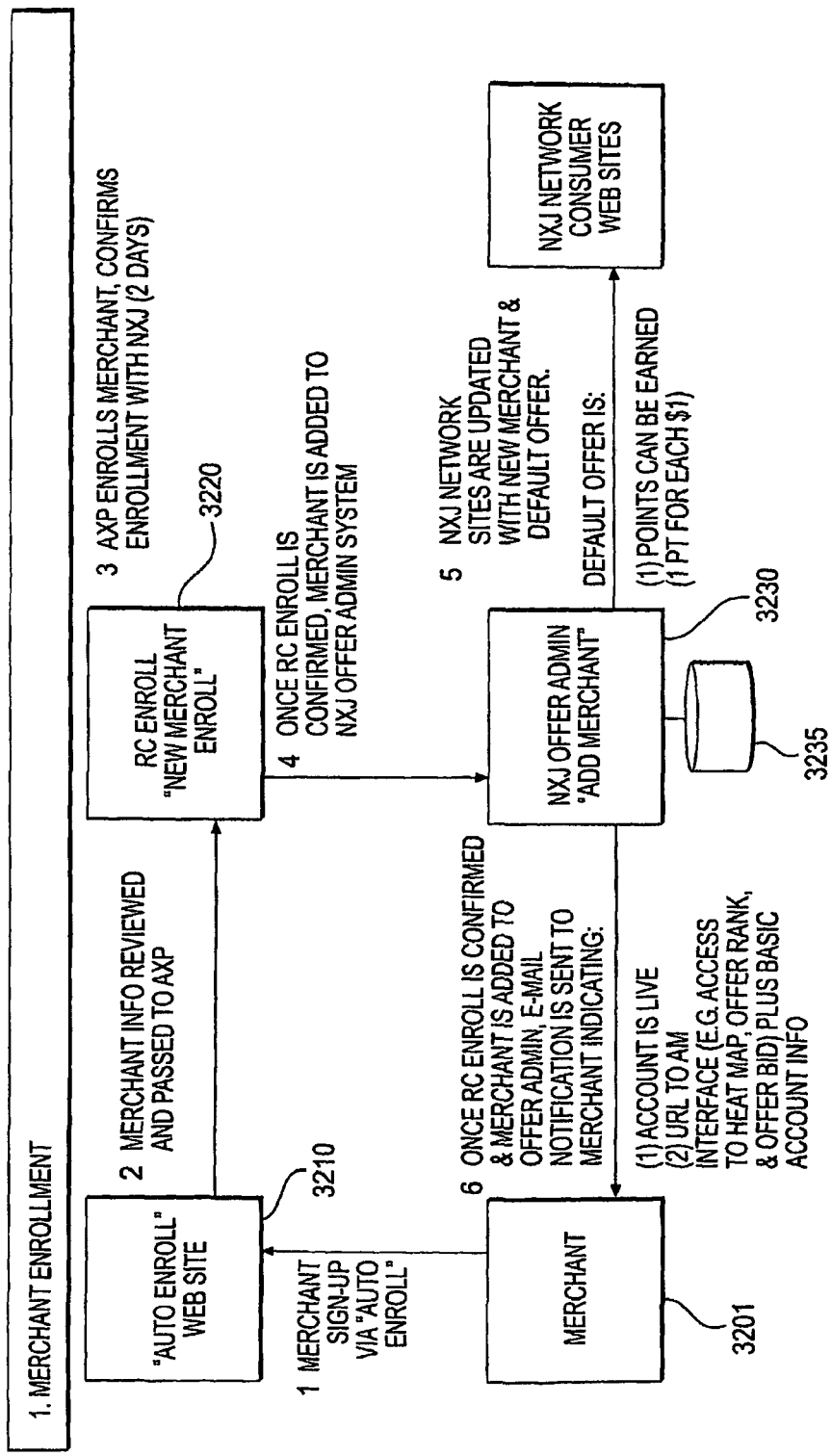
FIG. 32 is a flowchart describing an exemplary enrollment process according to the present invention.

FIG. 32 illustrates an exemplary flowchart describing the enrollment procedure. For instance, merchant 3201 accesses the auto-enroll module 3210 through a website, for example, to sign up with the system of the present invention. (Step 1) During the enrollment process, the merchant provides information about the merchant and the offer to be made available to the program members. Once the merchant has provided all the necessary information regarding the merchant, the offer, and the like, the merchant information is forwarded to the registered card module 3220. (Step 2) The registered card module 3220 sets up the merchant with identification information (e.g., merchant ID), type of offer including any discount/incentive information, and stores the information into the merchant database (not shown). Once the merchant enrollment is confirmed, the merchant's offer or offers are added to the offer administration module 3230. (Step 4)

The offer administration module 3230 adds and/or updates the offers into the offer database 3235 to be used by the narrowcasting engine (FIG. 2) to make the offer to the most relevant member at the most relevant time. (Step 5) If the offer does not include any discounts and/or incentives as the merchant is not required to do so as discussed above, the system of the present invention may add a default incentive, such as a reward point for a predetermined amount spent. The default offer may be in lieu of, or in addition to, any discounts/incentives offered by the merchant.

In addition, the offer administration module 3230 sends notification, such as an email, for example, to the merchant 3201 once the enrollment process has been completed. (Step 6) The notification may further include login instructions to allow the merchant access to the offer administration module 3230 for administering the merchant's offers, as described further below.

Figure 33:
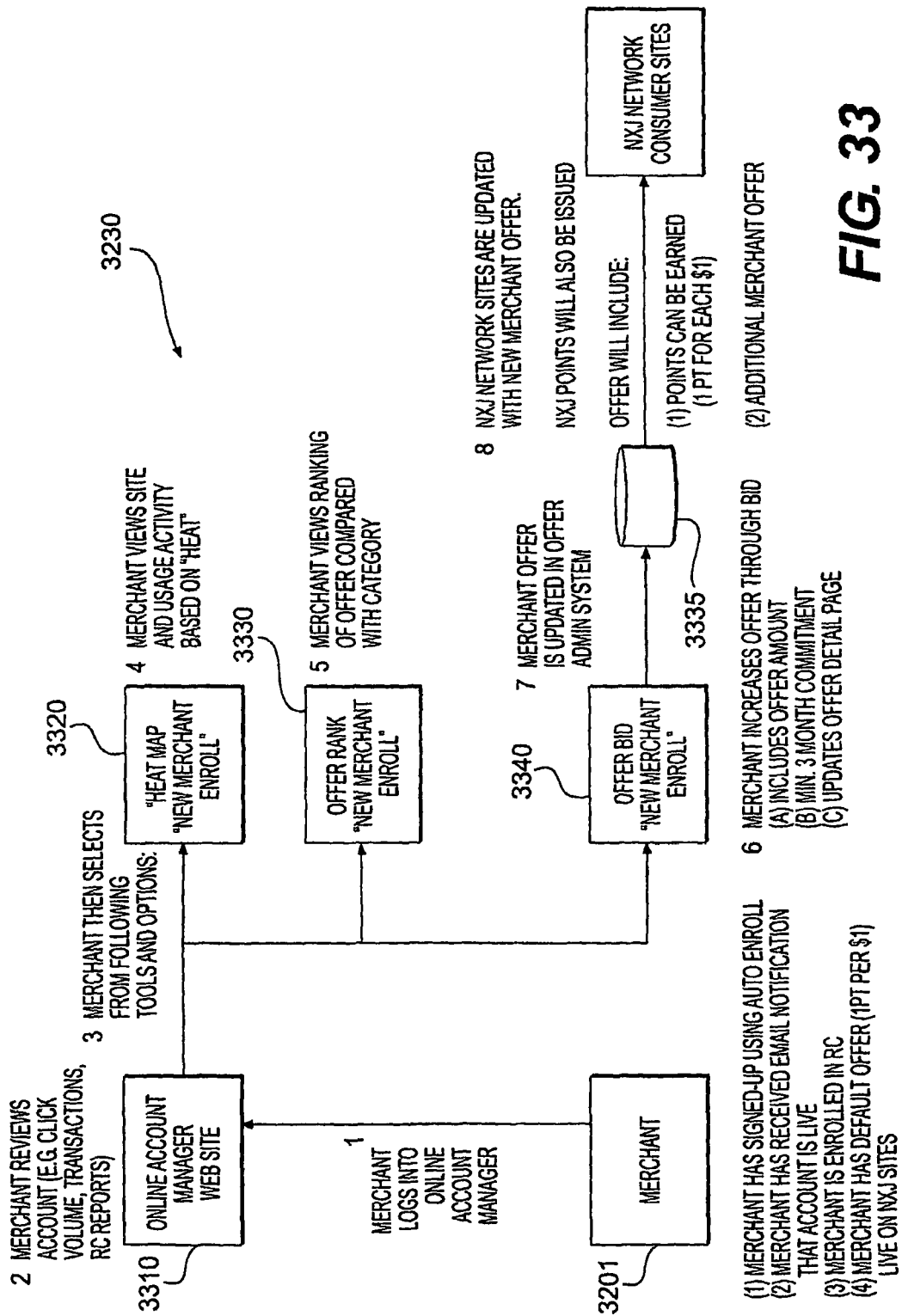
FIG. 33 is a flowchart describing an exemplary offer management process according to the present invention.

FIG. 33 illustrates a diagram describing exemplary administrative functions and tools of the offer administration module 3230 made available to the merchants. For instance, after enrollment, a merchant 3201 togs into the account manager module 3310 using the information sent to the merchant after enrollment. (Step 1) The account manager module 3310 allows the merchants to perform various administrative tasks, such as changing login/password information, changing merchant information, viewing and changing account information, and the like. Moreover, the account manager module 3310 provides various marketing tools to the merchant 3201 such as click volume data, transaction data, discount/offer redemption data, and the like. (Step 2) The marketing data and information available to the merchant may be varied depending on the level of service in which the merchant has enrolled. Some of the different levels of analysis and data that may be made available to the merchant are described above.

Furthermore, the account manager module 3310 provides various tools to the merchant to manage the offer or offers enrolled in the system of the present invention. (Step 3) In particular, the account manager module 3310 includes a heat map module 3320, an offer rank module 3330, and offer bid module 3340.

Heat Map Module

Figure 34:
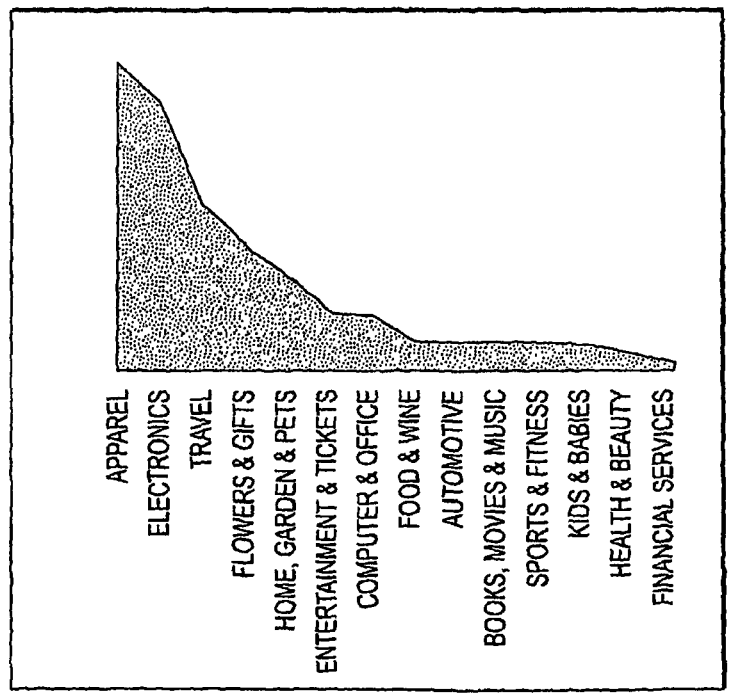
FIG. 34 is an exemplary view of a heat map according to an exemplary embodiment of the present invention.

The heat map module 3320 is a tool that conveys activity levels of various aspects of the marketplace to merchants using the system of the present invention. For instance, the merchant 3201 or a user can use the heat map module 3320 to view the most active category of merchandise over a specified time period. (Step 4) FIG. 34 illustrates an exemplary heat map that indicates the most popular type of merchandise being viewed/purchased on the system of the present invention. As shown in FIG. 34, "apparel" is the most actively viewed/purchased by the members on the system of the present invention followed by "electronics." While the exemplary heat map of FIG. 34 displays the activities of products/services based on type, the parameters may be customized by the user. For instance, the heat map may be configured to show the name of the most popular products rather than by product type. As another example, the heat map may be configured to show activity based on merchant name.

Moreover, the heat map may be "clickable" to show various levels of granularity of the information. For example, FIG. 34 shows activity based on product type (e.g., "apparel"). The heat map module 3320 may include the function of allowing the user to click on the "apparel" section of the heat map and a new heat map may be displayed showing activity levels broken down by categories of apparel (e.g., men, women, children, etc.) or show popularity over a period of time. Moreover, the user may click on one of these categories to generate yet another heat map that displays popularity based on the specific type of product (e.g., shirts, pants, suits, casuals, etc.). The heat map module 3320 may be configured to display any level of granularity for any type of parameter without departing from the scope of the present invention.

Figure 35:
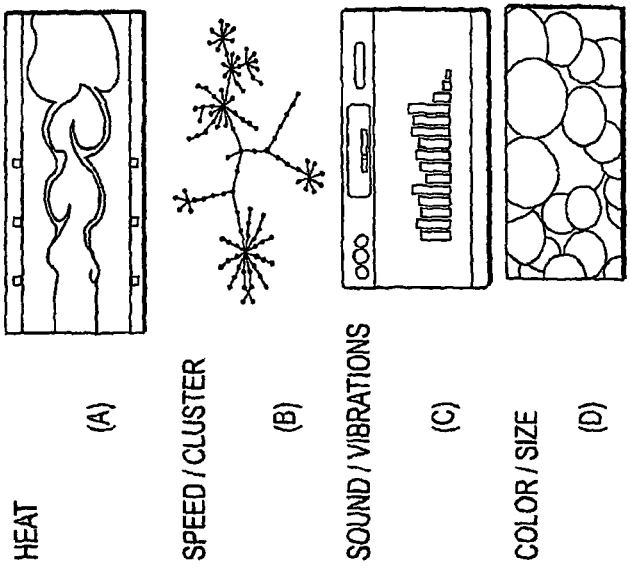
FIG. 35 is an exemplary view of various examples of heat maps.

Furthermore, while the exemplary heat map of FIG. 34 illustrates a colored area graph to convey levels of activity, other graphical representations may be used without departing from the scope of the invention. For instance, FIG. 35 illustrates various exemplary representations that may be used, such as (a) heat, (b) speed/cluster, (c) sound/vibrations, and (d) color/size. These exemplary representations are meant only to provide examples and not as limitations. Hence, other graphical representations may be used without departing from the scope of the invention.

Offer Rank Module

One of the challenges in marketing is to induce merchants to increase the amount of "variable" marketing (i.e., offers, discounts, incentives, etc.) offered to users. Unlike "fixed" marketing fees (e.g., periodic advertisements), variable marketing fees are often proportionate to the ultimate purchase price. Hence, this generally offers a more attractive or predictable return on investment to merchants. However, merchants are often unwilling to increase their variable marketing spending unless they have a better understanding of what impact the added spending will have on their traffic and how the change in traffic (if any) compares to their competitors. Unfortunately, prior art rewards/loyalty systems do not enable merchants to readily compare themselves to other merchants participating in the system. Moreover, prior art systems do not enable merchants to readily change the value of their variable marketing spending (e.g., increase/decrease the offer, discount, or incentive to users) to compete with other merchants using the system. Additionally, prior art systems do not enable merchants to analyze how their variable marketing impacts their traffic or how their offers compare with those offers from other merchants. Hence, merchants are generally reluctant to increase the value of the discounts and/or incentives they offer to users participating in the rewards/loyalty program.

In accordance with an exemplary embodiment of the present invention, another tool available to the merchant on the account manger module 3310 includes an offer rank module 3330. As shown in FIG. 33, the merchant 3201 may view where the merchant's offer ranks among other active offers in the same category in terms of redemption and effectiveness. For instance, FIG. 36 shows an exemplary view of an offer rank. As shown, the offer rank for the offer from merchant 3201 is ranked in popularity with other offers from merchants in a similar category of products/services. In this example, the offer from merchant 3201 is 6th in popularity when compared with other offers from competitors.

In this example, the offer rank module 3330 provides a pull-down menu to select product/service category as well as the time periods for comparison. Other types of parameters may be used for comparison without departing from the scope of the invention. While the exemplary embodiment of FIG. 36 displays the names of competitors, the names of merchants other than the viewing merchant may be removed to provide an anonymous offer rank. In this manner, the merchant 3201 may be able to assess what types of offers are popular among the users as well as the effect of the merchant's own offer in the marketplace. Based on this information, the merchant may create more effective offers to get better results.

Offer Bid Module

In conjunction with the offer rank module 3330, the account manager module 3310 includes an offer bid module 3340. In particular, the merchant 3201 may change its offer based on the information obtained from the offer rank module 3330 and/or other marketing information (e.g., click volume data) to increase the effectiveness of the offer. (FIG. 33: Step 6) The offer bid module 3340 may be accessed from the account manager module 3310 or from the offer rank module 3330 (e.g., via buttons 3610) as shown in FIG. 36. More specifically, using the offer rank information from FIG. 36, the merchant 3201 may want to increase the offer level (e.g., higher discount) to make the offer more desirable. If it appears from the click volume data from the account manager module 3310 that there is little click traffic, then the merchant 3201 may want to increase or change the offer parameters to create more traffic.

Figure 37:
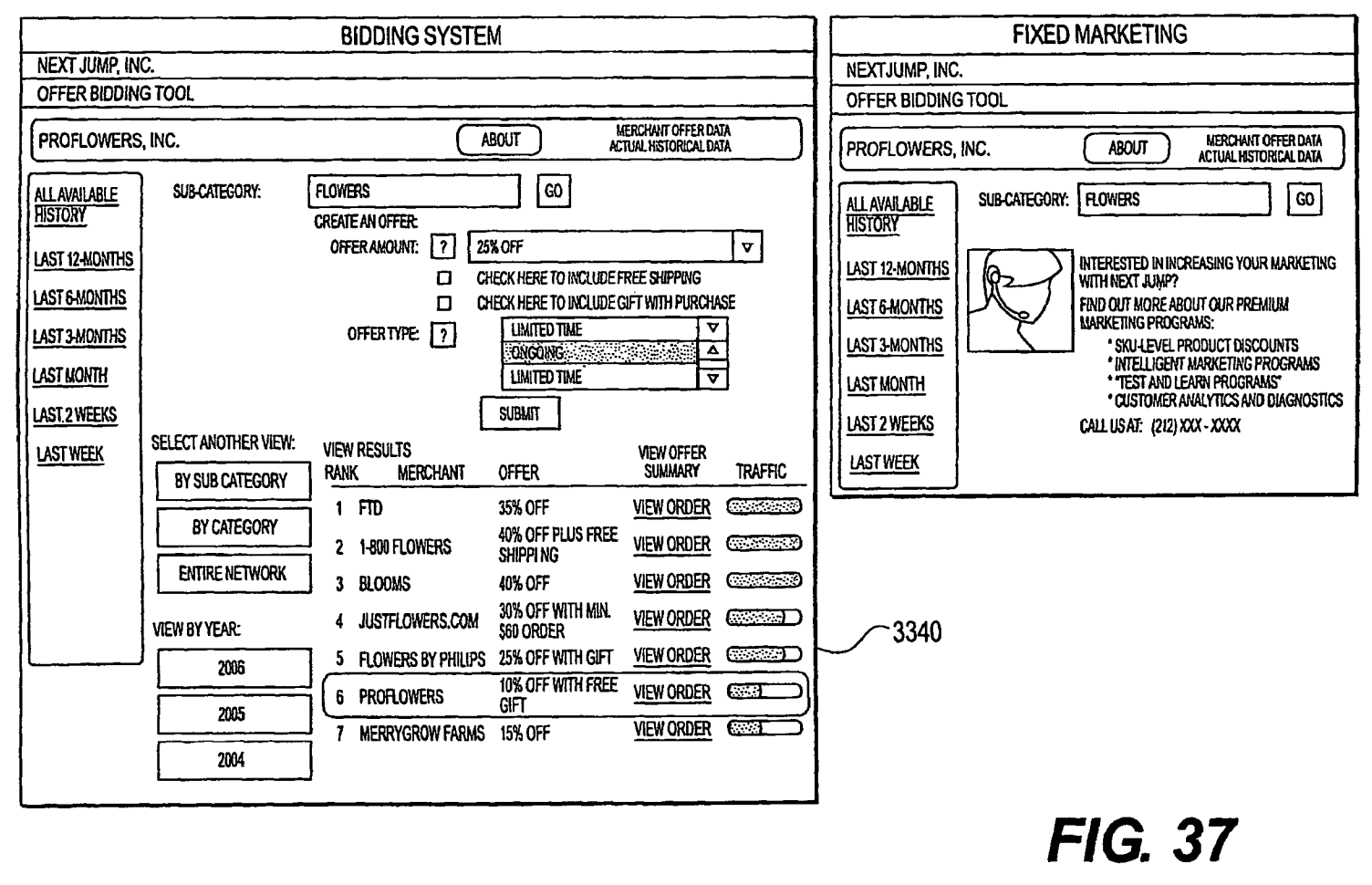

FIG. 37 illustrates an exemplary view of the offer bid module 3340. As shown, the offer bid module 3340 allows the merchant 3201 to change the offer to be more attractive to potential consumers. For example, the offer bid module 3340 shows a portion of the offer rank to compare the current offer to those that are more successful from competitors. The offer bid module 3340 allows the merchant

3201 to change the level of discount, for example, give free shipping, an additional gift, and/or change the offer type (e.g., from "limited time" to "ongoing"). Other types of offers/incentives may be used without departing from the scope of the present invention.

Once the offer has been changed through the offer bid module 3340, the new offer is updated in the offer database 3335. (Step 7) The new offer is then updated to be matched and distributed to the relevant users. (Step 8) The offer bid module 3340 allows the merchants to benefit by being able to change the offer parameters to create a more effective offer and users benefit by receiving better offers due to the competitive marketplace created by the offer rank module 3330.

Merchant Mapping

Figure 38:
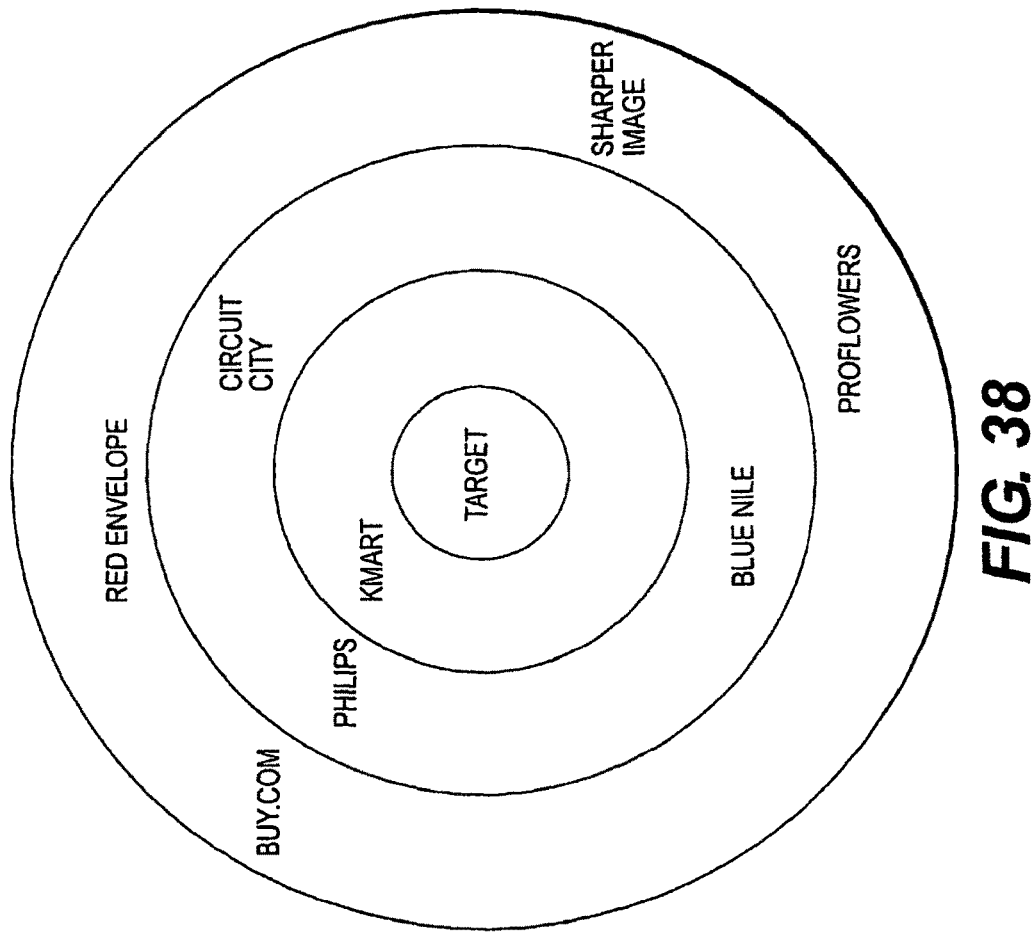
FIG. 38 is an exemplary view of merchant mapping.

Merchant mapping allows for the exponential collection of preference data. As discussed above, reminder data is captured from a customer. The active data gathering module (ADG) may dynamically present a user with a preference question (e.g., a reminder) or with an offer and monitor if the user responds. This reminder data is collected and analyzed. The analysis may include filtering merchants based on the recency, frequency, and magnitude of the reminder data. The recency of the data is a rating of how old the data is. The frequency of the data is how often a particular offer is requested. The magnitude of the data is how many times an offer has been requested or the dollar amount of an offer. The reminder data is then used to send similar types of offers to customers in the future. For example, the similar types of offers may include offers from the same vendor or related vendors. FIG. 38 is an example of a merchant mapping. The example shows that customers that respond to offers from a retail store, such as Target®, or shop at the store may also be interested in offers from various other merchants displayed in the mapping. The closer in proximity a merchant is to the center of the circle, the more likely a customer is to respond to an offer from that merchant. For example, as shown in FIG. 38, customers shopping at Target® may respond to offers from Kmart® or SmartBargains.com more than offers from Buy.com. Merchant mapping allows for the selling of a marketing campaign that applies to one merchant to be sold or used by another merchant that is found in the merchant mapping.

Example

The following describes an exemplary workflow of a merchant interacting with the merchant network services module in accordance with the present invention. As shown in FIG. 39, a merchant accessing the system of the present invention for the first time is guided through a series of screens, such as an auto-enroll wizard the examples of which are shown in FIGS. 40A-40D, to setup an account to begin offering a product or service.

Figure 40B:
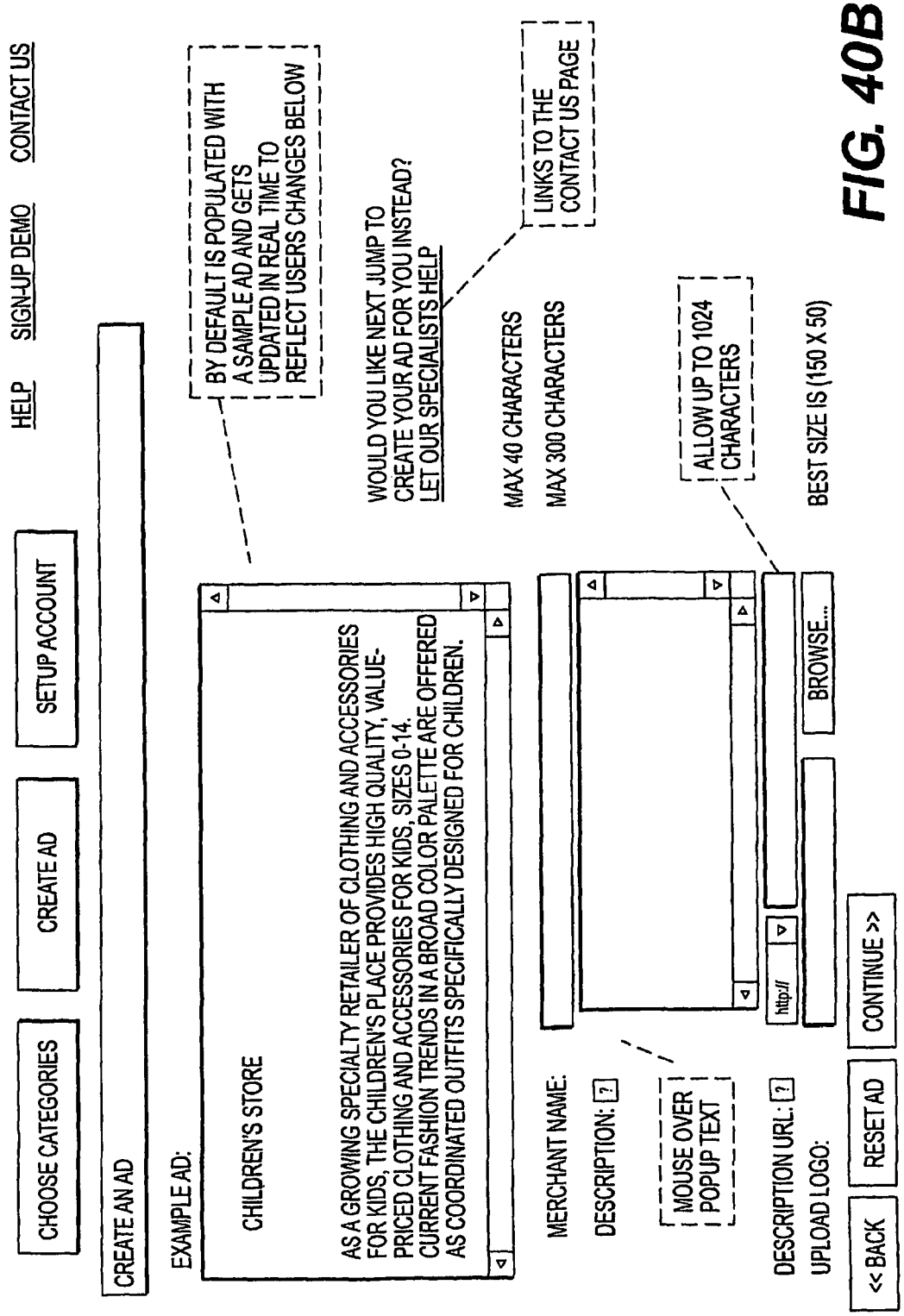
Figure 40C:
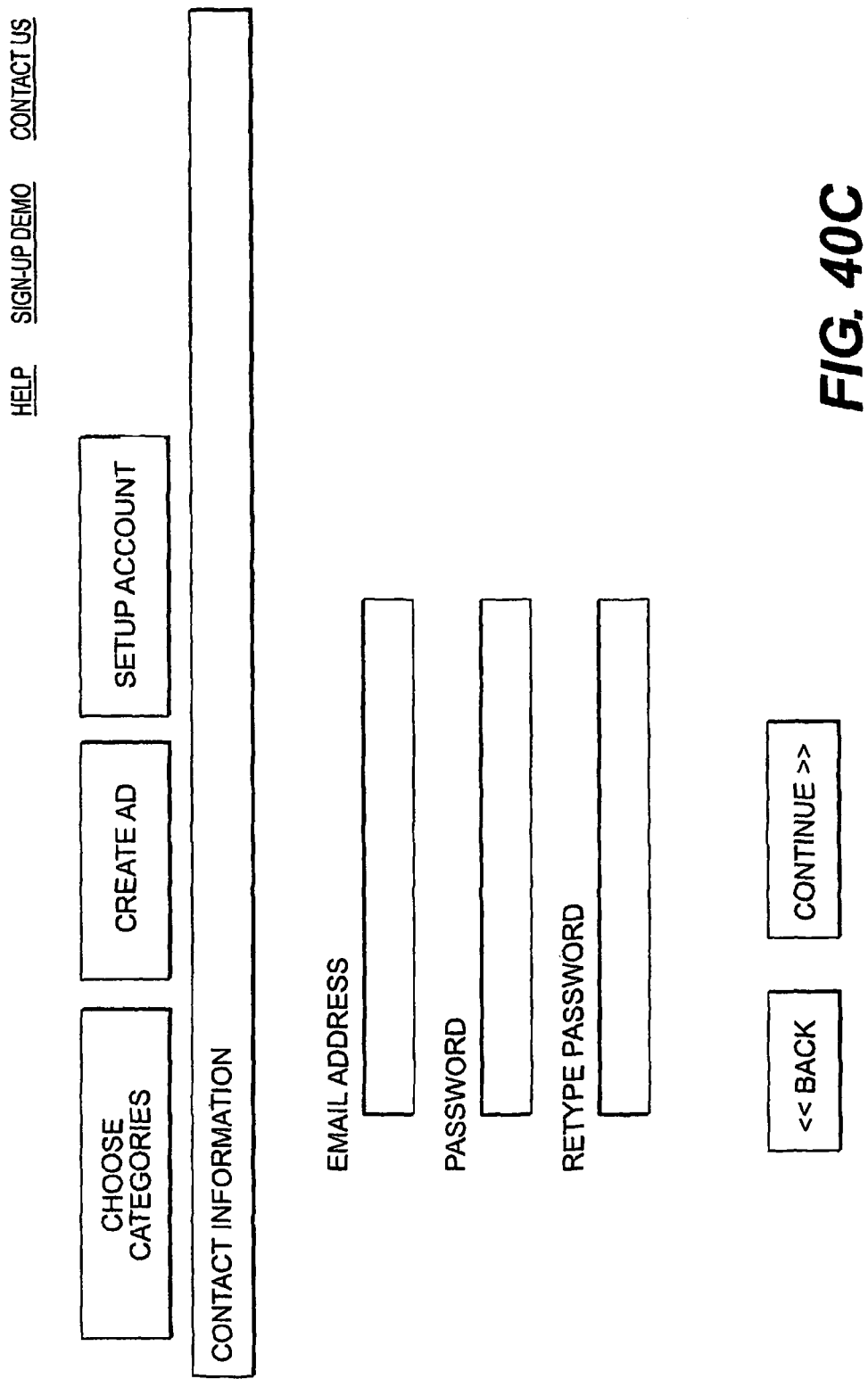

In particular, in step 3902, the merchant is first guided to a screen that allows the merchant to pick a category that best describes the merchant. FIG. 40A shows an exemplary embodiment of a category interface through which the merchant selects a category. In step 3904, the merchant is then guided through a screen to create an advertisement/information about the merchant to be displayed on the system of the present invention. FIG. 40B shows an exemplary embodiment of an ad creation interface. As shown, the ad creation interface may be a pre-designed template with various fields that can be customized by the merchant to create an advertisement about the merchant. In step 3906, the merchant is guided through a screen to enter the contact information needed to send the activation information as well as to setup a password for accessing the merchant services module of the present invention. (FIG. 40C) In step 3908, the merchant is notified that the initial enrollment process is complete and to expect an email message to confirm enrollment (FIG. 40D).

Figure 41:
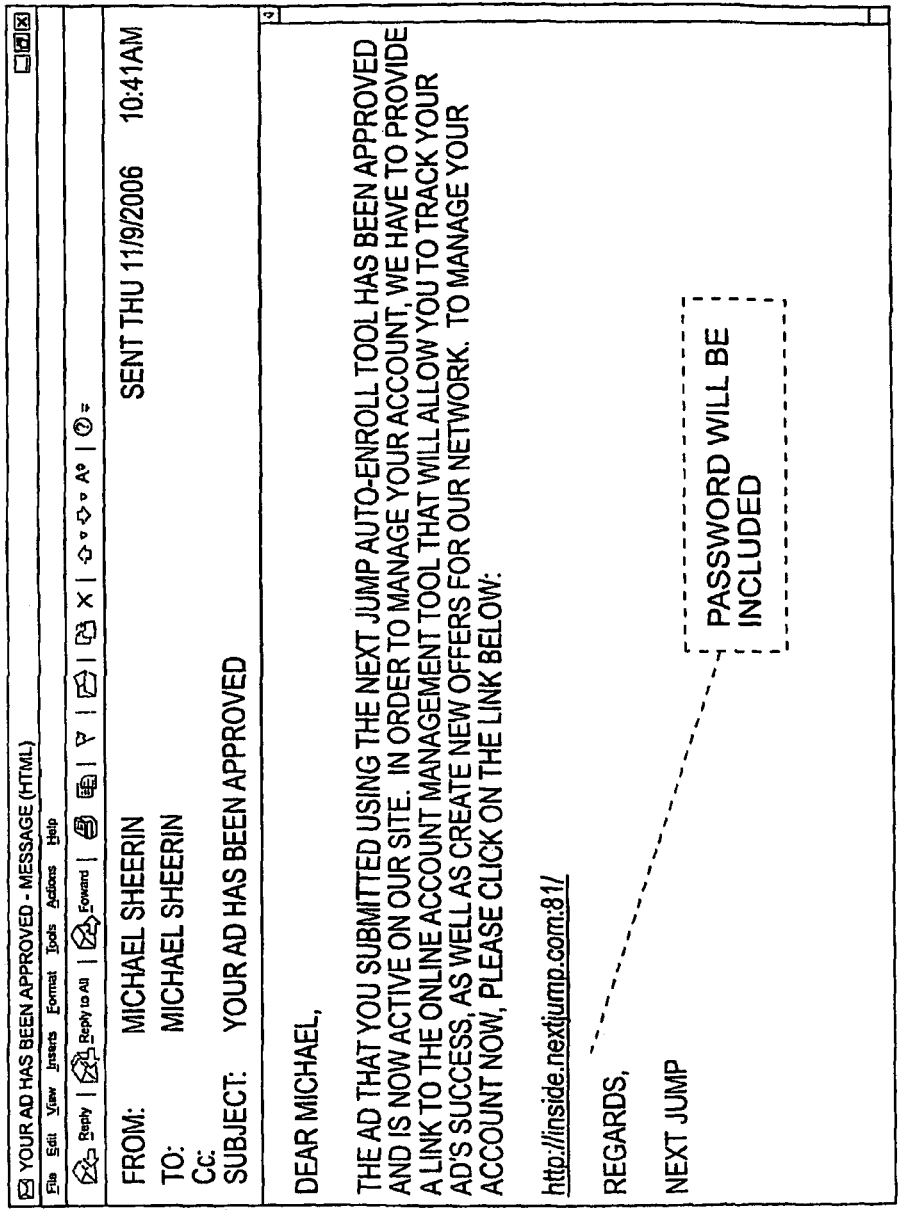
FIG. 41 is an exemplary view of an enrollment notification in accordance with the present invention.
Figure 42:
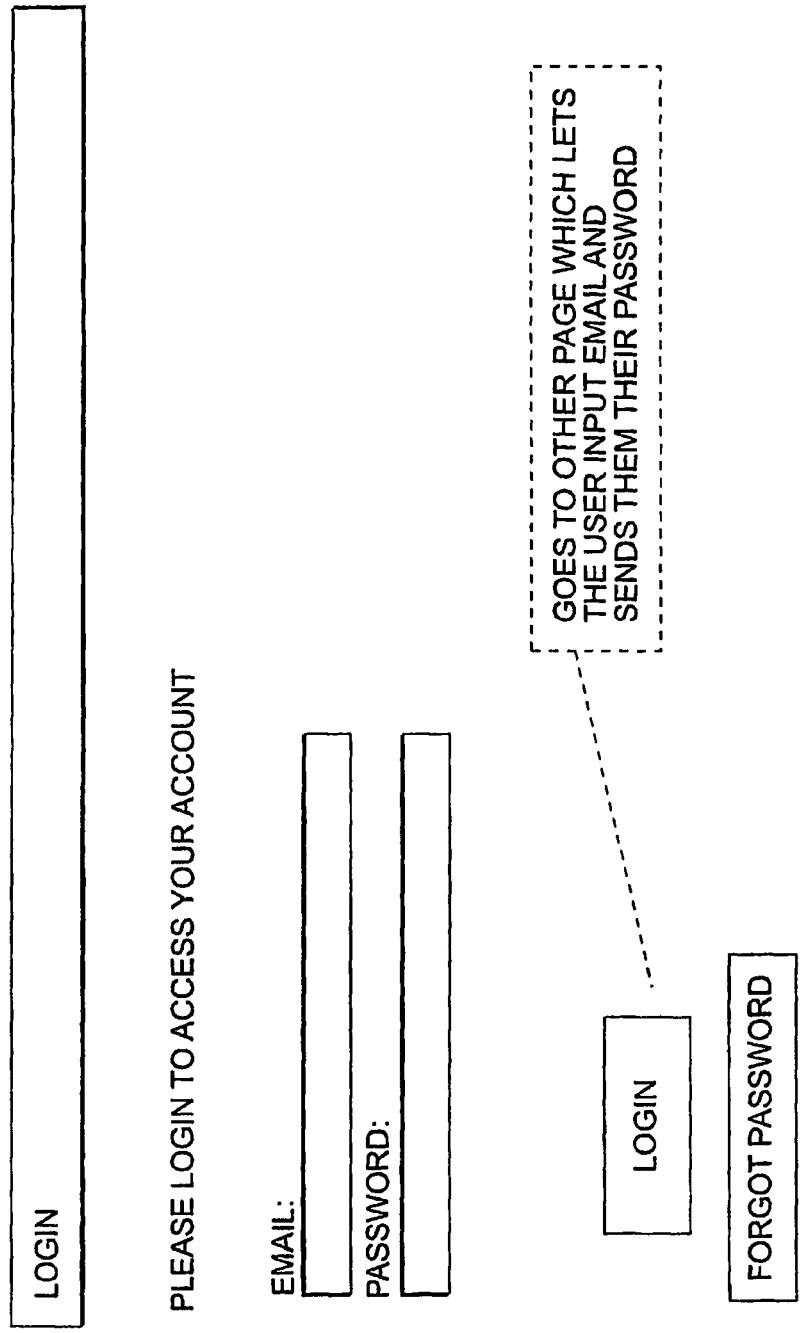
FIG. 42 is an exemplary view of a login page in accordance with the present invention.

Once the initial enrollment has been completed, the merchant waits for approval. When the approval process is completed, an email message containing a link to the account manager module 3310 (FIG. 33) and instructions on how to login is sent to the merchant. (Step 3910) FIG. 41 shows an exemplary embodiment of the email message that is sent to the merchant to confirm enrollment. When the merchant activates the link (e.g., a URL to the account manager module 3310), the merchant is guided through a screen for logging into the merchant services module. FIG. 42 shows an exemplary embodiment of the login interface. During the login procedure, the system of the account manager module 3310 determines if the merchant is logging in for the first time. (Step 3914) If this is the first time logging in, the merchant is guided through a series of screens for setting up the account and creating an offer.

Figure 43B:
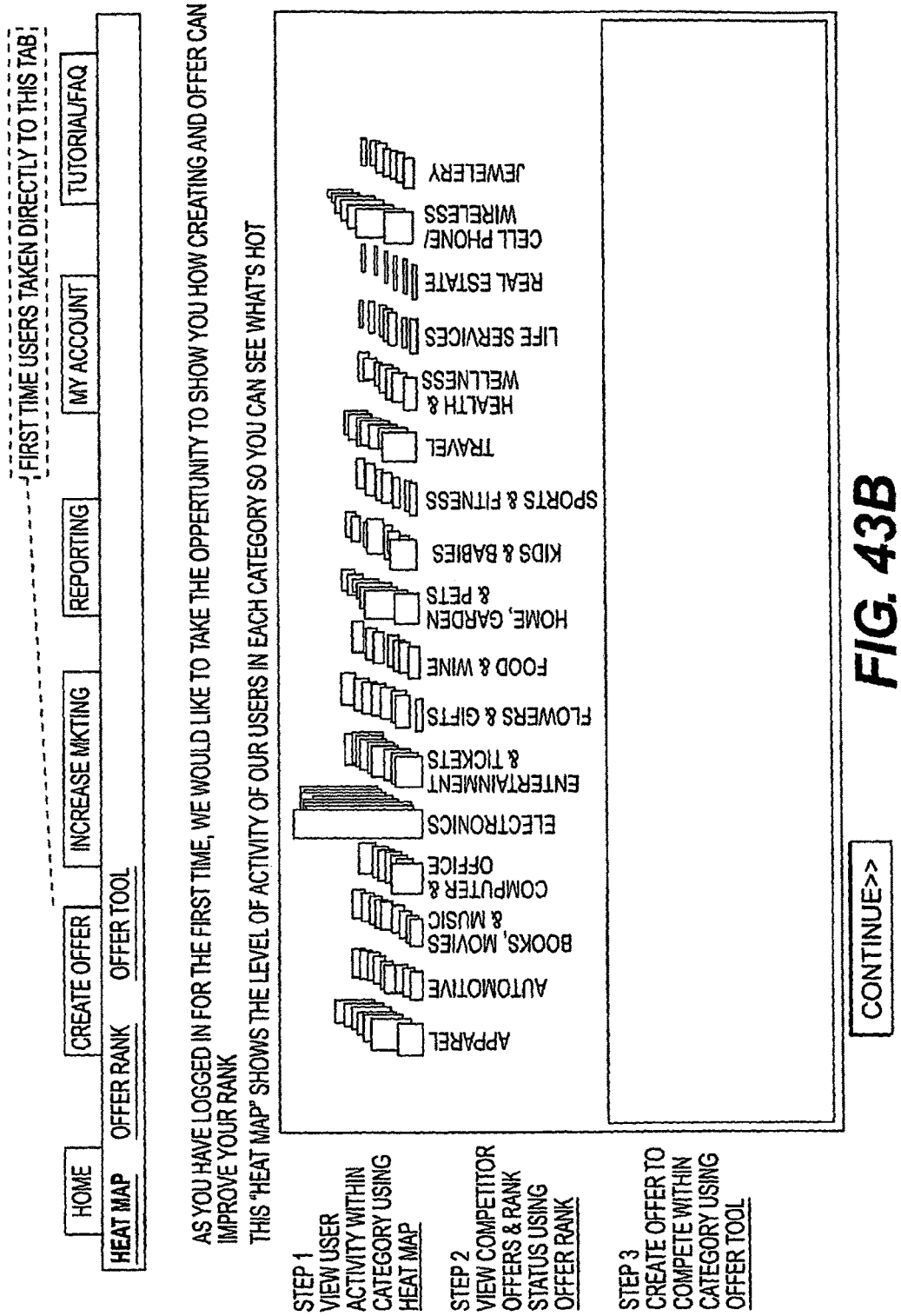

In step 3916, the merchant is guided through a screen for setup up of the merchant's account. FIG. 43A shows an exemplary embodiment of the account setup interface. In step 3918, the merchant is guided through the heat map screen so that the merchant may get a sense of users' activities on the system. FIG. 43B shows an exemplary embodiment of a heat map showing users' activities based on merchant categories, for example. In the exemplary heat map of FIG. 43B, the "hottest" category appears to be in the "electronics" category, followed by "cell phone/wireless" and "apparel." As described above, the merchant may also "drill down" into each of the categories (e.g., into sub-categories) to obtain a display with higher granularity. In step 3920, the merchant is guided through the offer rank screen so that the merchant may get a sense of the most popular offers in a particular category of merchants. FIG. 43C shows an exemplary embodiment of an offer rank showing the offers ranked in popularity (i.e., traffic) for a particular category of merchants. The merchant's offer will not be shown when the merchant is logging in for the first time as no offer has been created. The other merchants' identities are kept anonymous to ensure privacy. In step 3922, the merchant is guided through the offer tool screen so that the merchant may create an offer based on the information obtained from the heat map and the offer rank. FIG. 43D shows an exemplary embodiment of an offer tool interface. The merchant can designate, in part, the offer, length of the offer, and any descriptions of the offer. Once the offer has been created, a confirmation screen is displayed informing the merchant that the created offer will be made available to the users. (Step 3924).

Figure 44D:
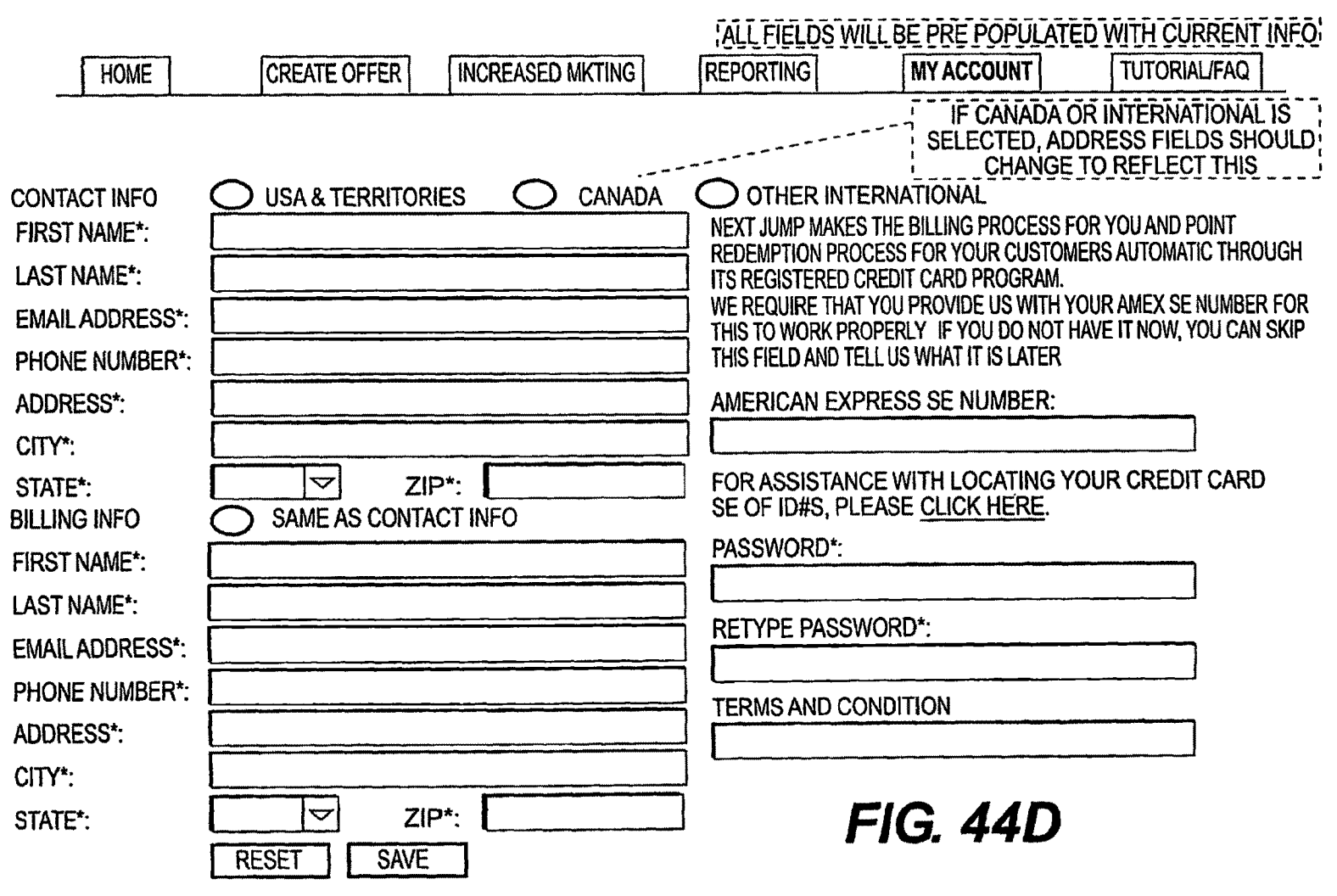

Once the merchant has set up the account and created an offer for the first time, the merchant is taken to the account manager module homepage. All subsequent logins occur at step 3912, bypassing the auto-enroll wizard (i.e., steps 3902-3910). The login at step 3912, once registered, directs the merchant to a homepage 3310a on the account manager module 3310. FIG. 44A illustrates an exemplary embodiment of the homepage 3310a. In the example shown, FIG. 44A displays an account summary, online lead generation information, and account activity. However, other information may be displayed without departing from the scope of the invention.

As shown in FIG. 39, the account manager module 3310 includes access to various management tools (3310a-

3310*e*). Access to these tools is depicted as tabs 4410 in FIG. 44A. However, other interfaces, such as buttons, for example, may be used without departing from the scope of the present invention. In the example shown in FIG. 44A, the tabs 4410 may include access to "Home" (3310*a*), "Create Offer" (3310*b*), "Increase Marketing" (3310*c*), "Reporting" (3310*d*), "My Account" (3310*e*), and "Tutorial/ FAQ" (3310*f*) tools. FIGS. 44A-44E show exemplary displays and interfaces of some of these tools.

In particular, as shown in FIG. 39, various marketing tools may be accessed through the Increase Marketing tool 3310*c*. As shown, the Increase Marketing tool gives the merchant access to heat map module 3320, offer rank module 3330, and the offer tool module 3340 with functionalities as explained above. Furthermore, the merchant is also given the option of selecting between a "Revenue Sharing" 3950 and "Fixed Marketing" 3960 tool. Additionally, the selection of the Create Offer 3310*b* tool guides the merchant through steps 3902-3910 to create another offer.

Payment/Registered Card Module

An exemplary embodiment of the system of the present invention includes the following components and entities:

Users: Users are potential customers of goods and services. The users may be members of a loyalty program through which the incentives are offered.

Card Issuers (partners): The card issuers are entities that offer credit or debit cards to the users. Examples of card issuers may be American Express, Bank of America, Chase, CitiBank, etc.

Processors: The processors are entities that process transactions from credit or debit card purchases. The processors may be separate entities from the card issuers.

Registered Cards: Registered cards are credit or debit cards issued to the users by the card issuers that have been registered with the user's loyalty program to be used as the main transaction vehicle for purchases of goods and services. Examples of cards that are registered include, but are not limited to, MasterCard®, Visa®, American Express®, Discover®, Diner's Club®, and the like.

Merchants: Merchants are entities who offer goods and services to users. The merchants may offer incentives to the users through the loyalty program to which the users' may be members. The incentives may range from discounts to free offers as well as other perks intended to entice the users to purchase merchants' goods and/or services.

Sponsors (User Networks): Sponsors are entities that provide loyalty or perks programs to the users. Sponsors may be employers, institutions (e.g., alumni or bar associations), and companies. Sponsors may also be merchants or card issuers as well.

Registered Card ("RC") Processing System: The RC processing system is a middle system that is the backbone of the present invention. The RC processing system provides the registration of the cards, processes transaction data from the card issuers, matches users' transactions with the incentives/discounts offered from the merchants, and distributes awards to users.

Registered Card Processing System

Figure 45:
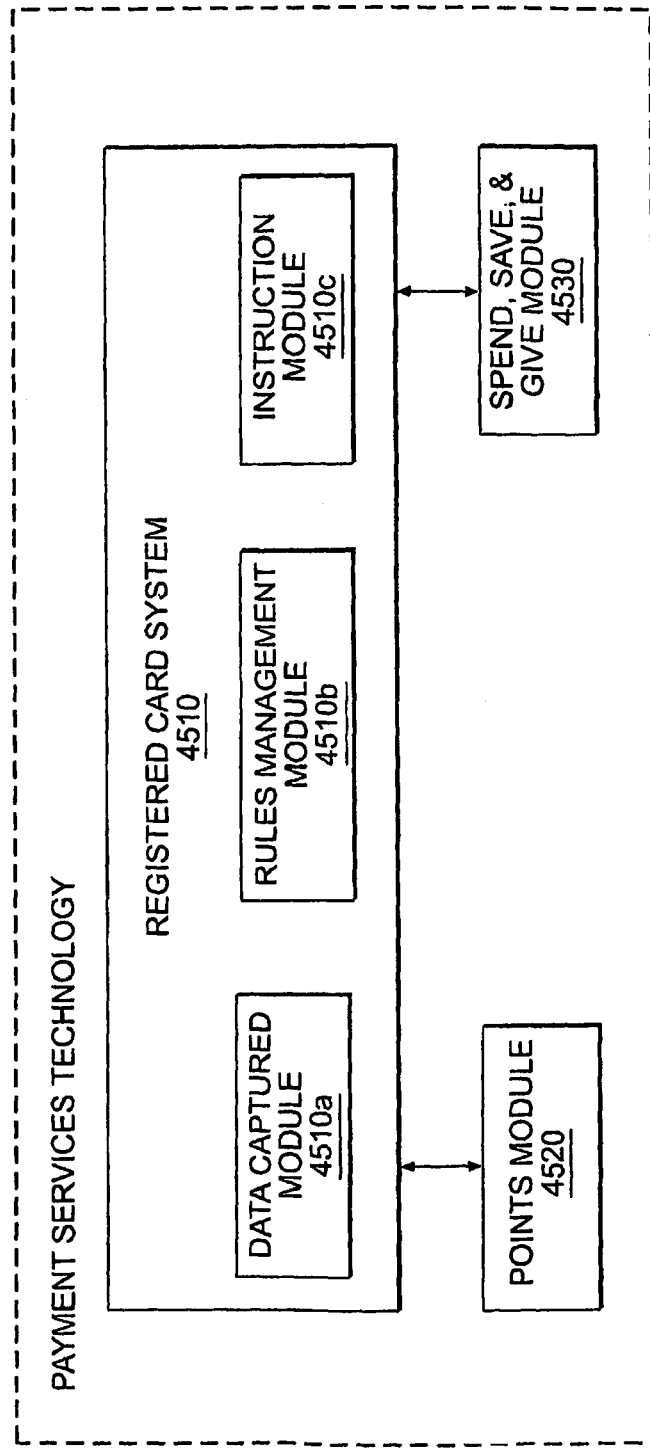
FIG. 45 is a block diagram illustrating an exemplary embodiment of a payment processing system in accordance with the present invention.

FIG. 45 shows an exemplary embodiment of a payment processing system in accordance with the present invention. As shown in FIG. 45, the payment processing system of the present invention includes a Registered Card ("RC") Processing System 4510. The RC processing system includes a data capture module 4510*a*, rules management module 4510*b*, and instruction module 4510*c*. The data capture module 4510*a* captures, among other things, the enrollment information such as the user information, registered card information, and loyalty program to which the user is enrolled. The rules management module 4510*b* includes access to the rules management database (e.g., FIG. 2: 240*c*) that stores the business rules to be applied for each user in determining the incentive to be applied. Based on the business rules, the rules management module 4510*b*, among other things, calculates the discount/incentive due to the user. The instruction module 4510*c* sends instructions to the issuer or other third party processing entity of the registered card for proper processing and applies the discount/incentive due to the user. The discounts/incentives include accumulating reward points (i.e., earning the points), redeeming the accumulated points (i.e., spending the points), depositing the points in an account (i.e., saving the points), or giving the points to a charitable account. Some or all of the components of the RC processing system 4510 may be implemented in conjunction with or independent of the narrowcasting system 38 described above.

The RC processing system 4510 also includes a points module 4520 and a spend, save, and give module 4530 to be described in detail below. In general, the points module 4520 maintains an accounting of accumulated and redeemed points based on the users' activities. The spend, save, and give module 4530 processes the various accounts to which the user has designated the redemption of the points to flow.

The RC system of the present invention may be implemented on a computer network using Internet or Intranet portals. The users may be given access to the portal that is specific to the users' enrolled loyalty program. The RC system of the present invention may be accessed by the user at any end-user client device, such as computers, kiosks, and mobile devices that is connected to the system via a local area network (LAN), wide area network (WAN), Internet, peer-to-peer connections (i.e., direct connections via modem, for example), or wireless networks. The portals may be implemented on the system of the present invention or may be implemented on separate systems.

RC System Workflow

A loyalty or reward program for a sponsor, such as an employer who wants to provide a benefits program to provide incentives for its employees, may created in conjunction with or independent of the narrowcasting system 38 as described above. A loyalty program portal, for example, may be implemented on the system of the present invention or may be implemented by a separate system. The sponsors may be any entity, including merchants and card issuers, who want to provide benefits and incentives to its members in exchange for their loyalty to the sponsor.

Once a loyalty program is set up, the sponsor notifies its intended users regarding the loyalty/perks/rewards program and encourages the users to enroll in the loyalty program. The loyalty program provides incentives to the users by making available offers from merchants that would peak the users' interests. The matching of the incentives from various merchants to the most appropriate users is explained above.

To enroll, the user accesses the portal and provides the necessary information to become a member of the loyalty program. During enrollment, the user is provided the opportunity to register a payment card to be used in purchase transactions resulting from the incentives provided by the loyalty program. The user information and the payment card information are captured by the data capture module 4510*a*. In particular, the users' personal information and the card information associated with the user are stored in a user database. In addition, the portal, as shown in FIGS. 56A-56F, allows a user to access and view discount/incentives that is available to the user or the user has received, including any reward points earned or redeemed by the user.

Figure 46:
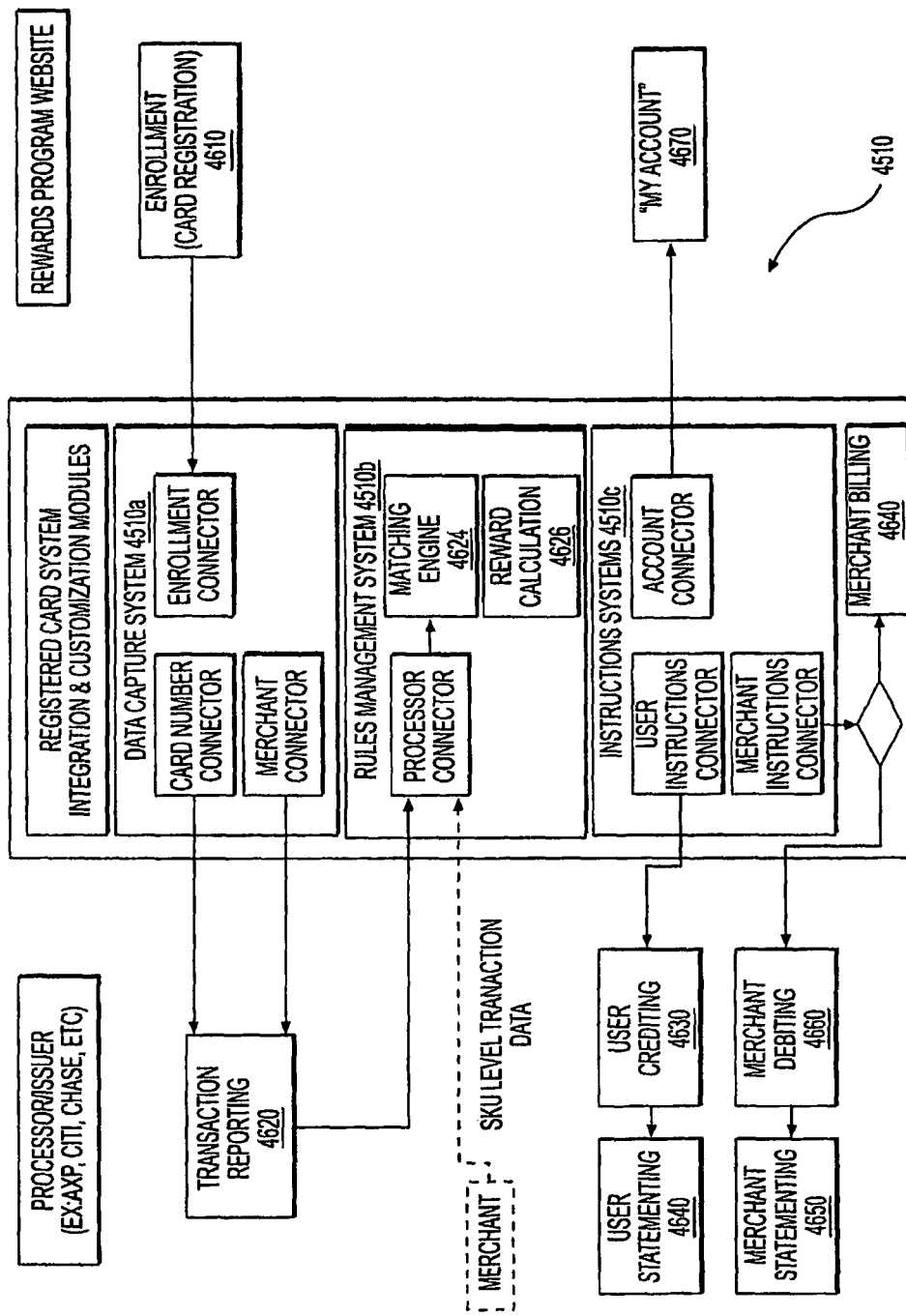
FIG. 46 is a block diagram illustrating an exemplary embodiment of a registered card processing system in accordance with the present invention.
Figure 47:
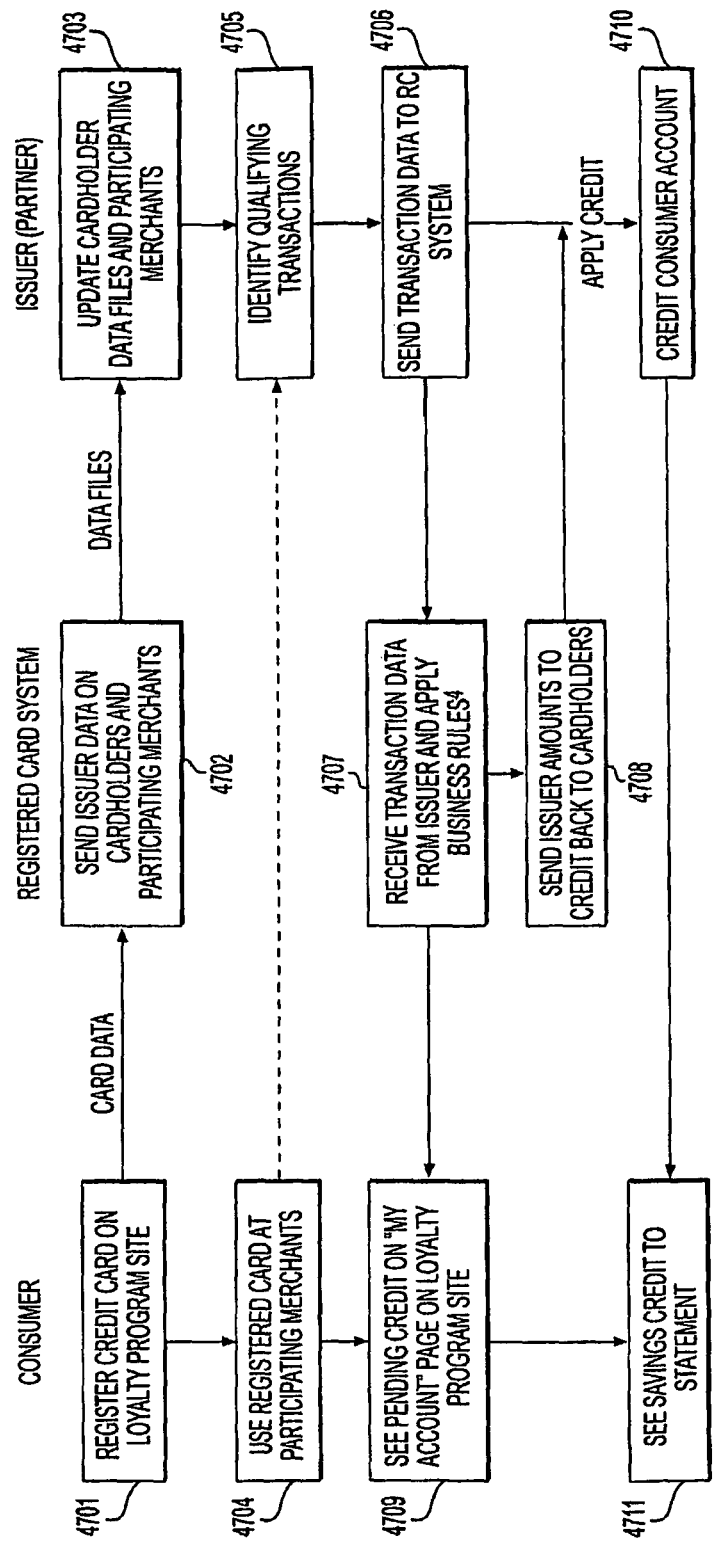
FIG. 47 is a workflow diagram illustrating an exemplary registered card process in accordance with the present invention.
Figure 55:
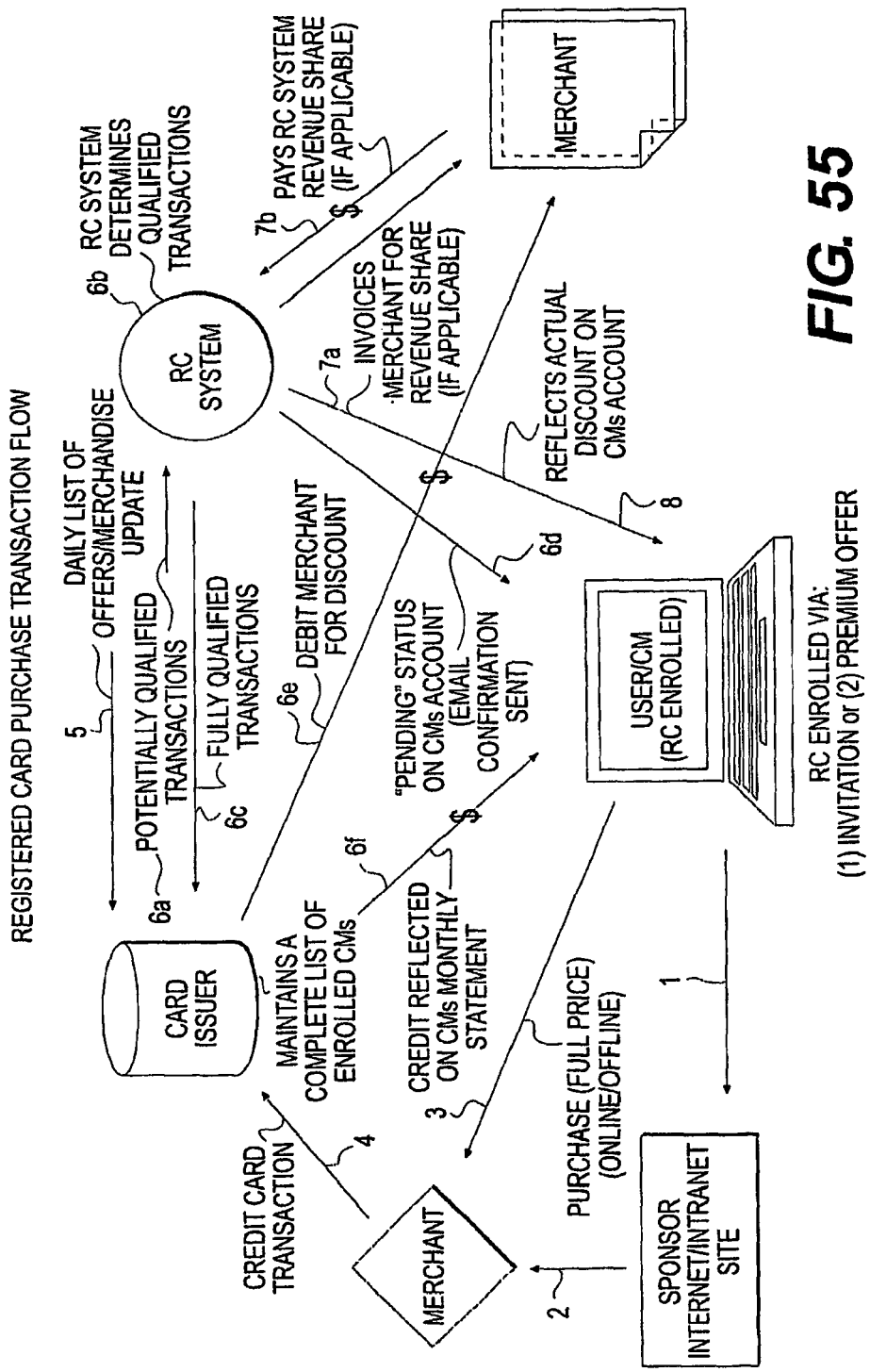
FIG. 55 is a diagram illustrating an exemplary process for a registered card purchase transaction.
Figure 56A:
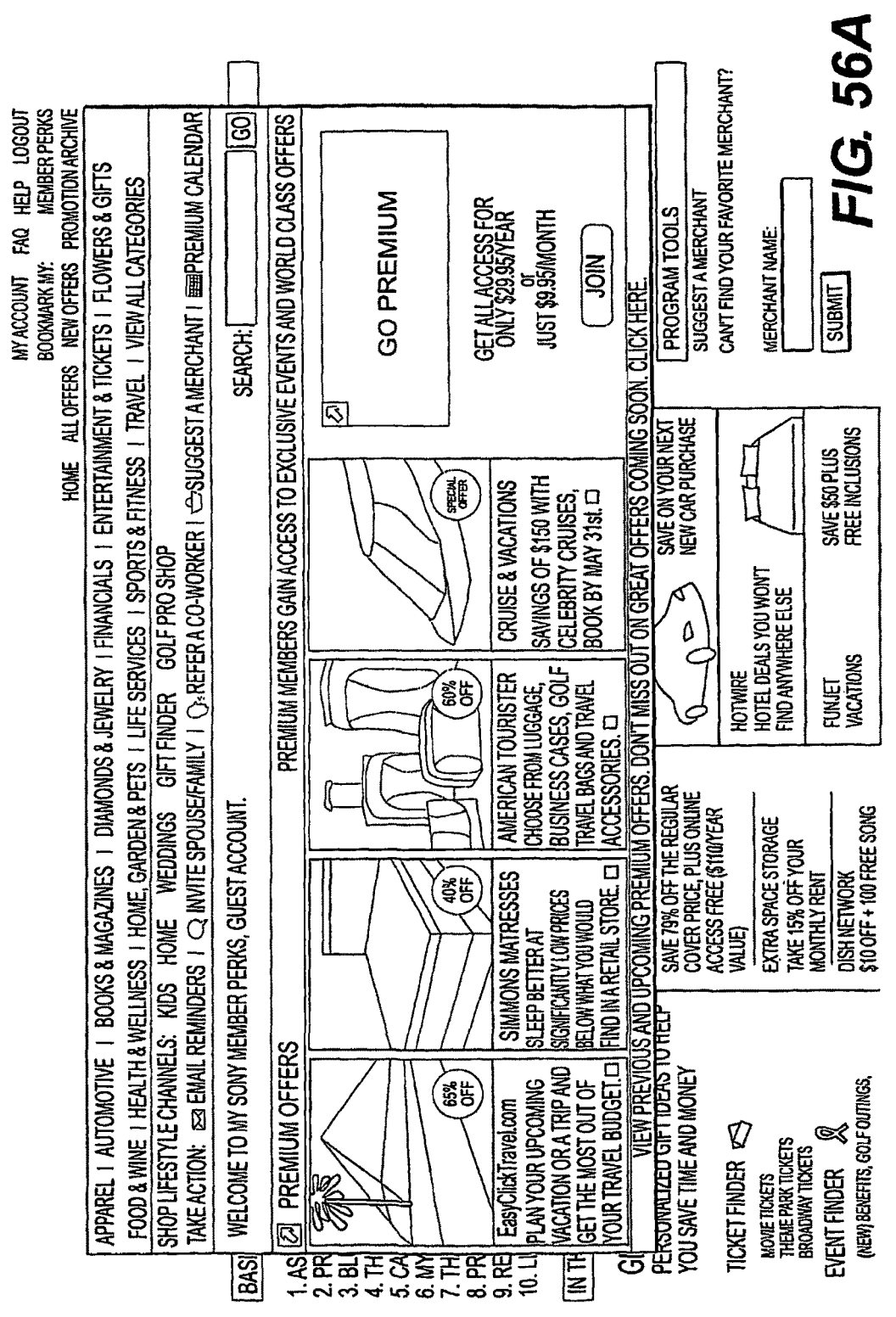
Figure 56B:
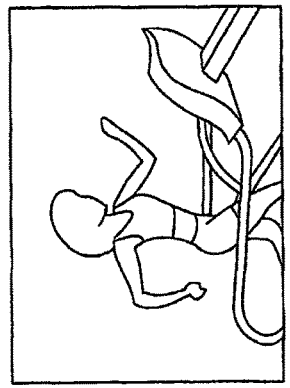
Figure 56C:
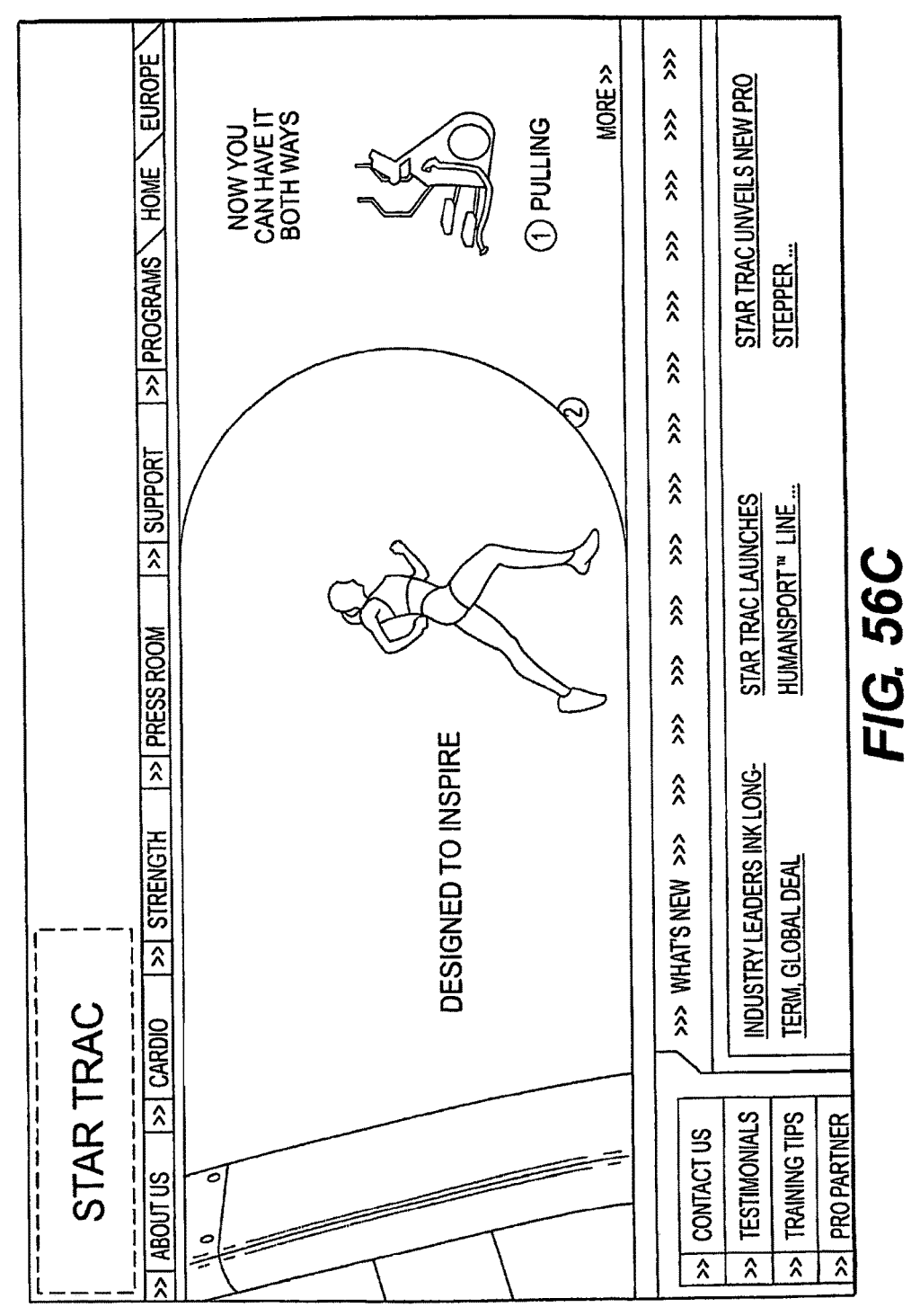
Figure 56D:
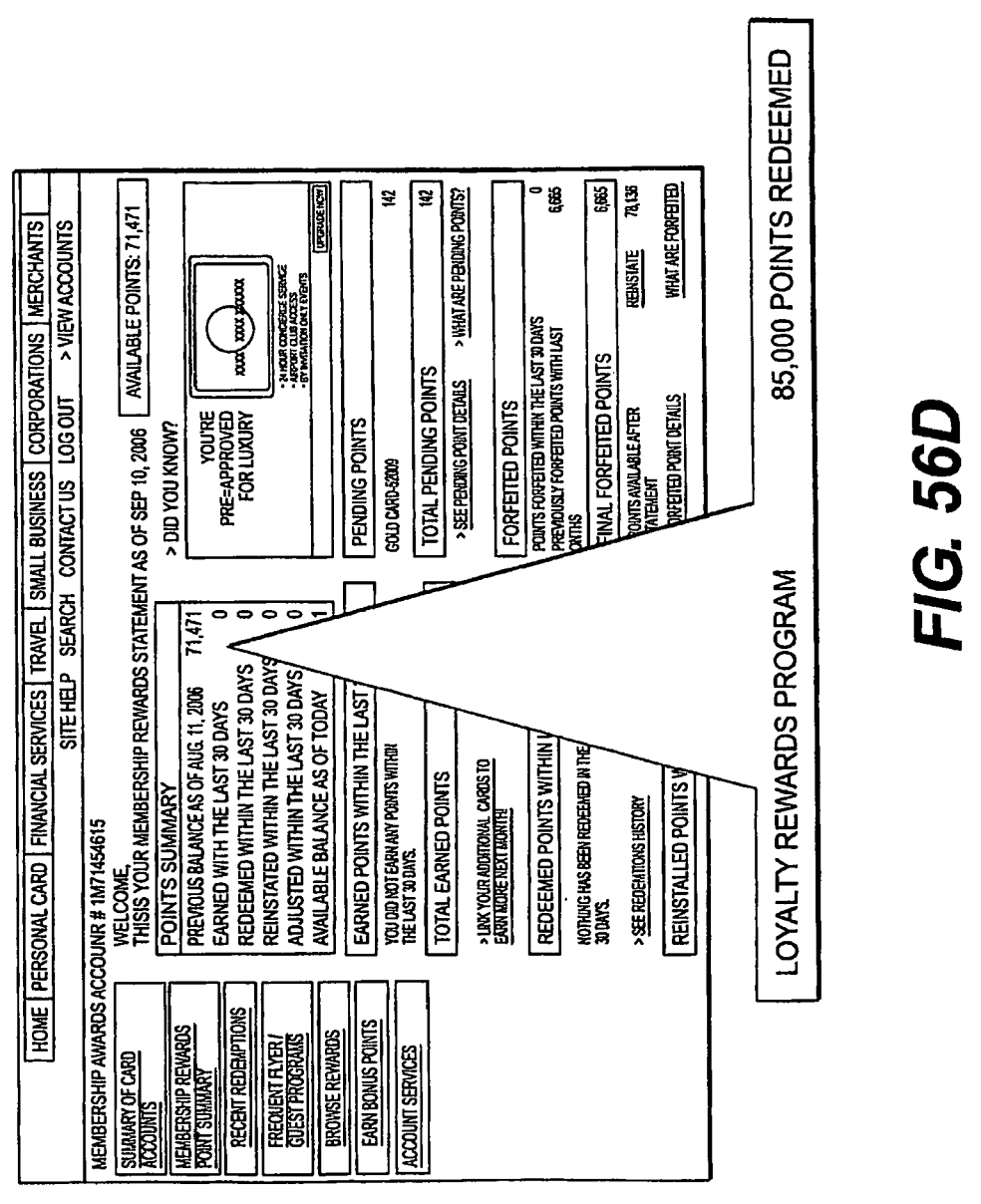
Figure 56E:
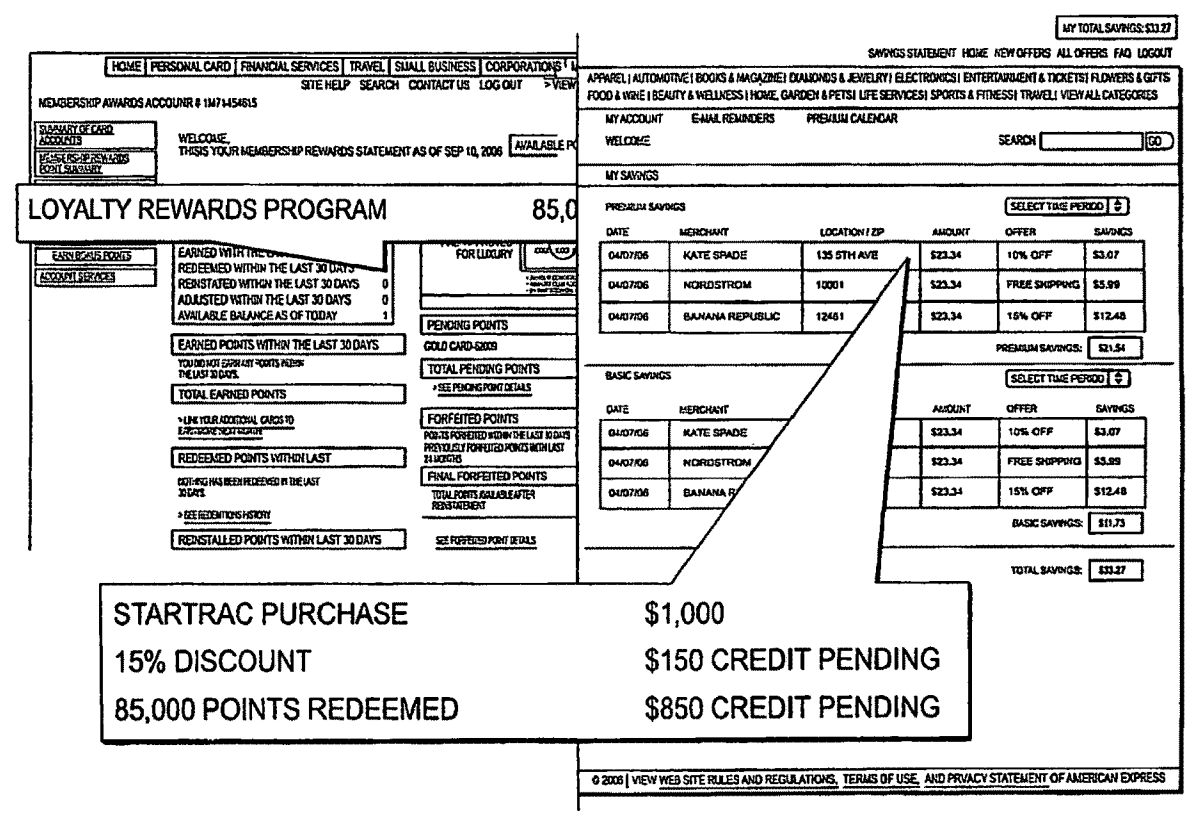
Figure 56F:
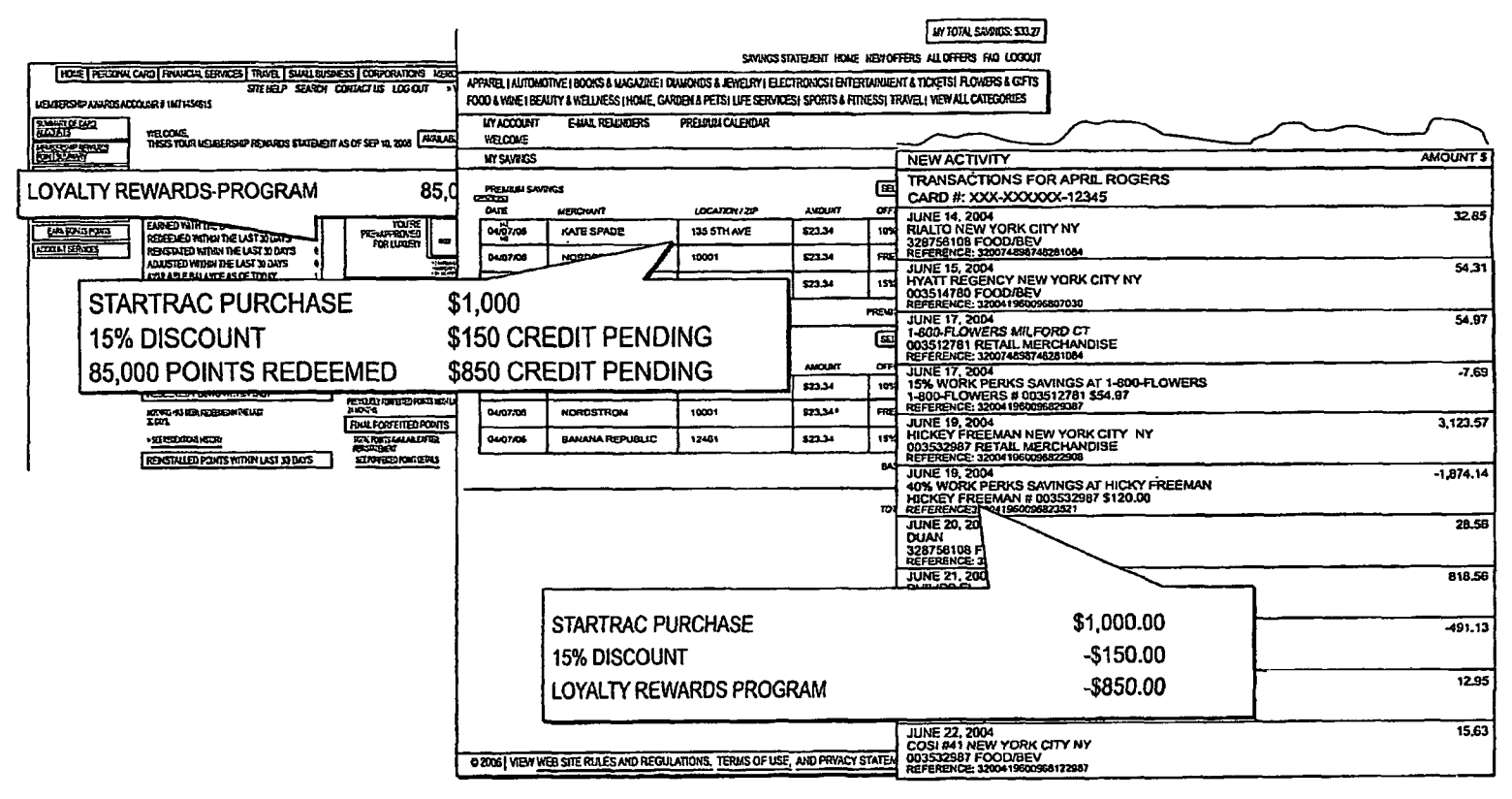

FIG. 46 shows an exemplary embodiment of the RC processing system 4510 in accordance with the present invention. FIG. 47 shows a workflow diagram of an exemplary process according to the present invention. FIG. 55 shows an example of the overall registered card purchase transaction flow. As shown in FIG. 46, the RC processing system 4510 is an interface between the rewards/loyalty program, the card issuer, the processor, and the merchant. In particular, a user accesses the rewards/loyalty program through a portal as shown in FIGS. 56A-56F, for example. The rewards/loyalty portal includes an enrollment module 4610 through which the user may register as a member to the rewards/loyalty program. During enrollment, the user is asked to register a payment card to be used for performing transactions to take advantage of the merchant incentives offered through the rewards/loyalty program (FIG. 47: step 4701). While the card may be registered during enrollment, the user may register a card, add additional cards, or change a registered card with another, at any time through the rewards/loyalty program portal without departing from the scope of the invention.

The enrollment information and/or the card information, including the cardholder name and card number, are captured in the data capture module 4510a. The card may be registered by passing the card information directly to the data capture module 4510a or through a surrogate. That is to say, instead of passing the card information directly to the data capture 4510a, in an alternate embodiment, the enrollment module 4610 may contact the card-issuer to receive a surrogate ID to be used in place of the actual card information. Once the data capture module 4510a receives the user information including the card information (either the actual card information or a surrogate ID), the data capture module 4510a sends to the transaction reporting module 4620 the registered card information (FIG. 47: step 4702). Optionally, a list of participating merchants may also be sent (FIG. 47: step 4702). The transaction reporting module 4620 updates the cardholder data files and participating merchant list (FIG. 47: step 4703). In this way, the card issuer or processor monitors any transactions occurring at the participating merchant associated with the registered card.

Acceptance of Offer

Once the user has enrolled in the loyalty program (now a "member"), the user is provided with a list of incentives and offers from merchants that would most interest the user on the loyalty/rewards program portal. In an exemplary embodiment, the incentives and offers may be narrowcasted to the user through the narrowcasting system 38 as described above. However, the narrowcasted incentives/offers are not required. The incentives offered to the user are stored in the rules management module 4510b. In one exemplary embodiment, the user can take advantage of the incentive/offer made available to the user on the portal by simply going to the particular vendor related to the incentive and making a purchase. The purchase may be made at the physical store, on-line, over the phone, through the mail, or any other purchase channel as long as the user uses the registered card.

In another exemplary embodiment, the user can sign up (i.e., reserve) to take advantage of the incentive or offer through the loyalty/rewards program portal. This is a form of "RSVPing" (i.e., reserving) the offer or incentive for use in the future. By signing up for the offer or incentive, the payment processing system of the present invention can accumulate analytics of the user's purchasing behavior. These analytics may be input into the narrowcasting system 38 as additional data sets to further enhance the relevance of future offers to be made to the user as well as for market reporting features for the merchant who made the offer. Accordingly, this tool is useful for proving incrementality of an offer. This tool is also useful in limiting the redemption of an incentive to a present number of people or consumers (i.e., "offer control").

Partially Qualified Transactions (PQTs)

During a purchase from the merchant offering an incentive, the user uses the payment card registered with the RC processing system 4510. As briefly discussed above, the purchase may be made on-line (i.e., through the merchant's website), in person at a physical location of the merchant, through a mail order catalog, by phone, or any other method without departing from the scope of the invention (FIG. 47: step 4704). The transaction reporting module 4620 monitors the registered card activities and identifies transactions made with the participating merchant using a registered card as a partially qualified transaction ("PQT") (FIG. 47: step 4705). Identified PQTs are then sent to the rules management module 4510b of the RC processing system 4510 (FIG. 47: step 4706). In an exemplary embodiment, the RC processing system 4510 may track both an offer that is reserved as discussed above and an offer that has been used by a customer.

In the rules management module 4510b, a matching engine 4624 matches the PQTs with the associated merchants and passes the information to a rewards calculation module 4626 to determine the type and amount of the incentives/reward, if any, based on stored business rules (FIG. 47: step 4709). In this regard, the matching engine 4624 may analyze the PQT to match the transaction based on merchants and/or products. Product based matching will be further explained in detail below. Moreover, the rewards calculation module 4626 applies stored business rules from a business rules database (e.g., FIG. 2: 240c) to the received PQTs.

Figure 49:
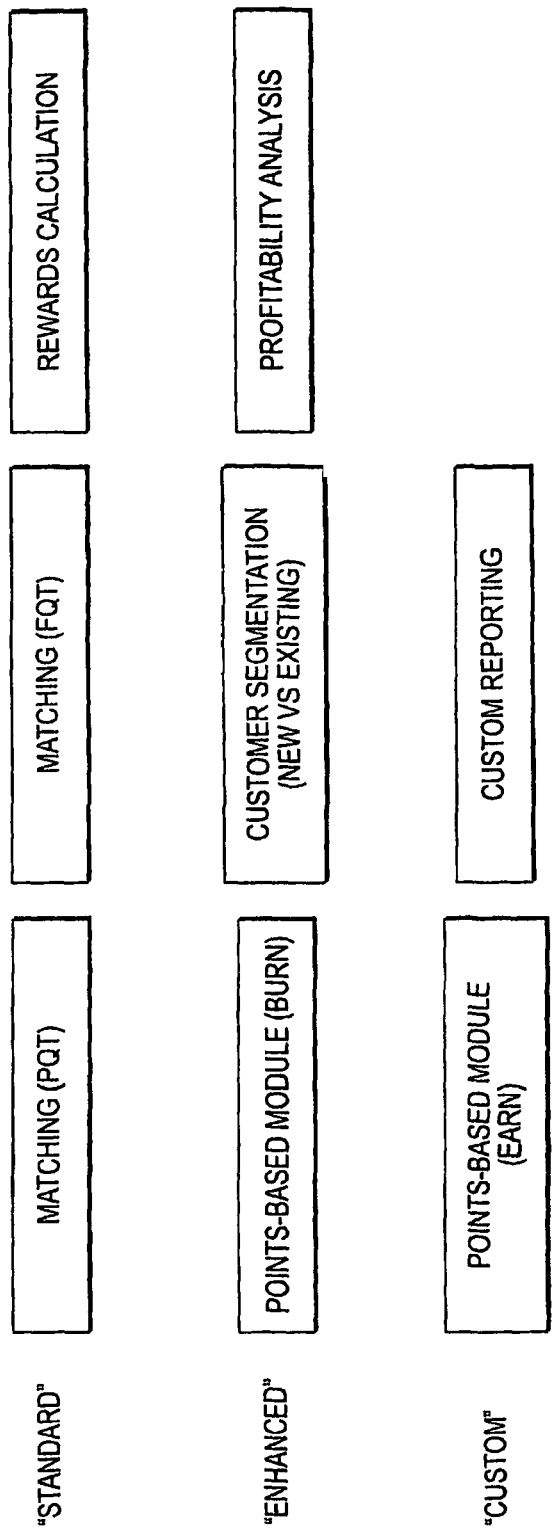
FIG. 49 is a view of exemplary rules available through the registered card system.

The business rules may be defined by the merchants to specify the terms of the offer to be made to the user. The rules management module 4510b processes the PQT based on rules associated with the user. The business rules database (e.g., FIG. 2: 240c) connected to the rules management module 4510b contains all of the business rules associated with all the incentives made available to the users. FIG. 49 describes examples of the different types of rules that are available through the registered card system.

For example, the rules may include time-based criteria (e.g., time period in which the incentives offered are valid), user-specific criteria (e.g., incentive only available to members of a specific loyalty program), and terms of the incentive/discount. Other business rules related to the incentive are stored in the rules database to be applied in processing the transaction data. For example, the conditions may include, but are not limited to, the type of incentive, the amount of incentive, to whom the incentive applies, the time frame for the offer, and any other conditions of the offer. Moreover, the same merchant may target a specific type of user by customizing the amount of the incentive or terms of the offer down to the individual level. In order words, an offer by the same merchant may be different between users based on the users' profiles. In this way, the merchants can customize the offer as generally or as detailed as the merchant desires. The rules management module 4510b automatically applies the rules to the user's PQT to determine the level of discount/incentive based on these rules.

Offer Types

The following types of incentives or offer types may be made by merchants. These offer types are associated with the rules specified by the merchants. A first offer type is the delivery of discounts or savings, such as a percentage or dollar amount off, a percentage or dollar amount off of a purchase greater than a set dollar amount, or a percentage or dollar amount off up to a certain maximum discount. A second offer type may be used to attract new customers or bring back loyal customers. The offer may include allowing each user to utilize the offer one time for a purchase. For example, this offer type may state "50% off Next Purchase" or "$100 Savings on First purchase." A third offer type may include making offer "A" available the first time a customer makes a purchase and making offer "B" available for all subsequent purchases. A fourth offer type may include allowing for repeating charges to be discounted for a set period of time. An example may include "25% off your first six months of delivery." A fifth offer type may include tiered offers or offers based on dollar ranges of merchandise. An example may include "10% off purchases up to $99, 20% off purchases $100-$999, and 30% off purchases $1000+." A sixth offer type may include an offer that is available a certain number of times per period of time.

In addition, a seventh offer type may include an offer that will be available on a specific day of the week. An eighth offer type may include requiring a user to view the Offer Detail Page within a specified window of time or to view and take active steps (i.e., clicking on a web page) to take advantage of the offer. This type of offer eliminates accidental discounts for a customer who would have paid full price. This offer type is discussed above with regards to reserving an offer. A ninth offer type may include imposing minimum and/or maximum spending and discounts. A tenth offer type may include an offer that is individualized for a particular user. For example, this user-level offer may include giving person A 10% off and person B 20% off. An eleventh offer type may include network level offers that allow a merchant to make an offer available to an entire network (or segments of the network). For example, company A employees get 10% off and company B employees get 20% off. These offer types can be combined to create customized solutions and all offer types can be based on dollar or percentage calculations. In addition, an offer type can be used to create cross promotion of products.

By way of example, a flower vendor may create an offer for free shipping to all men who live in New York City that purchase 5 dozen roses on February 13 between the hours of 8:00 am and 10:00 am using a specific type of credit card. Another example is a merchant creating an offer that only a small number of consumers can take advantage of. Once the offer has been used by a set number of consumers, a merchant can create a second offer. The second offer is typically a lesser offer, but still provides consumers with an incentive to make a purchase. Any business rule for the offer may be made without departing from the scope of the present invention. In particular, criteria for determining the business rule to maximize the merchant's marketability may be performed by the narrowcasting system of the present invention as described above. Other types of offers and any combinations thereof may be used without departing from the scope of the invention.

Fully Qualified Transactions (FQTs)

Once the PQTs have been processed by the matching engine 4624 and rewards calculation module 4626 to verify and determine the type and amount of the incentive, if any, the PQTs are converted to fully qualified transactions ("FQTs"). The FQTs and the determined rewards associated thereto are sent to the instruction module 4510c. The instruction module 4510c sends instructions to the card issuer to credit back the user based on the calculated discount, for example, offered by the merchant for this user (FIG. 47: step 4709). For example, the instruction module 4510c sends credit data to a user crediting module 4630, which applies the credit data to a user statement module 4640 to reflect the credit given to the user on the user's monthly statements. The instruction module 4510c also updates the pending credit due to user in the user's account accessible through the rewards/loyalty program portal (FIG. 47: step 4708). The card issuer then credits the user's account in the amount identified by the instruction module 210c (FIG. 47: step 4710) and the credit amount is reflected in the user's monthly card statement (FIG. 47: step 4711).

The card issuer receives the discount information from the instruction module 4510c and directly applies the credit to the user's registered card account. The original transaction amount and the credited discount amount are reflected as separate transactions in the user's card statement. FIG. 48 shows an exemplary statement generated in accordance with the present invention. Accordingly, the user is only obligated to repay the card issuer at the discounted price. In this regard, the card issuer has several options for processing the discount. The card issuer may withhold the amount of the discount before paying the merchant, especially if the transactions are batched over a period of time (e.g., monthly basis). If the merchant has already been paid at the regular price of the goods or services, the card issuer obtains the amount of the discount from the merchant directly. In an alternative embodiment, the RC processing system 4510 of the present invention may act as an intermediary, thereby paying the credit amount to the card issuer and recovering the same amount from the merchant by billing the merchant. Other payment options between the card issuer and the merchant may be made without departing from the scope of the present invention.

Merchant Matching

Figure 50:
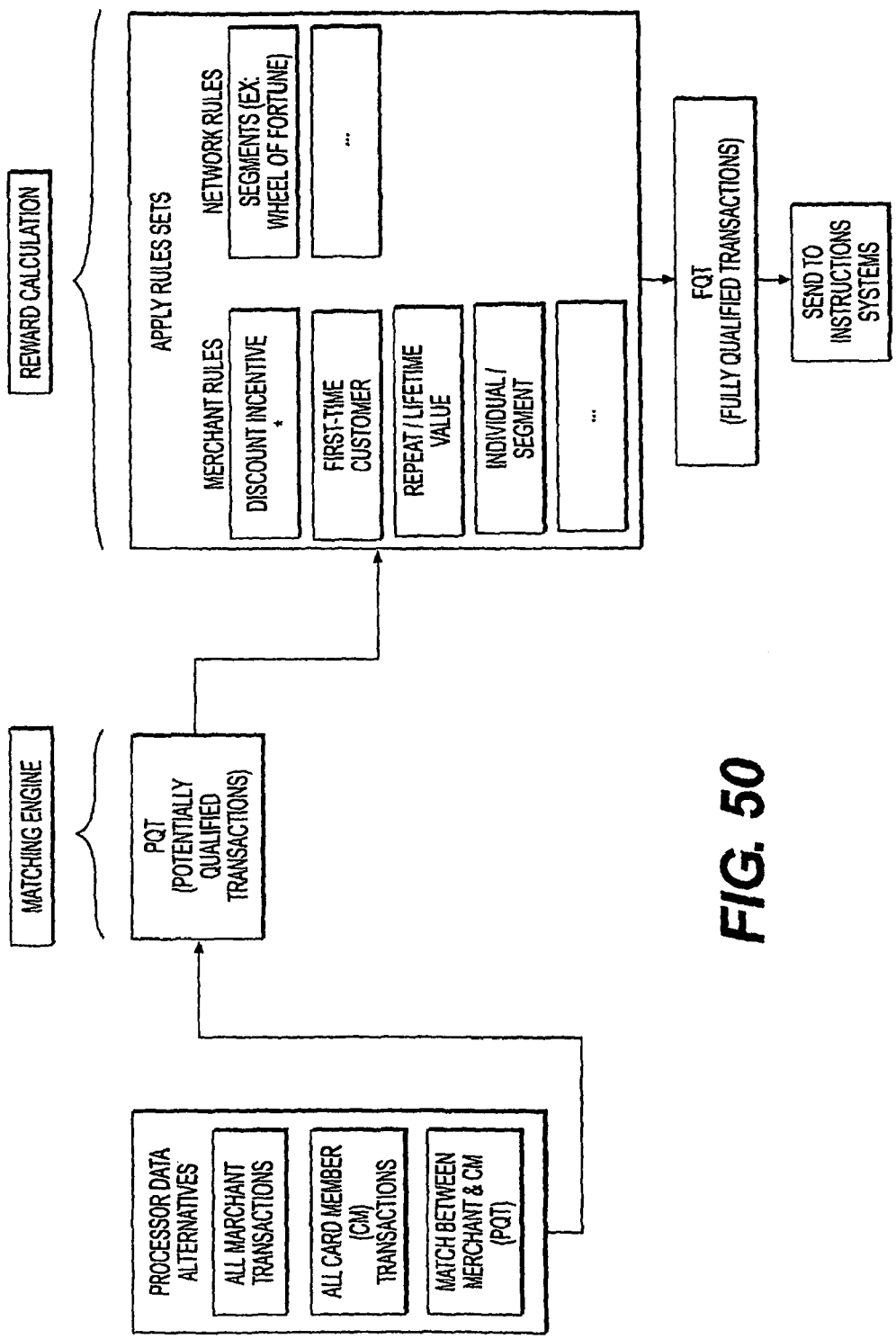
FIGS. 50-51 are illustrations of exemplary embodiments for processing card transactions.
Figure 51:
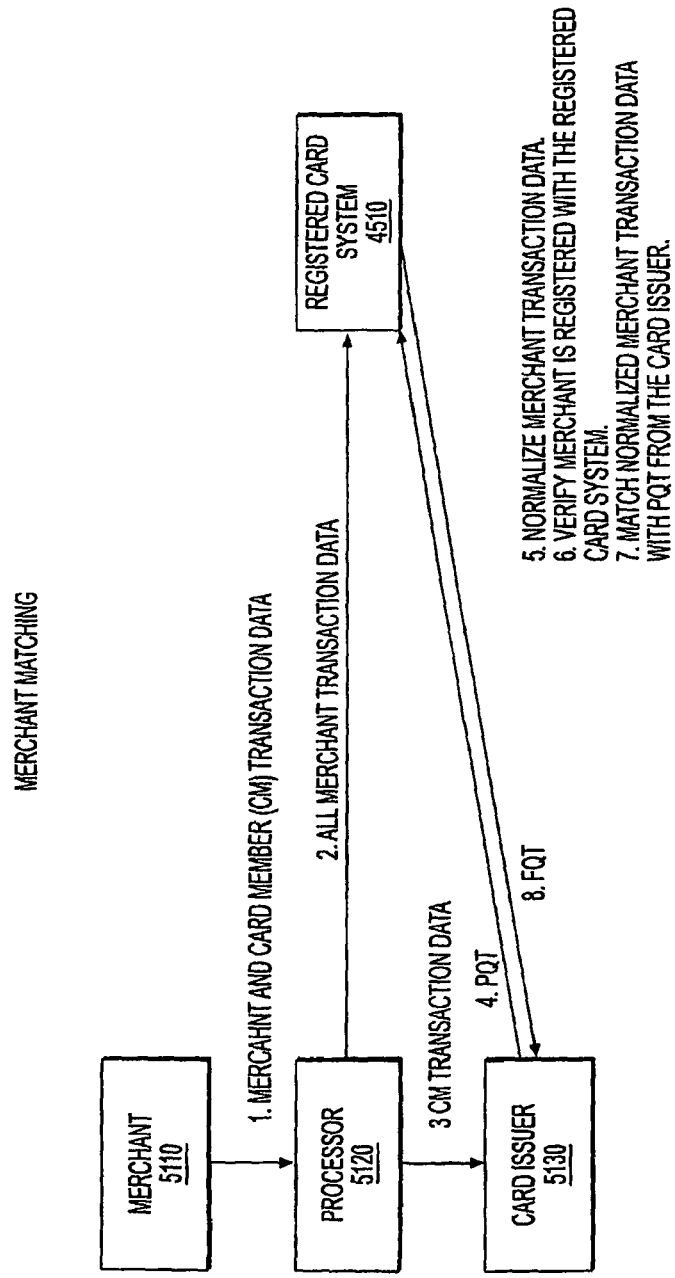

In order to create PQTs and FQTs, the card transaction data must be matched with the merchants to determine the incentives/discounts, if any. FIGS. 50 and 51 illustrate exemplary embodiments for processing the card transaction data to match the transactions to the proper merchants. Merchant matching allows for the identification of merchant transactions from data feeds provided by the card issuer or a third party processor. The merchant matching software (i.e., matching engine 4624) allows for the inclusion of any merchant that is registered with the registered card system. The merchant matching process also solves an issue of identifying merchants from datasets that do not include unique merchant identifications as is typical with transaction data from issuers or processors.

The process of merchant matching includes the following steps as shown in FIGS. 50 and 51:

1. A user makes a purchase at a merchant 5110 and the transaction data, such as card member information and merchant information, and identifying information for the item or items, is forwarded to a processor 5120.
2. The merchant transaction data from the processor is forwarded to the registered card system 4510.
3. A card issuer 5130 receives the card member transaction data from the processor 5120.
4. The card issuer 5130 sends an identified PQT to the rules management module 4510b of the registered card system 4510 as discussed above. The PQT may include the card member information and the purchase made.

5. The registered card system 4510 normalizes the transaction data received from the processor 5120. The data normalization process may be any type of appropriate normalization process known in the art.
6. The registered card system 4510 identifies the merchant data in the transaction data. The registered card system 4510 verifies that the merchant is registered with the registered card system 4510. This step may include determining whether the merchant's name or other merchant identifying information, such as the merchant location, store identification, or industry code, in the transaction data matches or correlates with a merchant name or other merchant identifying information that is stored within the registered card system. This step may also include verifying that the merchant is actually offering a particular incentive that is found in the transaction data.
7. The matching engine 4624 of the registered card processing system 4510 matches the PQT with the associated normalized merchant data and passes the information to a. rewards calculation module 4626 to determine the type and amount of the reward, if any, based on stored business rules (FIG. 47: step 4709).
8. Finally, if the PQT is a qualified transaction, then a FQT is transmitted from the registered card system 4510 to the card issuer 5130. The remaining steps are similar to those discussed above with regards to the processing of FQTs.

In accordance with the exemplary embodiment of the payment processing described above, the user does not have to clip coupons, remember coupon codes, or perform any other extraneous activities to take advantage of an offered incentive. Once the user registers a card with the rewards/loyalty program, all the user has to do is use the registered card to make purchases at participating merchants. Because the card issuer authorizes the transaction at the regular price of the offered goods or services at the time of purchase, the sales/service representatives do not have any indication that the user is obtaining a discount. From the merchant's perspective, the user is a regular customer making a regular purchase. Moreover, because the incentives are automatically processed after the purchase, the users are notified immediately of the pending discounts or rewards. Finally, any discounts are automatically applied to the card account before issuing the card statement, thereby receiving the benefits of any savings directly. Some of the benefits of the present invention are listed below:

From the customers' perspective, the registered card automated incentive redemption system provides:

Faster redemption of incentives: Incentives are processed automatically by the card issuer and the incentives are applied directly to the card transaction.

Easier redemption: There are no coupons or certificates to clip, print, carry, and produce at the time of purchase.

Better purchase experience: A customer cannot forget to take the coupon or certificate, or suffer the embarrassment of producing the coupon or certificate at the register.

From the merchants' perspective, the registered card automated incentive redemption system provides:

Cheaper promotions: Eliminates administrative cost to produce and process paper coupons or promotions.

Easier promotions: Less administrative cost for processing redemptions with the paperless transactions and efficient sales processing. The system also provides better tracking of promotions and effectiveness.

Secure promotions: No coupon leakage or viral distributions of promotion codes. The system allows for private sales that are discreet and exclusive with complete control of intended customers.

Tracking of purchases: Merchants are able to track the purchases of all customers using a coupon (i.e., purchase funnel).

From the card issuer and the rewards/loyalty sponsor's perspective, the registered card automated incentive redemption system provides:

Concentrated purchases: All purchases are on one card allowing increased usage of the card.

Irreplaceable transaction mechanism: Combining huge discounts on larger purchases with good discounts on everyday spending makes the card invaluable to the user (i.e., the user will always use the card in the off chance that the user will get a discount).

Super-charges the rewards program: The rewards/loyalty program gets a boost of usage as users discover the convenience and benefits of using the card.

SKU Level Discount Processing

As briefly described above, another exemplary embodiment of the present invention includes a SKU (i.e., stock keeping unit) discount processing. Currently, many grocery chains, as well as other merchandise-based vendors offer membership or club cards to customers to provide discounts (e.g., "membership price") and rewards. These loyalty programs are intended to offer discount prices to members while keeping track of the types of goods purchased by the customers.

The RC processing system 4510 of the present invention receives SKU level discount information from merchants and manufacturers and stores the information in the rules database (not shown). The user, who has registered a transaction card with a loyalty program of a merchant (e.g., grocery store), makes purchases at the merchant's store (either on-line or in the store) using the registered card. As described above in reference to FIGS. 46 and 47, the transaction reporting module 4620 of the card issuer monitors the transaction activity of the registered card and identifies PQTs (i.e., transactions on the registered card associated with the merchants participating on the loyalty program). The identified PQTs are communicated to the rules management module 4510*b* of the RC processing system 4510. In addition, the merchant sends SKU level purchase data to the rules management system 4510*b* of the RC processing system 4510. Similar to identifying the merchants associated with the PQTs described above, the matching engine 4624 matches the PQTs with the SKU level purchase data from the merchant to identify the specific products associated with the PQTs purchased with a particular merchant. In this regard, the business rule database (not shown) has stored therein SKU level purchase data received either from the merchant or, more typically, from a third party marketing institution that gathers and processes SKU level purchase data for the merchant. The matching engine 4624 applies the SKU level discount rules to the SKU level transaction data to identify, validate, and verify the PQTs made by the user and converts them into FQTs. The rewards calculation module 4626 applies the stored business rules, such as the discounted purchases corresponding to the card transaction data (e.g., by date, location, transaction amount, etc.). The rewards calculation module 4626 then calculates the amount of discount or points for each qualified SKU item and determines the total amount of discount or points due to the user.

The total discount amount to be credited to the user or the amount of points earned by the user for the purchase of an item is sent to the card issuer through the instruction module 4610c. The card issuer then credits the discount amount or points amount to the user's registered card account, for example, and generates a monthly card statement. The monthly statement may list the SKU information with the associated discounts or points to provide a record of the items to which the discounts or points were applied and the amount of savings associated with each item. As the discount has already been applied before issuing the statement, the user is only responsible for repaying the card issuer the discounted transaction amount. As discussed before, the card issuer may obtain the discounted amount from the merchant directly or the RC processing system 4510 may act as an intermediary. In this manner, the user does not have to clip any coupons or keep track of a separate club/rewards card in order to take advantage of the loyalty based savings. Moreover, because the card issuer has processed the FQTs including the SKU level discounts, the processed information may be used by the merchant to recover any reimbursements from manufacturer based discounts, thereby simplifying the incentives offered by the manufactures while reducing fraudulent coupon redemptions by the merchants from the manufacturers.

Reward Points Module

In an exemplary embodiment of the present invention, a points module 4520 adds enhanced features to the RC processing module 4510. The points module 4520 may be implemented independently or in conjunction with the RC processing system 4510 without departing from the scope of the present invention. In general, the points module 4520 allows users to accumulate points based on specified activities and redeem the accumulated points for various rewards, such as to purchase goods or services or apply the points to spend and save accounts described in further detail below.

Earning Points

Generally, an enrolled member accumulates reward points based on reward rules set by the sponsors and/or merchants (e.g., number of visits, qualified purchases, performance award, etc.). The accumulated points are maintained and tracked through the user's account on the loyalty/rewards program portal as shown in FIGS. 56A-56F, for example. In the exemplary embodiment of the present invention, the points module 4520 defines a specified amount of points (e.g., 1 point) to represent a specified monetary amount (e.g., $0.01). The points module 4520 allocates a specified number of points for a specified type of activity based on reward rules. As discussed above, these reward rules may be defined by the sponsors and/or merchants. For instance, the merchants may add points that correspond to the amount of discount for various products and services rather than giving monetary discounts (e.g., 100 points for every $1 spent, 10 points/$ for 10% discounts, etc.).

Figure 52:
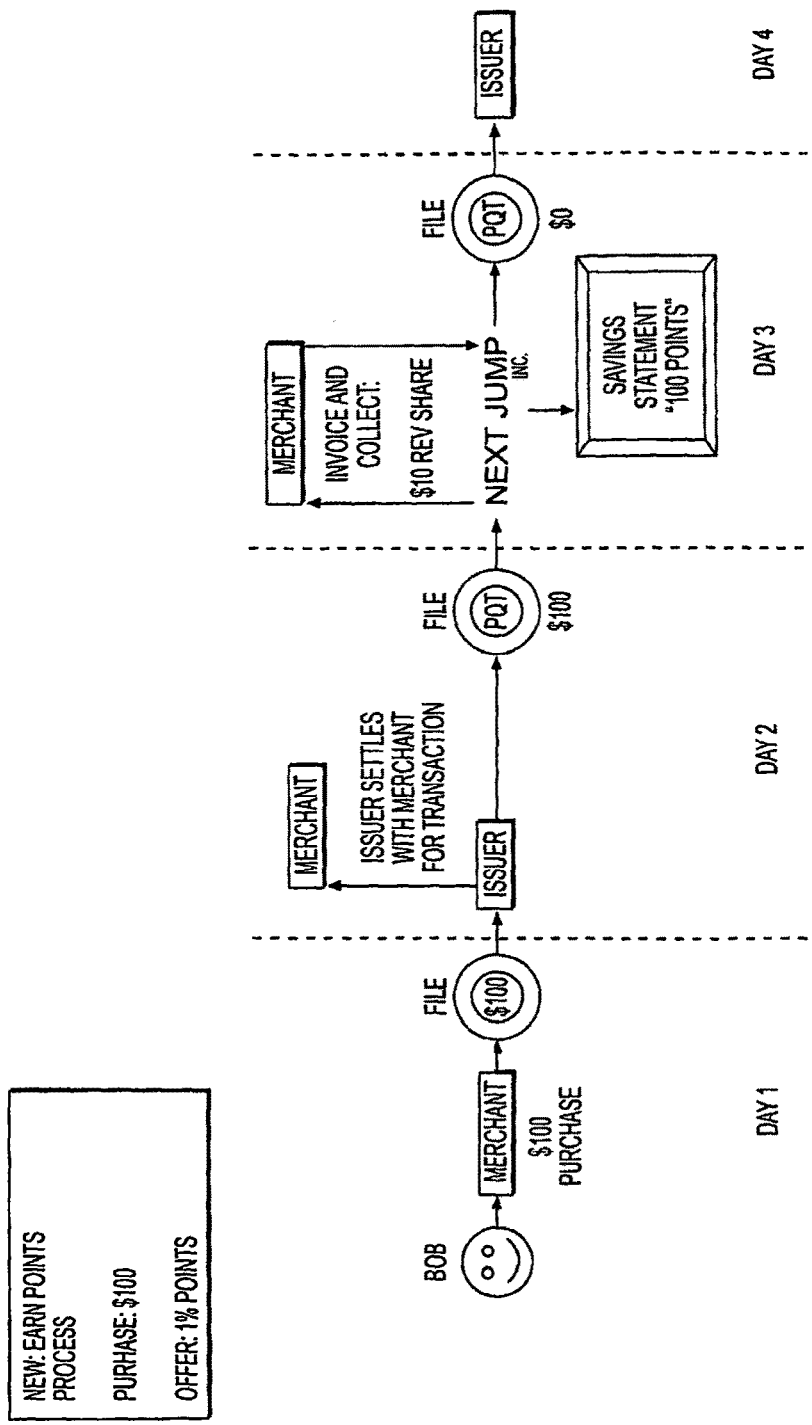
FIG. 52 is a flow diagram illustrating an exemplary process for earning points in accordance with the present invention.

FIG. 52 shows an exemplary process for accumulating points. As shown in FIG. 52, a user ("Bob") visits a participating merchant and makes a $100 purchase using his registered card. As explained above with reference to FIGS. 46 and 47, the transaction is authorized and settled by the card issuer as a normal credit card transaction. During the card transaction processing, the card issuer realizes that the transaction is a registered card transaction with a participating merchant. The transaction is flagged as a PQT (partially qualified transaction) and sent to the RC processing system 4510. The RC processing system 4510 performs the merchant matching then applies the business rules and reward rules to determine incentives/discounts that Bob is entitled to. In this example, the business rules also indicate that the merchant is offering points for spending a set amount with the merchant. In this example, 1 point is to be allocated for every $1 spent on a qualified transaction. Because Bob spent $100 with the merchant, the RC processing system 4510 adds 100 points to Bob's account loyalty/reward account. While the exemplary embodiment of FIG. 52 is described with the standard point accumulation process, additional points may be allocated to the user if the sponsor of the rewards/loyalty program has reward rules set to provide an incentive to the user to use the program. Additional points may be added by reward rules set by the merchants to further encourage usage. The reward rules for adding points may be customized for each user without departing from the scope of the present invention.

Burning Points

Once the points have been earned, the points module 4520 maintains a points balance for each user. The user accesses the points balance through the rewards/loyalty program portal, for example. In accordance with the present invention, the accumulated points may be redeemed in various ways. For instance, the points may be redeemed for cash, applied against a purchase, or designated into various savings vehicles through the spend, save, and give module 4530. Regardless of how the points are to be redeemed, the user accesses the points module 4520 through the user's account on the rewards/loyalty program portal. Under the user's account accessed through the portal, the points module 4520 displays the total balance of the accumulated points available for redemption. Once the user decides to redeem the points, the user designates the number of points to be redeemed and where the points are to be applied (e.g., cash, merchant, spend and save, etc.)

Spending Points

If the user decides to cash in the points, the user designates the amount of points to redeem and selects the "Cash" option. The points module 4520 sends the request to the rules management module 4510b. The rules management module 4510b applies the stored conversion rate (e.g., 1 point=10) to determine the monetary value of the points. Once the amount of the reward is calculated, the instruction module 4510c sends an instruction to issue payment to the user.

If the user decides to spend the points at a merchant, the user designates the amount of points to redeem and selects the merchant where the points will be used. More than one merchant may be designated without departing from the scope of the invention. Thereafter, the user can visit the merchant (e.g., on-line, in store, by phone, through catalog, by mail, etc.) to make a purchase. When making the purchase, the user uses the registered card and the transaction occurs like any other purchase at the regular price. As discussed above, the card issuer then identifies the transaction as a PQT (i.e., a registered card transaction at a participating merchant). The PQT is sent to the RC processing system 4510 to be processed as described above to determine any discounts and/or incentives are to be applied. During the transaction/product matching stage the rules management module 4510b recognizes that points are designated to the identified merchant. Accordingly, the predesignated amount of points is converted to a monetary equivalent and the value is deducted from the transaction price. If the rules management module 4510b identifies additional discounts/incentives offered by the merchant, those discounts/incentives are also applied. Once all of the discounts, incentives, and rewards have been applied, the PQT is converted to an FQT and passed to the instruction module 4510c. As explained above, the instruction module 4510c then issues the FQT to the card issuer to instruct the amount of credit to be applied to the user's account. If the purchase price exceeds the amount of points redeemed in addition to any other incentives/discounts, then the difference is charged against the registered card account. If the purchase price is less than the amount of points redeemed, then no charge is made against the registered card account and any points left over are kept as designated for redemption at the specified merchant. Each transaction is then reflected in the user's registered card statement. In addition, the pending redemption of the points and any pending discounts/savings are calculated by the rules management module 4510b and displayed under the user's account in the rewards/loyalty program portal. After the FQT has been processed and the user notices any left over points, the user may de-designate the points for redemption (i.e., put the points back into the total points balance) or use the left over at the merchant at another time.

Figure 53:
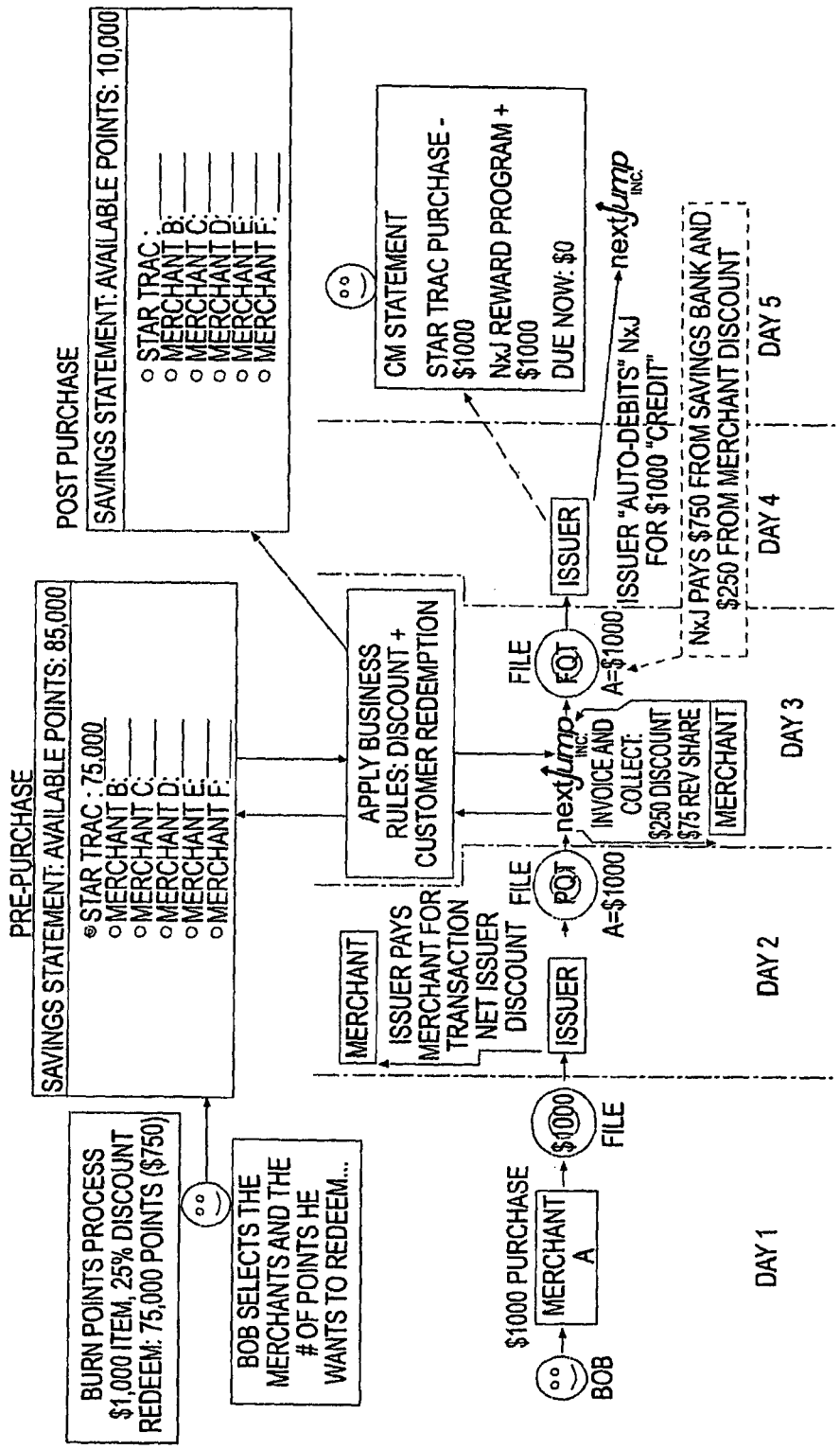
FIGS. 53-54 are flow diagrams illustrating exemplary processes for burning points in accordance with the present invention.
Figure 54:
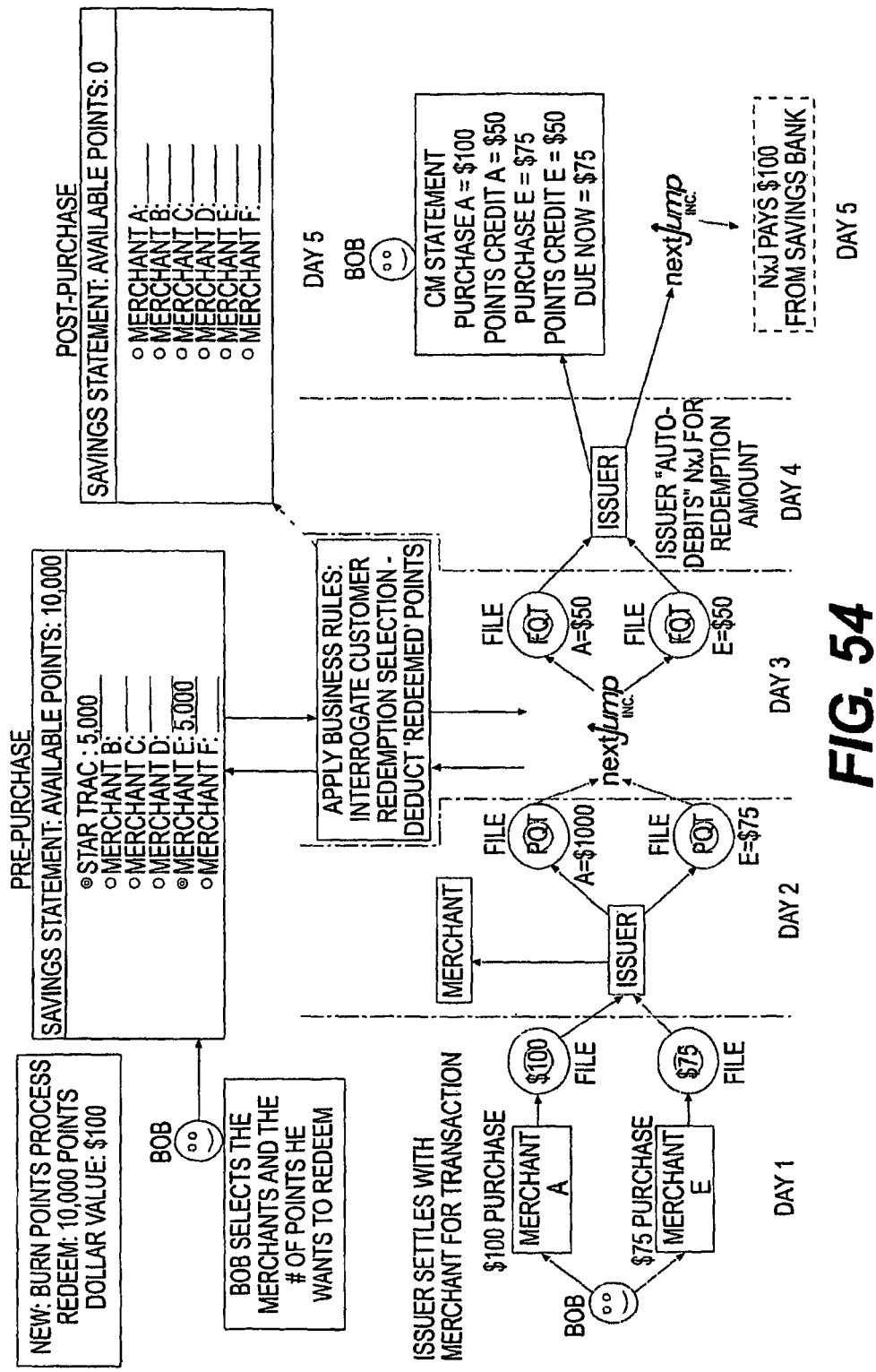

FIGS. 53 and 54 illustrate an example of the points redemption process that includes a discount offer from the designated merchant. As shown in FIG. 53, a user ("Bob") accesses his account through the rewards/loyalty program portal and sees a total points balance of 85,000. Bob browses through the portal to see various offers made to his rewards/loyalty program members and notices that one of the merchants ("Star Trac") is offering a 25% discount on a $1000 item. Bob decides he wants to pay for the item with his points. Bob designates 75,000 points (i.e., $750 in this example) to redeem and selects the merchant ("Star Trac") where he will redeem the points. After designating the points to be redeemed, Bob goes to the merchant (on-line, in store, by phone, or by mail order) and uses his registered card to make the purchase. The card issuer authorizes the transaction for the full price of the item (i.e., $1000). The card issuer recognizes the transaction as being a PQT (i.e., a registered card transaction at a participating merchant) and forwards the PQT to the RC processing system 4510. The PQT is matched to the corresponding merchant ("Star Trac") and the business rules for the merchant are applied to the PQT. At this time, the RC processing system 4510 recognizes that Bob had designated 75,000 points to be applied to transactions from this merchant. The RC processing system 4510 also identifies that the merchant is offering a 25% discount (i.e., $250) to members of the rewards/loyalty program. Accordingly, the PQT (i.e., $1000) is reduced by the discount (i.e., $1000−$25$750). In reality, the RC processing system 4510 charges the merchant for the discount amount (i.e., $250). The remaining balance (i.e., $750) is paid by the RC processing system 4510 from the redeemed reward points. From an accounting perspective, because the card issuer, in effect, has paid the merchant the full purchase price (i.e., $1000), the FQT generated by the RC processing system 4510 authorizes the card issuer to debit the account maintained by the RC processing system 4510, thereby bringing the user's registered card account to $0. Accordingly, the RC processing system 4510 updates the user's account in the rewards/loyalty program portal with the discount/redemption information to reflect a new points balance (i.e., 10,000). The card issuer, likewise, reflects in the registered card user's statement the initial purchase ($1000), the applied discount from the merchant ($250), and the amount from the redeemed points ($750), each as a separate line item on the statement.

FIG. 54 illustrates another example of the points redemption process. In this example, the points are redeemed at two different merchants with no discounts offered by the merchants. As explained above, Bob accesses his account on the rewards/loyalty program portal and notices his points balance (i.e., 10,000). He decides to burn all of his points and designates 5,000 points at Merchant A and 5,000 points at Merchant E. Thereafter, Bob makes purchases at Merchant A (i.e., $100 purchase) and at Merchant E (i.e., $75 purchase) using his registered card. The card issuer authorizes the charge each time for the full amount (i.e., $100 and $75, respectively). The card issuer identifies these transactions as PQTs and issues two PQTs. The RC processing system 4510 matches these PQTs and identifies the first PQT as being with Merchant A and the second PQT as being with Merchant E. When applying the business rules of these merchants, the RC processing system 4510 recognizes that there are no offers outstanding. The RC processing system 4510 also recognizes that the user has designated 5,000 points to be redeemed at Merchant A and 5,000 points to be redeemed at Merchant E. The RC processing system 4510 converts the designated points to monetary values (i.e., $50 for each merchant) and generates FQTs. As explained above, the card issuer has already paid the merchants for the full amount (i.e., $100, $75). Therefore, each FQT authorizes the card issuer to debit the account maintained by the RC processing system 4510 by the points redemption amount (i.e., $50+$50=$100). The remaining balance is applied to Bob's registered card account. Accordingly, the RC processing system 4510 reflects Bob's account as having 0 point balance with any pending transactions as being completed (i.e., displays that 5,000 points have been redeemed at Merchant A and 5,000 points have been redeemed at Merchant E). Furthermore, the card issuer issues a statement reflecting the full purchase price of the purchases (i.e., $100, $75), the amount of points redeemed and applied to the purchase price (i.e., $50, $50), and the total balance due to the card issuer (i.e., $50+$25=$75). Each of these transactions will be reflected as separate line items on the card statement.

Saving and Giving Points

In an alternative embodiment, the RC processing system 4510 includes a spend, save, and give module 4530. In particular, the spend, save, and give module 4530 manages various accounts to which the points designated in the points module 4520 can be sent. The various accounts include, but are not limited to, checking/savings accounts, investment accounts, loan repayment accounts, and even charitable accounts. As shown in FIG. 1, the loyalty/reward system 30 of the present invention interfaces with charity organization 60 and Asset Management system 70. The operation of the spend, save, and give module 4530 may operate in conjunction with the points module 4520 or operate as a separate module. The allocation of the points operates in the same manner as the points module 4520 designating points to be burned at specified merchants. That is, rather than merchants, the user will designate the various accounts in which the values of the points will be transferred. For instance, the user may designate that a predetermined minimum number of points, once accumulated, be transferred to one or more accounts designated in the spend, save, and give module 4530. Accordingly, the accumulated points may be directly deposited to checking accounts, savings accounts, investment accounts (e.g., IRAs, mutual funds, education, etc.), loan repayment accounts (e.g., mortgages, equity loans, line of credit, credit cards, etc.), and even charitable accounts (e.g., Red Cross, Goodwill, etc.). Other accounts may be designated without departing from the scope of the invention. Moreover, the user can access the spend, save, and give module 4530 through the rewards/loyalty program portal to view/designate/modify the savings information including disbursements and balances. More than one account may be designated without departing from the scope of the invention.

As discussed above, traditional reward redemption programs require the user to select offered items for redemption from a "rewards catalog." These items are generally overstock or outdated items that are sold in bulk to clearinghouses that contract with the sponsors of the reward program to accept the reward points as consideration for the items. Accordingly, users have extremely limited selections of items to redeem with their points. Furthermore, because the reward points must be subjected to a claims process, the user must wait several days, if not weeks, before the item is delivered. The points module according to the present invention has no such limitations. The user may purchase any item from any merchant. Moreover, because the payment with points is transparent to the merchant (i.e., the merchant is paid outright by the registered card), the transaction and delivery is processed and fulfilled as with any other sales. Accordingly, the loyalty program benefits as users find more value in the reward points, and therefore use the loyalty program more frequently. The card issuers benefit because more transactions are placed on the registered card, thereby generating more revenue while administrative processing is performed by the RC processing system of the present invention. The users benefit because the points, in whole or in part, may be used with any merchant for any item. When the points are used to purchase items with merchant incentives, the discounts are automatically processed and combined with the points usage. All of the savings are then reflected conveniently on the users' card statements. Moreover, the points may be used as savings vehicles to be applied to various accounts designated by the user to further enhance the usefulness and convenience of the rewards/loyalty program, thereby generating even more usage.

Mobile Device Messaging and Transactions

As shown in FIG. 1A, in an exemplary embodiment, users are able to use cell phones or any other mobile device 50 to search for offers and to receive merchant offers and incentives. A user may be required to register the mobile device 50 with the RC processing system 4510. If a mobile device 50 is registered with the RC processing system 4510, then targeted offers can be delivered to the registered users' mobile devices 50. Registration includes registering a user's mobile device phone number and associating this number with the user's registered card or cards. The mobile device 50 must be registered to determine whether a search for an offer is associated with a registered card holder.

After the user registers the mobile device, a user is able to search for an offer based on criteria such as location, category, brand, and type of discount. For example, if a user is shopping in a particular geographic area of New York City, the user could determine whether any incentives or offers were available based on the location of the user.

To use the registered card system from a mobile device, the RC processing system 4510 must determine whether the mobile device phone number associated with a message or request for a search is being sent from a registered mobile device. The RC processing system 4510 determines whether the phone number is associated with a particular registered card or cards. If the phone number is associated with a registered card or cards, the RC processing system 4510 will send an offer or incentive to the mobile device. This offer or incentive sent can be based on the user's search criteria. The user is then able to take advantage of the offer at the merchant associated with the offer. The registered card system and process then proceed as discussed above.

Having described the various exemplary embodiments of the present invention, it will be apparent to those skilled in the art that various modifications and variations can be made to the communication system and method for narrowcasting based on the active learning system and to the system and method for merchant network services of the present invention without departing from the spirit or scope of the invention. Thus, it is intended that the present invention cover the modifications and variations of this invention provided they come within the scope of the appended claims and their equivalents.

What is claimed is:

1. A method for narrowcasting, the method comprising:
   registering, by a server, an affiliated network having a plurality of members responsive to a registration from a user network, wherein the user network includes the affiliated network;
   collecting, by the server, demographic information and preference data about the members from the affiliated network via the user network such that the demographic information is stored in a first set of flat files and the preference data is stored in a second set of flat files, wherein the demographic information and preference data are collected after the affiliated network is registered;
   receiving, by the server, a request to register a first member of the members of the affiliated network after the demographic information and preference data are collected;
   generating, by the server, questions about the first member during an enrollment process to refine the demographic information and the preference data about the first member as stored in the first set of flat files and the second set of flat files, wherein the questions are dynamically generated based on the demographic information and the preference data from the affiliated network as stored in the first set of flat files and the second set of flat files and responses to answered questions during the enrollment process, wherein the questions are generated after the request to register the first member is received;
   segmenting, by the server, the first member into at least one segmentation cell based on the refined demographic information and the refined preference data provided by the affiliated network from the first set of flat files and the second set of flat files and the responses to answered questions during the enrollment process;
   providing, by the server, access to a benefits website to the first member;
   collecting, by the server, behavior data by tracking activities of the first member while accessing the benefits website, wherein the collecting behavior data by tracking activities of the first member while accessing the benefits website includes:
      presenting, by the server, a page of the benefits website to the first member, wherein the page is segmented into an offer area and a question area, wherein the offer area and the question area are positioned immediately adjacent to each other, wherein the page contains a plurality of offer contents inclusive of an offer content, at least one of the questions, and an input element corresponding to the at least one of the questions, wherein the offer area contains the offer contents inclusive of the offer content, wherein the question area contains the at least one of the questions and the input element corresponding to the at least one of the questions;

determining, by the server, that the first member has moved a cursor over the offer content presented in the offer area on the page based on tracking the cursor;

enlarging, by the server, the offer content in the offer area without blocking the question area or only within the offer area to present specific information in the offer area regarding the offer content while the server (1) tracks the offer content viewed by the first member in the offer area on the page based on tracking the cursor, (2) tracks how long the offer content is viewed by the first member in the offer area on the page via measuring time of the cursor hovering over the offer content in the offer area to view the specific information in the offer area based on tracking the cursor, and (3) tracks the input element being selected or deselected in the question area based on tracking the cursor; and presenting, by the server, a set of offers determined most relevant to the first member based on the refined demographic information from the first set of flat files, the refined preference data from the second set of flat files, the at least one segmentation cell, and the behavior data as collected.

2. The method of claim 1, wherein the preference data is generated, via the server, by presenting, via the server, a calendar interface and a selection interface to the first member, wherein the calendar interface contains a set of indicia for a past offer content from a merchant, wherein the selection interface allows the first member to designate the past offer content that the first member wishes to be reminded of in future offer content.

3. The method of claim 1, wherein the server is configured to present an interface that includes a reminder feature that (1) notifies the first member of at least one of an up-coming offer content or a missed offer content and (2) asks whether the first member would like to receive a reminder regarding at least one of the up-coming offer content or an offer content that is similar to the missed offer content.

4. The method of claim 3, wherein the interface presents an offer content on a calendar such that the first member can view the offer content at a glance, wherein the reminder feature is connected to the calendar to optimize an opportunity for the first member to interact with the server.

5. The method of claim 1, further comprising:
determining, by the server, a persona for the first member based on the demographic information and preference data provided by the affiliated network, the responses to answered questions during the enrollment process, the behavior data, and past purchase behavior.

6. The method of claim 1, wherein the behavior data includes a request for future reminders of expired offers.

7. The method of claim 1, wherein the behavioral data includes at least one of click-throughs, hovers, and search terms performed by the first member.

8. The method of claim 1, wherein the questions asked during the enrollment process are presented as a preference game for obtaining additional preference data of the first member.

9. The method of claim 1, further comprising:
determining, by the server, a life-stage for the first member based on the demographic information and preference data provided by the affiliated network, the responses to answered questions during the enrollment process, the behavior data, and past purchase behavior, wherein the presenting is based on the life-stage.

10. The method of claim 1, wherein the providing access to the benefits website to the first member comprises presenting to the first member a first set of offers stored in a merchant offers database determined most relevant to the first member based on the at least one segmentation cell of the first member.

11. The method of claim 1, wherein the presenting the set of offers determined most relevant to the first member comprises presenting to the first member a second set of offers stored in a merchant offers database determined most relevant to the first member based on the refined demographic information and refined preference data and the behavior data.

* * * * *